(12) United States Patent
Horiguchi et al.

(10) Patent No.: US 8,200,407 B2
(45) Date of Patent: Jun. 12, 2012

(54) VEHICLE CONTROL DEVICE

(75) Inventors: Munehisa Horiguchi, Tokyo (JP);
Akira Mizuno, Tokyo (JP)

(73) Assignee: Equos Research Co., Ltd. (JP)

( * ) Notice: Subject to any disclaimer, the term of this patent is extended or adjusted under 35 U.S.C. 154(b) by 345 days.

(21) Appl. No.: 12/518,391

(22) PCT Filed: Dec. 18, 2007

(86) PCT No.: PCT/JP2007/074341
§ 371 (c)(1),
(2), (4) Date: Jun. 9, 2009

(87) PCT Pub. No.: WO2008/078611
PCT Pub. Date: Jul. 3, 2008

(65) Prior Publication Data
US 2010/0023214 A1    Jan. 28, 2010

(30) Foreign Application Priority Data

Dec. 22, 2006    (JP) .................................. 2006-346787
Mar. 29, 2007    (JP) .................................. 2007-089849

(51) Int. Cl.
*G05D 1/00*    (2006.01)
(52) U.S. Cl. ......................................................... 701/80
(58) Field of Classification Search .................... 701/41, 701/48, 70–72, 78–80; 280/5.521
See application file for complete search history.

(56) References Cited

U.S. PATENT DOCUMENTS

| | | | |
|---|---|---|---|
| 2,787,473 A | 4/1957 | Chiodo | |
| 4,752,079 A | 6/1988 | Fahrner | 280/112 |
| 6,347,802 B1 * | 2/2002 | Mackle et al. | 280/5.521 |
| 2005/0006166 A1 | 1/2005 | Cho | |
| 2008/0162009 A1 | 7/2008 | Miki et al. | 701/80 |

FOREIGN PATENT DOCUMENTS

| | | |
|---|---|---|
| DE | 19935535 | 2/2001 |
| JP | 47-44599 | 12/1972 |
| JP | 02-185802 | 7/1990 |
| JP | 06-099796 | 4/2004 |
| JP | 2006-327571 | 12/2006 |
| WO | 2004/041621 | 5/2004 |

OTHER PUBLICATIONS

California State Fuel-Efficient Tire Report: vol. II, Jan. 2003, pp. 1-50.

* cited by examiner

*Primary Examiner* — Kim T Nguyen
(74) *Attorney, Agent, or Firm* — Bacon and Thomas, PLLC

(57) ABSTRACT

A vehicle control device which can provide compatibility between a high grip performance and fuel efficiency is provided. When a camber angle of a wheel 2 is adjusted to a negative camber, ground contact pressure in a first tread 21 is increased and ground contact pressure in a second tread 22 is decreased. Accordingly, the high grip performance is provided. On the other hand, when the camber angle of the wheel 2 is adjusted to a positive camber, the ground contact pressure in the first tread 21 is decreased and the ground contact pressure in the second tread 22 is increased. Accordingly, a rolling resistance becomes low, and fuel saving is achieved. In this manner, by adjusting the camber angle of the wheel 2, the compatibility can be provided between conflicting performances of the high grip performance and the fuel saving.

8 Claims, 27 Drawing Sheets

VEHICLE CONTROL DEVICE

TECHNICAL FIELD

The present invention relates to a vehicle control device which activates a camber angle adjustment device to control a camber angle of a wheel for a vehicle including the wheel and the camber angle adjustment device which adjusts the camber angle of the wheel, and particularly relates to a vehicle control device which can provide compatibility between high grip performance and fuel efficiency.

BACKGROUND ART

Attempts have been made to sufficiently bring out the capability of a tire to improve the turning performance by providing a large camber angle (angle formed by the center line of a tire and the ground) of a wheel in a minus direction. This is because, when the camber angle is set to 0° for example, a tread contacts the ground in the entire region in the width direction during a straight-ahead driving, while the tread on the inside is caused to float from the ground by the inclination of the vehicle due to the centrifugal force at the time of turning such that a sufficient turning performance cannot be obtained. Thus, by providing the camber angle in the minus direction in advance, the tread can contact the ground in a large width at the time of turning, and the turning performance can be improved.

However, although the turning performance of the tire is improved when the wheel is mounted on the vehicle at a large camber angle in the minus direction, the ground contact pressure on a tread end portion on the inside during the straight-ahead driving is increased, and there has been a problem that the tire is worn unevenly, which is uneconomical, and the temperature in the tread end portion increases.

Thus, Japanese Patent Application Publication No. JP-A-2-185802 discloses technology that provides high rigidity by reinforcing a side portion on one side of a tire to be stronger than a side portion on the other side, and ensuring wear resistance, heat resistance, and high grip performance by dividing tread rubber into two such that the hardness is lower on one side than the other side or increasing the tread thickness in a tread end portion, in the case where a wheel is mounted on a vehicle at a large camber angle in a minus direction (Patent Document 1).

Also, U.S. Pat. No. 6,347,802 B1 discloses a suspension system which performs an active control of a camber angle of a wheel by the driving force of an actuator (Patent Document 2).

Patent Document 1: Japanese Patent Application Publication No. JP-A-2-185802
Patent Document 2: U.S. Pat. No. 6,347,802 B1

DISCLOSURE OF THE INVENTION

Problem to be Solved by the Invention

However, in the former technology, there has been a problem that the compatibility between high grip performance and fuel efficiency (low rolling resistance) has been insufficient, although sufficient performance can be obtained in maintaining the high grip performance at the time of turning. In the related-art technology described above, the high grip performance is limited to the time of turning, and there has been a problem that the high grip performance cannot be sufficiently obtained at a sudden acceleration or a sudden brake during the straight-ahead driving, for example. In the same manner, in the latter technology, there has been a problem that the compatibility between the high grip performance and fuel efficiency is insufficient.

In order to solve the problem described above, it is an object of the present invention to provide a vehicle control device which can provide compatibility between high grip performance and fuel efficiency.

Means for Solving the Problem

In order to achieve the object, a vehicle control device described in claim 1 activates a camber angle adjustment device which adjusts a camber angle of a wheel to control the camber angle of the wheel for a vehicle including the wheel and the camber angle adjustment device, and includes activation control means for controlling an activation state of the camber angle adjustment device. The wheel includes a first tread and a second tread aligned in a width direction of the wheel with respect to the first tread and arranged on an inside or an outside of the vehicle. The first tread and the second tread are configured to have characteristics different from each other such that the first tread is configured to have a characteristic of a higher grip force compared to the second tread and the second tread is configured to have a characteristic of a smaller rolling resistance compared to the first tread. The activation control means includes necessary friction coefficient calculation means for calculating a friction coefficient necessary for preventing slip from occurring between the wheel and a road surface to run on based on a running condition of the vehicle, camber angle calculation means for calculating the camber angle of the wheel based on the friction coefficient calculated by the necessary friction coefficient calculation means, and camber angle change means for changing a ratio of a ground contact pressure in the first tread of the wheel and a ground contact pressure in the second tread of the wheel by adjusting the camber angle of the wheel based on the camber angle calculated by the camber angle calculation means.

In a vehicle control device described in claim 2, which is based on the vehicle control device described in claim 1, the camber angle calculation means calculates a camber angle that allows the wheel to exhibit a friction coefficient equivalent to the friction coefficient calculated by the necessary friction coefficient calculation means and that allows a rolling resistance of the wheel to be smaller, when at least the friction coefficient calculated by the necessary friction coefficient calculation means falls within a range of friction coefficients to be exhibited by the wheel.

A vehicle control device described in claim 3, based on the vehicle control device described in claim 1 or 2, further includes acceleration detection means for detecting an operation state of an acceleration operation member operated by a driver for accelerating the vehicle and braking detection means for detecting an operation state of a braking operation member operated by the driver for braking the vehicle. The necessary friction coefficient calculation means calculates the friction coefficient based on the operation states of the acceleration operation member and the braking operation member detected by the acceleration detection means and the braking detection means, respectively.

A vehicle control device described in claim 4, based on the vehicle control device described in claim 1 or 2, further includes turning condition calculation means for calculating a turning condition of the vehicle using a ground speed of the vehicle and a steering angle of the wheel. The necessary friction coefficient calculation means calculates the friction coefficient based on the turning condition of the vehicle calculated by the turning condition calculation means.

A vehicle control device described in claim 5, based on the vehicle control device described in claim 3, further includes turning condition calculation means for calculating a turning condition of the vehicle using a ground speed of the vehicle and a steering angle of the wheel. The necessary friction coefficient calculation means calculates the friction coefficient based on the turning condition of the vehicle calculated by the turning condition calculation means.

Effects of the Invention

According to the vehicle control device described in claim 1, when the activation control means performs the activation control of the camber angle adjustment device and the camber angle of the wheel is adjusted in the minus direction (negative camber direction), the ground contact pressure in the tread arranged on the inside of the vehicle (first tread or second tread) is increased while the ground contact pressure in the tread arranged on the outside of the vehicle (second tread or first tread) is decreased.

On the other hand, when the camber angle of the wheel is adjusted in the plus direction (positive camber direction), the ground contact pressure in the tread arranged on the inside of the vehicle (first tread or second tread) is decreased while the ground contact pressure in the tread arranged on the outside of the vehicle (second tread or first tread) is increased.

In this manner, with the vehicle control device according to the present invention, the ratio of the ground contact pressure in the first tread and the ground contact pressure in the second tread of the wheel (including a state where only one tread contacts the ground and the other tread is away from the road surface) can be changed in an arbitrary timing by controlling the activation state of the camber angle adjustment device using the activation control means to adjust the camber angle of the wheel. Thus, there is an effect that the compatibility can be provided between two performances one of which is obtained by the characteristic of the first tread and the other of which is obtained by the characteristic of the second tread.

With the vehicle control device according to the present invention, there is an effect that the compatibility can be provided between two performances of driving performance (for example, turning performance, acceleration performance, braking performance, or driving stability in rain or on a snow road) and fuel saving performance by adjusting the camber angle of the wheel to change the ratio of the ground contact pressure in the first tread and the ground contact pressure in the second tread (including the state where only one tread contacts the ground and the other tread is away from the road surface), since the first tread is configured to have the characteristic of the higher grip force compared to the second tread and the second tread is configured to have the characteristic of the smaller rolling resistance compared to the first tread.

It has been impossible to achieve the compatibility between the two performances which conflict with each other in this manner in a vehicle of the related art, and two types of tires corresponding to the respective performances have had to be changed. In the present invention, it has become possible for the first time by adopting a configuration in which the camber angle of the wheel having the first and second treads is adjusted by the activation control means controlling the activation state of the camber angle adjustment device. Accordingly, the compatibility between the two performances which conflict with each other can be achieved.

Further, according to the present invention, the necessary friction coefficient calculation means calculates the friction coefficient necessary for preventing slip from occurring between the wheel and the road surface to run on based on the running condition of the vehicle, the camber angle calculation means calculates the camber angle of the wheel based on the friction coefficient calculated by the necessary friction coefficient calculation means, and the camber angle change means adjusts the camber angle of the wheel based on the camber angle calculated by the camber angle calculation means. This achieves an effect of improving the acceleration performance, braking performance, or the turning performance even more effectively by allowing the wheel to exhibit a friction coefficient necessary for preventing the wheel from slipping, while improving fuel consumption performance.

With the configuration in which the tread configured to have the characteristic of the high grip force is arranged on the inside of the vehicle as the first tread, the right and left wheels can be brought to a state where the negative camber is provided in the case where the first tread is used. Thus, there is an effect that the turning performance can further be improved correspondingly.

With the configuration in which the first tread is arranged on both sides (both sides in the width direction of the wheel) of the second tread, the right and left wheels can be brought to a state where the camber angle is provided in a direction to cause inclination to the inward side of the turn when the first tread is used. Thus, there is an effect that the turning performance can further be improved correspondingly.

According to the vehicle control device described in claim 2, in addition to the effects achieved by the vehicle control device described in claim 1, an effect can even further be achieved that makes acceleration/deceleration and turning performance provided by high grip performance compatible with low fuel consumption performance provided by low rolling resistance.

Specifically, there is correlation between the rolling resistance and friction coefficient of the wheel. A wheel having a low rolling resistance characteristic can achieve low fuel consumption; but it becomes difficult for such a wheel to achieve grip performance, which results in degraded acceleration performance, braking performance, or turning performance. A wheel having a high grip characteristic, on the other hand, can achieve improved acceleration performance, braking performance, or turning performance; but results in increased rolling resistance, which leads to deteriorated fuel consumption.

According to the present invention, on the other hand, at least as long as the friction coefficient calculated by the necessary friction coefficient calculation means falls within a range of friction coefficients to be exhibited by the wheel, the camber angle calculation means calculates a camber angle at which the wheel can exhibit a friction coefficient equivalent to that calculated by the necessary friction coefficient calculation means and which results in an even smaller rolling resistance of the wheel. Specifically, the change of the friction coefficient to be exhibited by the wheel can be controlled to a minimum necessary friction coefficient, so that an effect of achieving an even lower fuel consumption can be achieved, while maintaining acceleration/braking performance and turning performance.

Note that, preferably, the camber angle calculation means is arranged to calculate a camber angle at which the wheel can exhibit its maximum friction coefficient, if the friction coefficient calculated by the necessary friction coefficient calculation means exceeds the maximum friction coefficient to be exhibited by the wheel. In this case, preferably, the camber angle is the smallest angle (close to 0 degrees) in the range within which the wheel can exhibit its maximum friction coefficient. This is because of the following reason. Specifically, after the second tread leaves the road surface to run on, the friction coefficient converges to a predetermined value even with a greater camber angle, so that no further improvement in grip performance can be expected. The camber angle is thereby prevented from becoming unnecessarily large, and vehicle running stability can be secured. Additionally, in this case, preferably, report means for notifying a driver that the friction coefficient to be exhibited by the wheel is exceeded (for example, an output of an alarm sound or an alarm display on, for example, a monitor) or means for decreasing the vehicle speed (for example, instructions on braking using a brake unit or on reducing output of, for example, an engine) is provided. This allows the driver to be notified that the vehicle has exceeded its running marginal performance (acceleration/braking performance, turning performance), or the vehicle speed to be mechanically reduced without relying on operation performed by the driver, thereby contributing to improved safety.

In addition, preferably, the camber angle calculation means is configured to calculate a camber angle at which the wheel can exhibit its minimum friction coefficient, if the friction coefficient calculated by the necessary friction coefficient calculation means is lower than the minimum friction coefficient to be exhibited by the wheel. In this case, preferably, the camber angle is the smallest angle (close to 0 degrees) in the range within which the wheel can exhibit its minimum friction coefficient. This is because of the following reason. Specifically, after the first tread leaves the road surface to run on, the rolling resistance converges to a predetermined value even with a greater camber angle, so that no further improvement in fuel consumption performance can be expected. The camber angle is thereby prevented from becoming unnecessarily large to thereby secure vehicle running stability.

Especially if the friction coefficient calculated by the necessary friction coefficient calculation means is lower than the minimum friction coefficient to be exhibited by the wheel, preferably, the camber angle calculation means is configured such that 0 degrees is calculated as the smallest angle in the range within which the wheel can exhibit its minimum friction coefficient.

Given the camber angle being calculated to be 0 degrees in such cases, the camber angle can be prevented from becoming unnecessarily large, so that vehicle running stability can be ensured. Furthermore, control operations to be executed for providing a camber angle to the wheel can be limited to the plus and minus sides of 0 degrees. Control can therefore be simplified.

In addition, the camber angle calculation means calculates the camber angle to be provided to the wheel to be 0 degrees when the friction coefficient calculated by the necessary friction coefficient calculation means is lower than the minimum friction coefficient to be exhibited by the wheel. As a result, the camber angle to be provided to the wheel can be limited to the plus side of 0 degrees. In such cases, a mechanism for providing camber angles on the minus side can be omitted. Further, if the camber angle to be provided to the wheel is limited to the minus side of 0 degrees, then a mechanism for providing camber angles on the plus side can be omitted. Both cases contribute to a simplified mechanism.

According to the vehicle control device described in claim 3, in addition to the effects achieved by the vehicle control device described in claim 1 or 2, the acceleration detection means and the braking detection means for detecting the operation states of the acceleration operation member and the deceleration operation member operated by the driver for accelerating or decelerating the vehicle are provided. The necessary friction coefficient calculation means calculates the necessary friction coefficient based on the operation states of the acceleration operation member and the braking operation member detected by the acceleration detection means and the braking detection means, respectively. This allows the friction coefficient and rolling resistance of the wheel to be controlled according to an actual acceleration condition or deceleration condition of the vehicle. As a result, there is an effect that both the acceleration/deceleration performance or the turning performance, and the low fuel consumption performance can be efficiently achieved.

More specifically, the arrangement in which the necessary friction coefficient is calculated based on the operation states of the acceleration operation member and the braking operation member detected by the acceleration detection means and the braking detection means allows an even greater friction coefficient to be calculated as being necessary, if sudden acceleration or sudden braking is to be performed. In such cases, at least the ground contact pressure in the first tread is increased (specifically, the ground contact pressure in the second tread is decreased), so that the acceleration/braking performance and the turning performance can be improved by using the high grip performance of the first tread. On the other hand, when acceleration/deceleration is moderate or during constant speed cruising, the necessary friction coefficient can be calculated to be an even smaller value. In this case, at least the ground contact pressure in the second tread is increased (specifically, the ground contact pressure in the first tread is decreased). Thus, low fuel consumption can be achieved by using the low rolling resistance of the second tread.

As a result, the ratio between the ground contact pressure in the first tread and the ground contact pressure in the second tread (including a condition in which one tread is grounded with the other tread spaced apart from the road surface) can be controlled in an appropriate condition in line with actual running. This achieves an effect of making two mutually conflicting performances of the acceleration/braking performance or the turning performance, and the low fuel consumption performance compatible with each other.

According to the vehicle control device described in claim 4, in addition to the effects achieved by the vehicle control device described in claim 1 or 2, there is further provided means for calculating the turning condition of the vehicle using the ground speed of the vehicle and the steering angle of the wheel. The necessary friction coefficient calculation means then calculates the necessary friction coefficient based on the turning condition of the vehicle calculated by the turning condition calculation means. This allows the friction coefficient and rolling resistance of the vehicle to be controlled according to the actual turning condition of the vehicle. As a result, there is an effect of efficiently making the turning performance (and acceleration/braking performance) and the low fuel consumption performance compatible with each other.

More specifically, the arrangement in which the necessary friction coefficient is calculated based on the turning condition of the vehicle calculated by the turning condition calculation means allows a calculation to be made for a greater friction coefficient if a sharp turn or a turn at high speed is to be made. In this case, the ground contact pressure in the first tread is at least increased (specifically, the ground contact pressure in the second tread is decreased), so that the turning performance (and acceleration/braking performance) can be improved by using the high grip performance of the first tread. If the turning radius is mild or the turn is to be made at low speed, on the other hand, the necessary friction coefficient can be calculated to be an even smaller value. In this case, the ground contact pressure in the second tread is at least increased (specifically, the ground contact pressure in the first tread is decreased), so that the low fuel consumption can be achieved by using the low rolling resistance of the second tread.

As a result, the ratio between the ground contact pressure in the first tread and the ground contact pressure in the second tread (including a condition in which one tread is grounded with the other tread spaced apart from the road surface) can be controlled in an appropriate condition in line with actual running. This achieves an effect of making two mutually conflicting performances of the turning performance (and acceleration/braking performance) and the low fuel consumption performance compatible with each other.

According to the vehicle control device described in claim 5, in addition to the effects achieved by the vehicle control device described in claim 3, there is further provided means for calculating the turning condition of the vehicle using the ground speed of the vehicle and the steering angle of the wheel. The necessary friction coefficient calculation means then calculates the necessary friction coefficient based on the turning condition of the vehicle calculated by the turning condition calculation means. This allows the friction coefficient and rolling resistance of the vehicle to be controlled according to the actual turning condition of the vehicle. As a result, there is an effect of efficiently making the turning performance (and acceleration/braking performance) and the low fuel consumption performance compatible with each other.

More specifically, the arrangement in which the necessary friction coefficient is calculated based on the turning condition of the vehicle calculated by the turning condition calculation means allows a calculation to be made for a greater friction coefficient if a sharp turn or a turn at high speed is to be made. In this case, the ground contact pressure in the first tread is at least increased (specifically, the ground contact pressure in the second tread is decreased), so that the turning performance (and acceleration/braking performance) can be improved by using the high grip performance of the first tread. If the turning radius is mild or the turn is to be made at low speeds, on the other hand, the necessary friction coefficient can be calculated to be an even smaller value. In this case, the ground contact pressure in the second tread is at least increased (specifically, the ground contact pressure in the first tread is decreased), so that the low fuel consumption can be achieved by using the low rolling resistance of the second tread.

As a result, the ratio between the ground contact pressure in the first tread and the ground contact pressure in the second tread (including a condition in which one tread is grounded with the other tread spaced apart from the road surface) can be controlled in an appropriate condition in line with actual running. This achieves an effect of making two mutually conflicting performances of the turning performance (and acceleration/braking performance) and the low fuel consumption performance compatible with each other.

DESCRIPTION OF THE REFERENCE NUMERALS

100 Vehicle control device
1, 201, 301 Vehicle
2, 202, 302 Wheel
2FL Front wheel (wheel, left wheel)
2FR Front wheel (wheel, right wheel)
2RL Rear wheel (wheel, left wheel)
2RR Rear wheel (wheel, right wheel)
21, 221 First tread
22 Second tread
323 Third tread
4 Camber angle adjustment device
4FL to 4RR FL to RR actuators (camber angle adjustment devices)

4a to 4c Hydraulic pressure cylinder (part of camber angle adjustment device)

4d Hydraulic pressure pump (part of camber angle adjustment device)

BEST MODES FOR CARRYING OUT THE INVENTION

Figure 1:
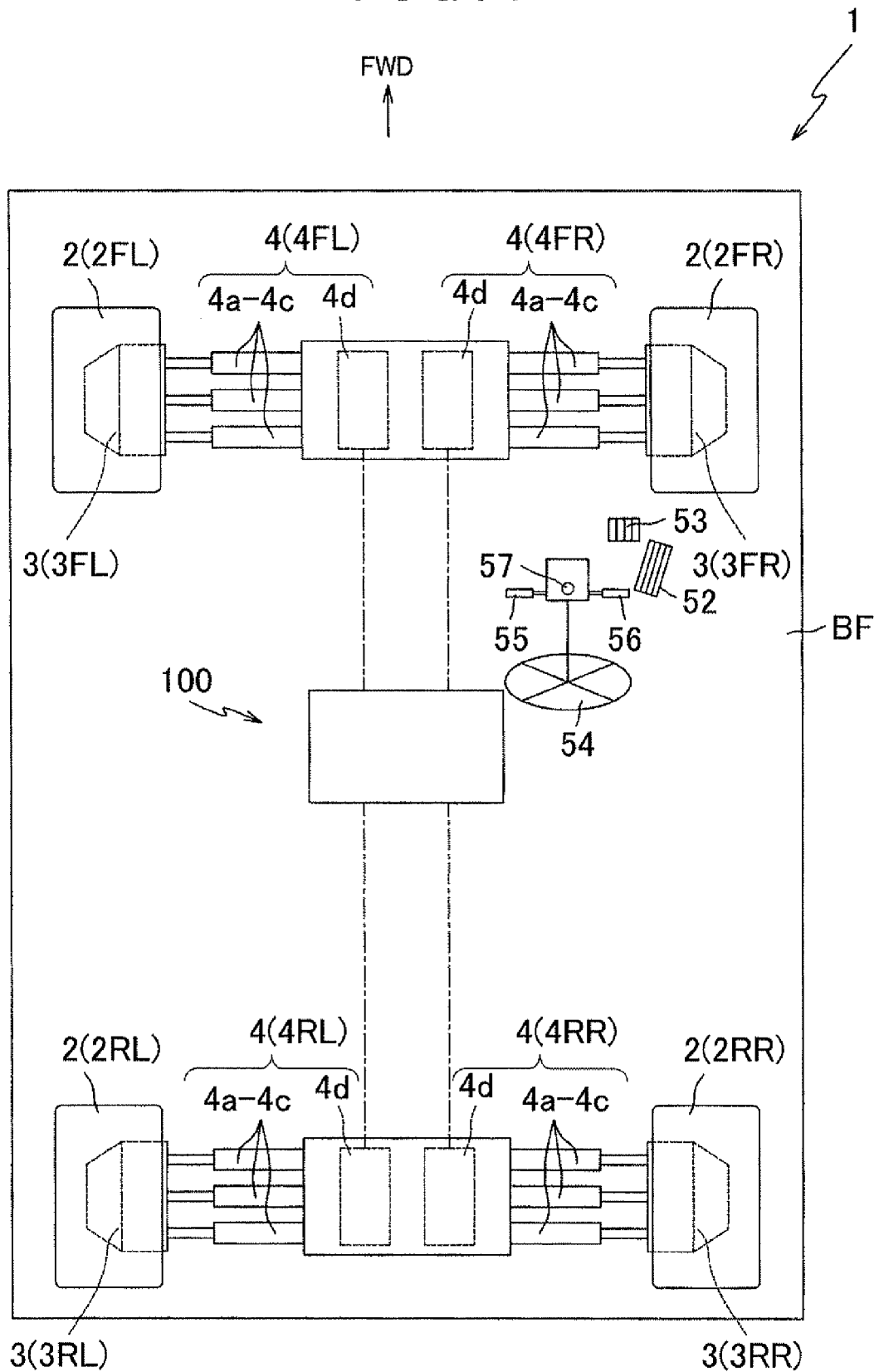
FIG. 1 is a schematic view showing a vehicle in which a vehicle control device according to a first embodiment of the present invention is mounted.

Hereinafter, preferred embodiments of the present invention will be described with reference to the accompanying drawings. FIG. 1 is a schematic view showing a vehicle 1 in which a vehicle control device 100 according to a first embodiment of the present invention is mounted. Note that an arrow FWD in FIG. 1 shows a forward direction of the vehicle 1.

First, the schematic configuration of the vehicle 1 will be described. As shown in FIG. 1, the vehicle 1 mainly includes a body frame BF, a plurality of (four in this embodiment) wheels 2 supported by the body frame BF, a wheel drive device 3 which rotates each wheel 2 independently, and a camber angle adjustment device 4 which performs steering, adjustment of a camber angle, and the like of each wheel 2, and is configured to achieve an improvement in driving performance and fuel saving by controlling the camber angle of the wheel 2 with the vehicle control device 100 and distinctly using two types of treads provided on the wheel 2 (see FIGS. 5 and 6).

Next, the detailed configuration of each portion will be described. As shown in FIG. 1, the wheels 2 include four wheels of right and left front wheels 2FL and 2FR located on the forward side in the proceeding direction of the vehicle 1 and right and left rear wheels 2RL and 2RR located on the rear side in the proceeding direction. The front and rear wheels 2FL to 2RR are configured to be independently rotatable by a rotational driving force provided from the wheel drive devices 3.

The wheel drive device 3 is a rotational driving device for rotating each wheel 2 independently, and is configured by arranging four electric motors (FL motor 3FL to RR motor 3RR) in the respective wheels 2 (that is, as in-wheel motors), as shown in FIG. 1. In the case where a driver operates an accelerator pedal 52, the rotational driving force is provided to each wheel 2 from each wheel drive device 3, and each wheel 2 is rotated at a rotational speed according to the operation amount of the accelerator pedal 52.

The wheels 2 (front and rear wheels 2FL to 2RR) are configured such that the steering angle and the camber angle can be adjusted by the camber angle adjustment device 4. The camber angle adjustment device 4 is a drive device for adjusting the steering angle and the camber angle of each wheel 2, and a total of four (FL actuator 4FL to RR actuator 4RR) are arranged in positions corresponding to the respective wheels 2, as shown in FIG. 1.

For example, in the case where the driver operates a steering wheel 54, a part (for example, only the front wheels 2FL and 2FR side) or all of the camber angle adjustment devices 4 are driven, and the steering angle according to the operation amount of the steering wheel 54 is provided to the wheel 2. Accordingly, a steering operation of the wheel 2 is performed, and the vehicle 1 turns in a predetermined direction.

The vehicle control device 100 performs activation control of the camber angle adjustment device 4 to adjust the camber angle of the wheel 2 according to a state change of the driving state of the vehicle 1 (for example, whether being driven at a constant speed or being accelerated/decelerated, or whether proceeding straight or turning), the state of a road surface G (for example, whether the road surface is dry or the road surface is wet due to rain) on which the wheels 2 are to run, for example.

Figure 2A:
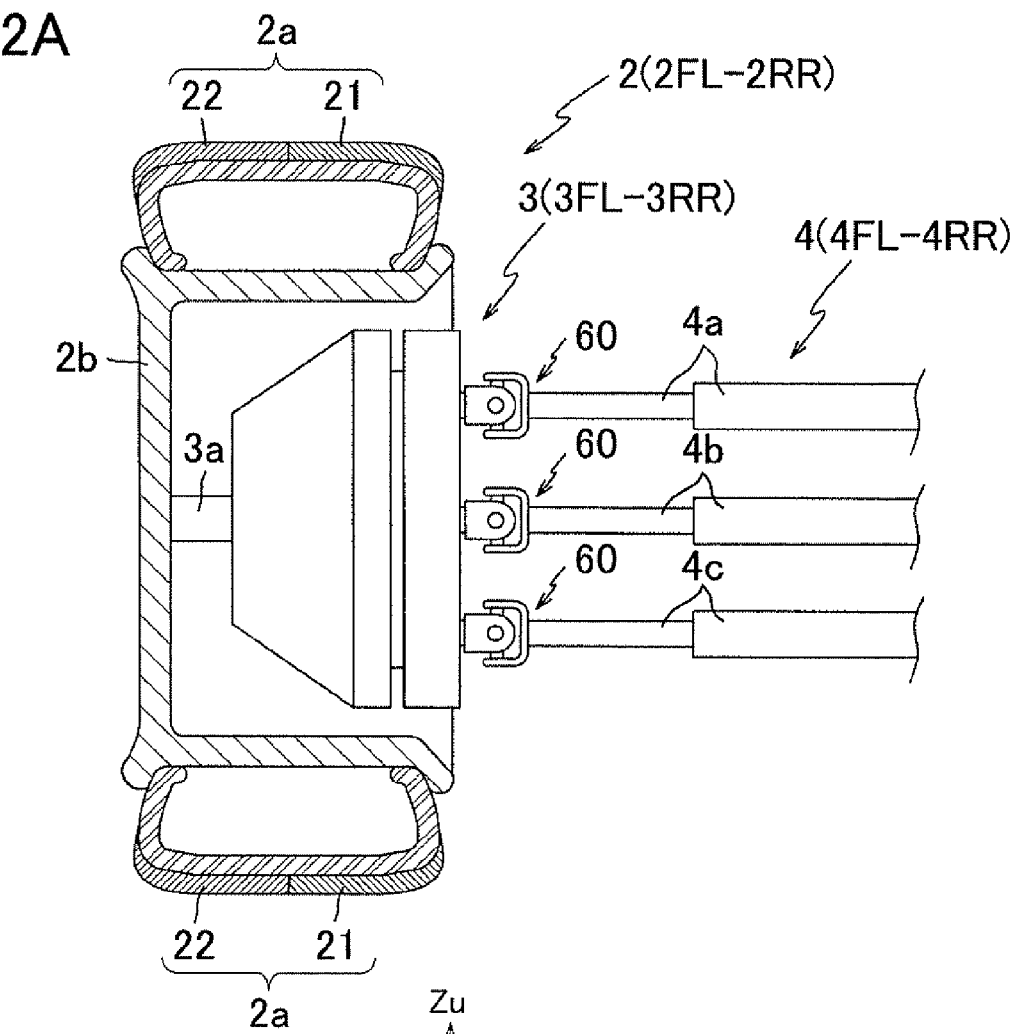
FIG. 2A is a sectional view of a wheel.
Figure 2B:
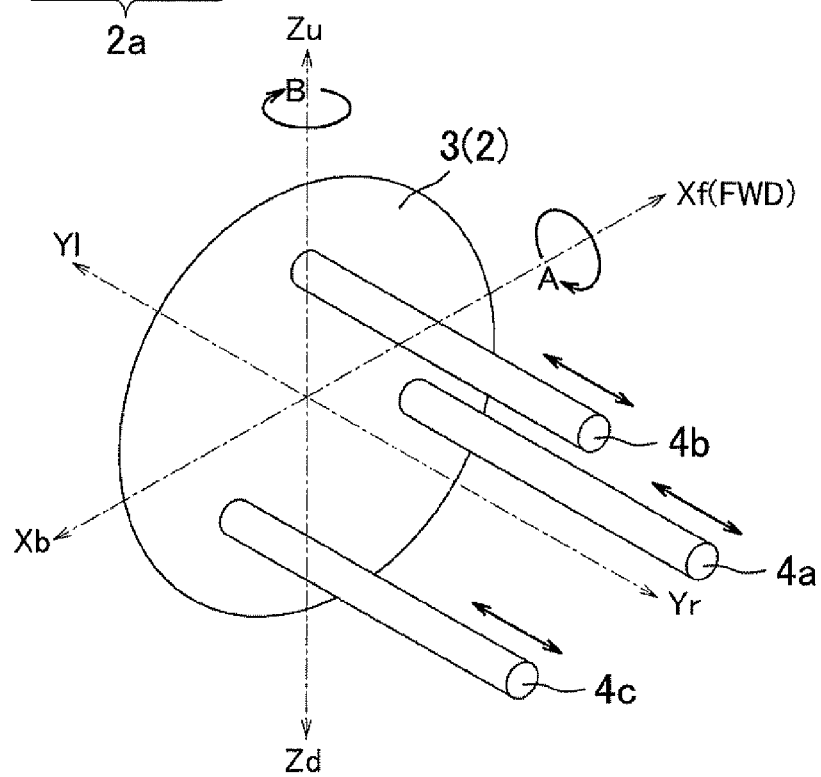
FIG. 2B is a schematic view illustrating an adjustment method of a steering angle and a camber angle of the wheel.

Referring to FIG. 2, the detailed configurations of the wheel drive device 3 and the camber angle adjustment device 4 will be described. FIG. 2A is a sectional view of the wheel 2, and FIG. 2B is a schematic view showing an adjustment method of the steering angle and the camber angle of the wheel 2.

Note that, in FIG. 2A, a power supply wiring and the like for supplying driving voltage to the wheel drive device 3 are omitted in the drawing. In FIG. 2B, a virtual axis Xf-Xb, a virtual axis Yl-Yr, and a virtual axis Zu-Zd respectively correspond to the front-back direction, the right-left direction, and the up-down direction of the vehicle 1.

As shown in FIG. 2A, the wheel 2 (front and rear wheels 2FL to 2RR) mainly includes a tire 2a configured of a rubber elastic material and a wheel rim 2b configured of an aluminum alloy or the like, and the wheel drive device 3 (FL motor 3FL to RR motor 3RR) is arranged as an in-wheel motor in an inner circumference portion of the wheel rim 2b.

The tire 2a includes a first tread 21 arranged on the inside of the vehicle 1 (right side in FIG. 2A) and a second tread 22 having a different characteristic from the first tread 21 and arranged on the outside of the vehicle 1 (left side in FIG. 2A). Note that the detailed configuration of the wheel 2 (tire 2a) will be described later with reference to FIG. 4.

In the wheel drive device 3, as shown in FIG. 2A, a drive shaft 3a protruding on the front surface side thereof (left side in FIG. 2A) is connected and fixed to the wheel rim 2b, such that the rotational driving force can be transmitted to the wheel 2 via the drive shaft 3a. On the back surface of the wheel drive device 3, the camber angle adjustment device 4 (FL actuator 4FL to RR actuator 4RR) is connected and fixed.

The camber angle adjustment device 4 includes a plurality of (three in this embodiment) hydraulic pressure cylinders 4a to 4c, and rod portions of the three hydraulic pressure cylinders 4a to 4c are connected and fixed to the back surface side (right side in FIG. 2A) of the wheel drive device 3 via a joint portion (universal joint in this embodiment) 60. Note that, as shown in FIG. 2B, the respective hydraulic pressure cylinders 4a to 4c are arranged at approximately equal intervals in the circumference direction (that is, at 120° intervals in the circumference direction), and one hydraulic pressure cylinder 4b is arranged on the virtual axis Zu-Zd.

Accordingly, by the respective hydraulic pressure cylinders 4a to 4c expanding or contracting the respective rod portions by predetermined lengths in predetermined directions, the wheel drive device 3 is swung about the virtual axes Xf-Xb and Zu-Xd as the center of the swing, and a predetermined camber angle and steering angle are provided to each wheel 2 as a result.

For example, as shown in FIG. 2B, when the rod portion of the hydraulic pressure cylinder 4b is contracted and the rod portions of the hydraulic pressure cylinders 4a and 4c are expanded in a state where the wheels 2 are in neutral positions (in a state where the vehicle 1 is proceeding straight), the wheel drive device 3 is rotated about the virtual axis Xf-Xb (as shown by an arrow A in FIG. 2B), and a camber angle (angle formed by a center line of the wheel 2 with respect to the virtual axis Zu-Zd) in a minus direction (as a negative camber) is provided to the wheel 2. On the other hand, when the hydraulic pressure cylinder 4b and the hydraulic pressure cylinders 4a and 4c are respectively expanded or contracted in the opposite directions, a camber angle in a plus direction (as a positive camber) is provided to the wheel 2.

When the rod portion of the hydraulic pressure cylinder 4a is contracted and the rod portion of the hydraulic pressure cylinder 4c is expanded in the state where the wheels 2 are in the neutral positions (state where the vehicle 1 is proceeding straight), the wheel drive device 3 is rotated about the virtual axis Zu-Zd (as shown by an arrow B in FIG. 2B), and a steering angle (which is an angle formed by the center line of the wheel 2 with respect to a reference line of the vehicle 1 and is an angle determined regardless of the proceeding direction of the vehicle 1) in a toe-in direction is provided to the wheel 2. On the other hand, when the hydraulic pressure cylinder 4a and the hydraulic pressure cylinder 4c are expanded or contracted in the opposite directions, a steering angle in a toe-out direction is provided to the wheel 2.

Note that the driving methods of the respective hydraulic pressure cylinders 4a to 4c exemplified herein are described for the case of driving from the state where the wheels 2 are in the neutral positions as described above. By combining the driving methods to control the expansion and contraction of the respective hydraulic pressure cylinders 4a to 4c, an arbitrary camber angle and steering angle can be provided to the wheel 2.

Returning to FIG. 1, the accelerator pedal 52 and a brake pedal 53 are operation members operated by the driver, and the driving speed or the braking force of the vehicle 1 is determined and the activation control of the wheel drive device 3 is performed according to the depression state (such as depression amount or depression speed) of each of the pedals 52 and 53.

The steering wheel 54 is an operation member operated by the driver, and a turning radius and the like of the vehicle 1 are determined, and the activation control of the camber angle adjustment device 4 is performed according to the operation state (such as rotation angle or rotational speed) thereof. A wiper switch 55 is an operation member operated by the driver, and the activation control of a wiper (not shown) is performed according to the operation state (such as operation position) thereof.

In the same manner, a turn signal switch 56 and a high grip switch 57 are operation members operated by the driver, and the activation control of a turn signal (not shown) is performed in the case of the former and the activation control of the camber angle adjustment device 4 is performed in the case of the latter according to the operation states (such as operation positions) thereof.

Note that a state where the high grip switch 57 is turned on corresponds to a state where high grip performance is selected as the characteristic of the wheel 2, and a state where the high grip switch 57 is turned off corresponds to a state where low rolling resistance is selected as the characteristic of the wheel 2.

The vehicle control device 100 is a vehicle control device for controlling the respective portions of the vehicle 1 configured as described above, and controls, for example, the rotational speed of each wheel 2 by detecting the operation state of each of the pedals 52 and 53 and activating the wheel drive device 3 according to the detection result thereof.

Alternatively, the operation states of the accelerator pedal 52, the brake pedal 53, and the steering wheel 54 are detected, the camber angle adjustment device 4 is activated according to the detection results thereof, and the camber angle of each wheel is adjusted, such that the two types of treads 21 and 22 provided on the wheel 2 are used distinctly (see FIGS. 5 and 6) to achieve an improvement in the driving performance and fuel saving. The detailed configuration of the vehicle control device 100 will now be described with reference to FIG. 3.

Figure 3:
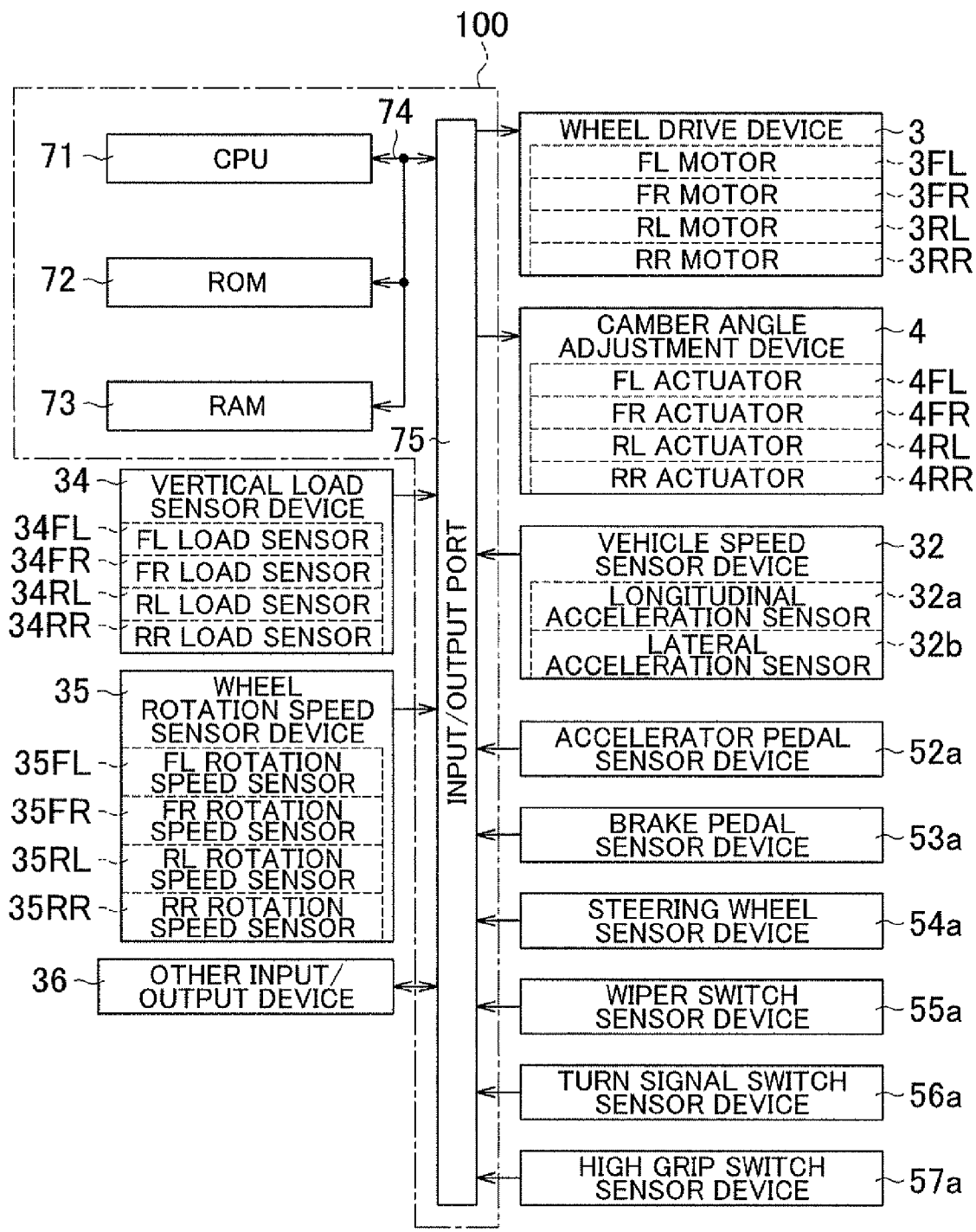
FIG. 3 is a block diagram showing the electrical configuration of the vehicle control device.

FIG. 3 is a block diagram showing the electrical configuration of the vehicle control device 100. As shown in FIG. 3, the vehicle control device 100 includes a CPU 71, a ROM 72, and a RAM 73, which are connected to an input/output port 75 via a bus line 74. To the input/output port 75, a plurality of devices such as the wheel drive device 3 are connected.

Figure 7:
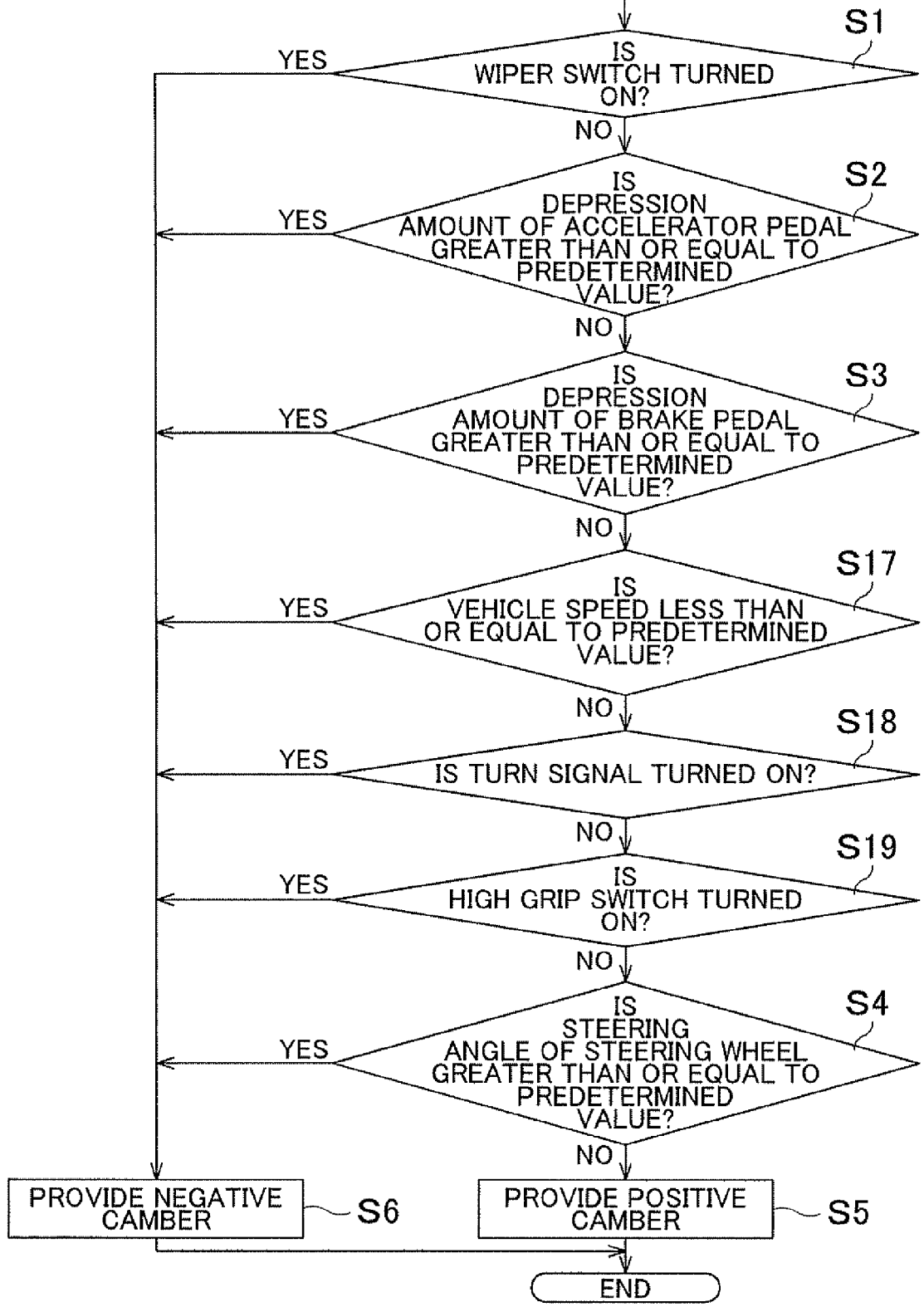
FIG. 7 is a flowchart showing a camber control process.

The CPU 71 is an arithmetic device which controls the respective portions connected by the bus line 74. The ROM 72 is a non-rewritable nonvolatile memory that stores a control program executed by the CPU 71, fixed value data, and the like, and the RAM 73 is a memory for storing various rewritable data at the time of executing the control program. Note that, in the ROM 72, a program of a flowchart (camber control process) shown in FIG. 7 is stored.

As described above, the wheel drive device 3 is a device for rotating each wheel 2 (see FIG. 1), and mainly includes the four motors, the FL motor 3FL to RR motor 3RR, which provide the rotational driving force to the respective wheels 2 and a driving circuit (not shown) which performs drive control of the respective motors 3FL to 3RR based on a command from the CPU 71.

As described above, the camber angle adjustment device 4 is a drive device for adjusting the steering angle and the camber angle of each wheel 2, and mainly includes the four actuators, the FL actuator 4FL to RR actuator 4RR, which provide the driving force for angle adjustments of the respective wheels 2 (wheel drive devices 3) and a driving circuit (not shown) which performs drive control of the respective actuators 4FL to 4RR based on a command from the CPU 71.

Note that the FL actuator 4FL to RR actuator 4RR mainly include the three hydraulic pressure cylinders 4a to 4c, a hydraulic pressure pump 4d (see FIG. 1) which supplies oil (hydraulic pressure) to the respective hydraulic pressure cylinders 4a to 4c, an electromagnetic valve (not shown) which switches the supply direction of the oil supplied from the hydraulic pressure pump to the respective hydraulic pressure cylinders 4a to 4c, and an expansion/contraction sensor (not shown) which detects the expansion/contraction amount of the respective hydraulic pressure cylinders 4a to 4c (rod portions).

When the driving circuit of the camber angle adjustment device 4 performs the drive control of the hydraulic pressure pump based on a command from the CPU 71, the respective hydraulic pressure cylinders 4a to 4c are expanded or contracted by the oil (hydraulic pressure) supplied from the hydraulic pressure pump. When the electromagnetic valve is turned on/off, the driving direction (expansion or contraction) of the respective hydraulic pressure cylinders 4a to 4c is switched.

The driving circuit of the camber angle adjustment device 4 monitors the expansion/contraction amount of the respective hydraulic pressure cylinders 4a to 4c through the expansion/contraction sensor, and the expansion/contraction of the hydraulic pressure cylinders 4a to 4c which have reached a target value (expansion/contraction amount) instructed by the CPU 71 is stopped. Note that the detection result by the expansion/contraction sensor is output from the driving circuit to the CPU 71, and the CPU 71 can obtain the current steering angle and the camber angle of each wheel 2 based on the detection result thereof.

A vehicle speed sensor device 32 is a device for detecting a ground speed (absolute value and proceeding direction) of the vehicle 1 with respect to the road surface G and outputting the detection result thereof to the CPU 71, and mainly includes longitudinal and lateral acceleration sensors 32a and 32b and a control circuit (not shown) which processes the detection results of the respective acceleration sensors 32a and 32b to be output to the CPU 71.

The longitudinal acceleration sensor 32a is a sensor which detects the acceleration of the vehicle 1 (body frame BF) in the front-back direction (up-down direction in FIG. 1), and the lateral acceleration sensor 32b is a sensor which detects the acceleration of the vehicle 1 (body frame BF) in the right-left direction (right-left direction in FIG. 1). Note that, in this embodiment, the respective acceleration sensors 32a and 32b are configured as piezoelectric sensors using a piezoelectric element.

The CPU 71 can time-integrate the detection results (acceleration values) of the respective acceleration sensors 32a and 32b input from the control circuit of the vehicle speed sensor device 32 to calculate the respective speeds in the two directions (front-back and right-left directions), and obtain the ground speed (absolute value and proceeding direction) of the vehicle 1 by synthesizing the components in the two directions.

A vertical load sensor device 34 is a device for detecting the load applied to the ground contact area of each wheel 2 from the road surface G and outputting the detection result thereof to the CPU 71, and includes FL load sensor 34FL to RR load sensor 34RR which respectively detect the loads applied to the respective wheels 2, and a processing circuit (not shown) which processes the detection results of the respective load sensors 34FL to 34RR to be output to the CPU 71.

Note that, in this embodiment, the respective load sensors 34FL to 34RR are configured as piezoresistive three-shaft load sensors. The respective load sensors 34FL to 34RR are arranged on a suspension shaft (not shown) of the respective wheels 2, and detect the loads applied to the wheels 2 described above from the road surface G in three directions of the front-back direction (virtual axis Xf-Xb direction), the right-left direction (virtual axis Yl-Yr direction), and the up-down direction (virtual axis Zu-Zd direction) of the vehicle 1 (see FIG. 2B).

The CPU 71 estimates a friction coefficient k of the road surface C in the ground contact area of each wheel 2 in the following manner from the detection result (vertical load) of the each of the load sensors 34FL to 34RR input from the vertical load sensor device 34.

For example, looking at the front wheel 2FL, if the loads in the front-back direction, the right-left direction, and the up-down direction of the vehicle 1 detected by the FL load sensor 34FL are respectively Fx, Fy, and Fz, the friction coefficient 11 of the road surface G in a portion corresponding to the ground contact area of the front wheel 2FL in the front-back direction of the vehicle 1 is Fx/Fz ($\mu x=Fx/Fz$) in a slip state where the front wheel 2FL is slipping with respect to the road surface G, and is estimated to be a greater value than Fx/Fz ($\mu x>Fx/Fz$) in a non-slip state where the front wheel 2FL is not slipping with respect to the road surface G.

Note that a friction coefficient $\mu y$ in the right-left direction of the vehicle 1 is shown as $\mu y=Fy/Fz$ in the slip state and is estimated to be greater than Fy/Fz in the non-slip state in the same manner. The friction coefficient $\mu$ can obviously be detected by other methods. Examples of other methods include known technology disclosed in Japanese Patent Application Publication No. JP-A-2001-315633 and Japanese Patent Application Publication No. JP-A-2003-118554.

A wheel rotation speed sensor device 35 is a device for detecting the rotational speed of each wheel 2 and outputting the detection result thereof to the CPU 71, and includes four rotation sensors, FL rotation speed sensor 35FL to RR rotation speed sensor 35RR, which respectively detect the rotational speeds of the respective wheels 2 and a processing circuit (not shown) which processes the detection results of the respective rotation speed sensors 35FL to 35RR to be output to the CPU 71.

Note that, in this embodiment, the respective rotation speed sensors 35FL to 35RR are provided on the respective wheels 2, and detect the angular speeds of the respective wheels 2 as the rotational speeds. That is, the respective rotation speed sensors 35FL to 35RR are configured as electromagnetic pickup sensors including a rotation body which rotates in conjunction with each wheel 2 and a pickup which electromagnetically detects the presence or absence of a number of teeth formed in the circumference direction of the rotation body.

The CPU 71 can obtain the actual circumference speed of each wheel 2 from the rotational speed of each wheel 2 input from the wheel rotation speed sensor device 35 and the outer diameter of each wheel 2 stored in the ROM 72 in advance, and can determine whether each wheel 2 is slipping by comparing the circumference speed thereof and the driving speed (ground speed) of the vehicle 1.

An accelerator pedal sensor device 52a is a device for detecting the operation state of the accelerator pedal 52 and outputting the detection result thereof to the CPU 71, and mainly includes an angle sensor (not shown) which detects the depression state of the accelerator pedal 52 and a control circuit (not shown) which processes the detection result of the angle sensor to be output to the CPU 71.

A brake pedal sensor device 53a is a device for detecting the operation state of the brake pedal 53 and outputting the detection result thereof to the CPU 71, and mainly includes an angle sensor (not shown) which detects the depression state of the brake pedal 53 and a control circuit (not shown) which processes the detection result of the angle sensor to be output to the CPU 71.

A steering wheel sensor device 54a is a device for detecting the operation state of the steering wheel 54 and outputting the detection result thereof to the CPU 71, and mainly includes an angle sensor (not shown) which detects the operation state of the steering wheel 54 and a control circuit (not shown) which processes the detection result of the angle sensor to be output to the CPU 71.

A wiper switch sensor device 55a is a device for detecting the operation state of the wiper switch 55 and outputting the detection result thereof to the CPU 71, and mainly includes a positioning sensor (not shown) which detects the operation state (operation position) of the wiper switch 55 and a control circuit (not shown) which processes the detection result of the positioning sensor to be output to the CPU 71.

A turn signal switch sensor device 56a is a device for detecting the operation state of the turn signal switch 56 and outputting the detection result thereof to the CPU 71, and mainly includes a positioning sensor (not shown) which detects the operation state (operation position) of the turn signal switch 56 and a control circuit (not shown) which processes the detection result of the positioning sensor to be output to the CPU 71.

A high grip switch sensor device 57a is a device for detecting the operation state of the high grip switch 57 and outputting the detection result thereof to the CPU 71, and mainly includes a positioning sensor (not shown) which detects the operation state (operation position) of the high grip switch 57 and a control circuit (not shown) which processes the detection result of the positioning sensor to be output to the CPU 71.

Note that, in this embodiment, the respective angle sensors are configured as contact-type potentiometers using electrical resistance. The CPU 71 can obtain the depression amount of each of the pedals 52 and 53 and the steering angle of the steering wheel 54 from the detection results input from the control circuits of the respective sensor devices 52a to 54a, and obtain the depression speed (operation speed) of each of the pedals 52 and 53 and the rotational speed (operation speed) of the steering wheel 54 by time-integrating the detection results thereof.

Examples of other input/output devices 35 shown in FIG. 3 include a rainfall sensor which detects the rainfall or an optical sensor which detects the state of the road surface G without contact.

Figure 4:
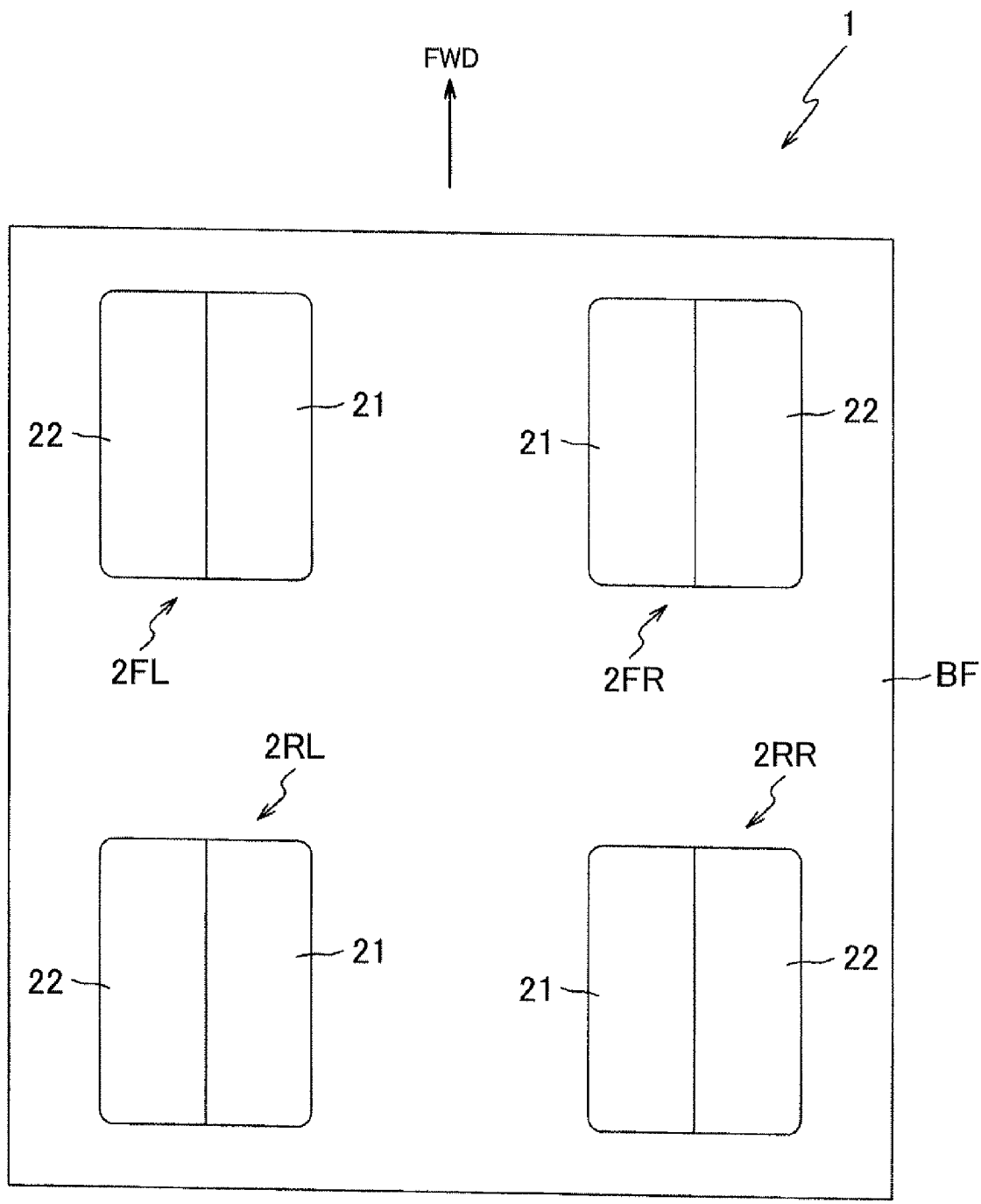
FIG. 4 is a schematic view showing a top view of the vehicle.
Figure 5:
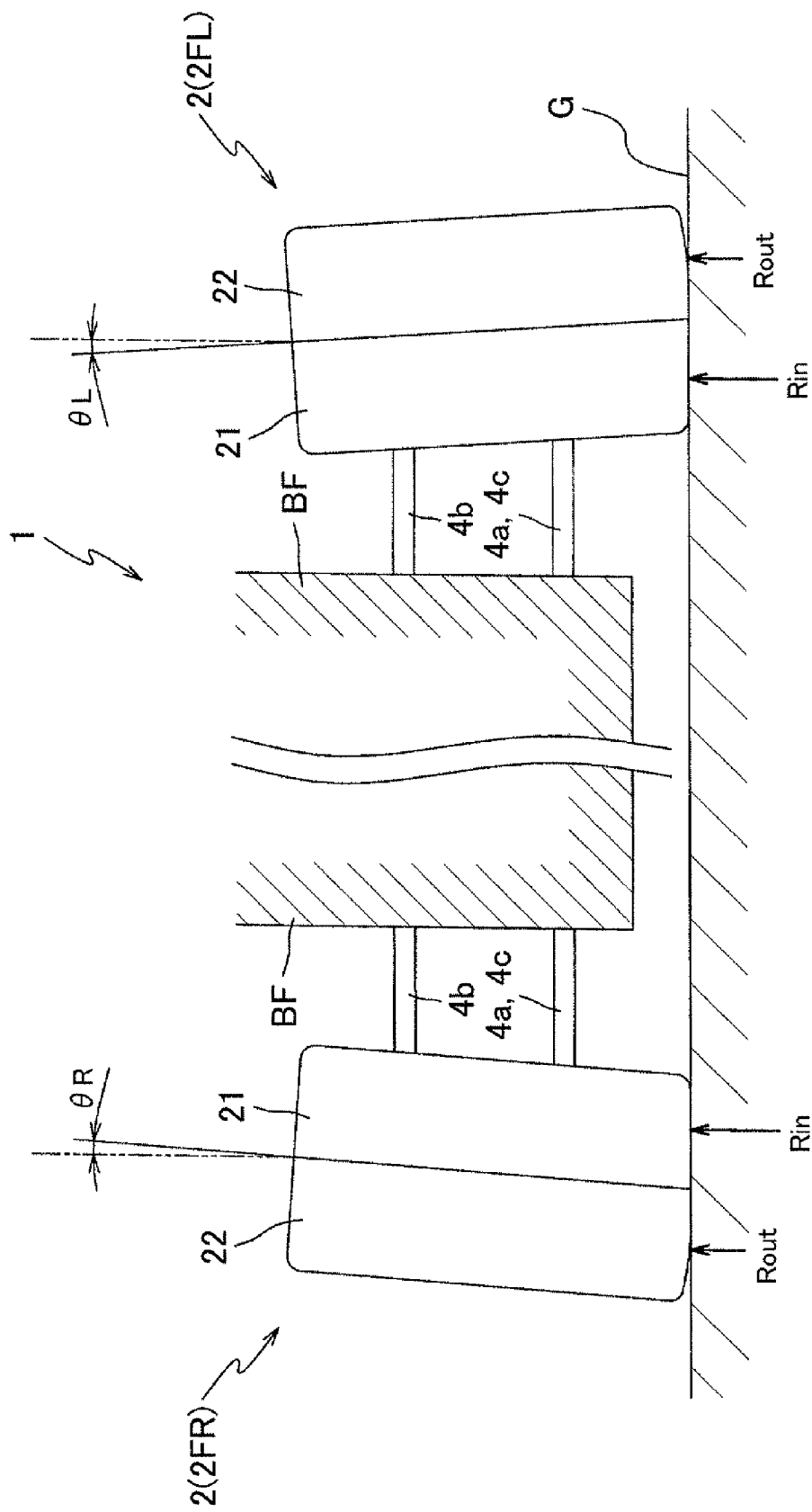
FIG. 5 is a schematic view showing a front view of the vehicle in a state where the wheel is provided with a negative camber.
Figure 6:
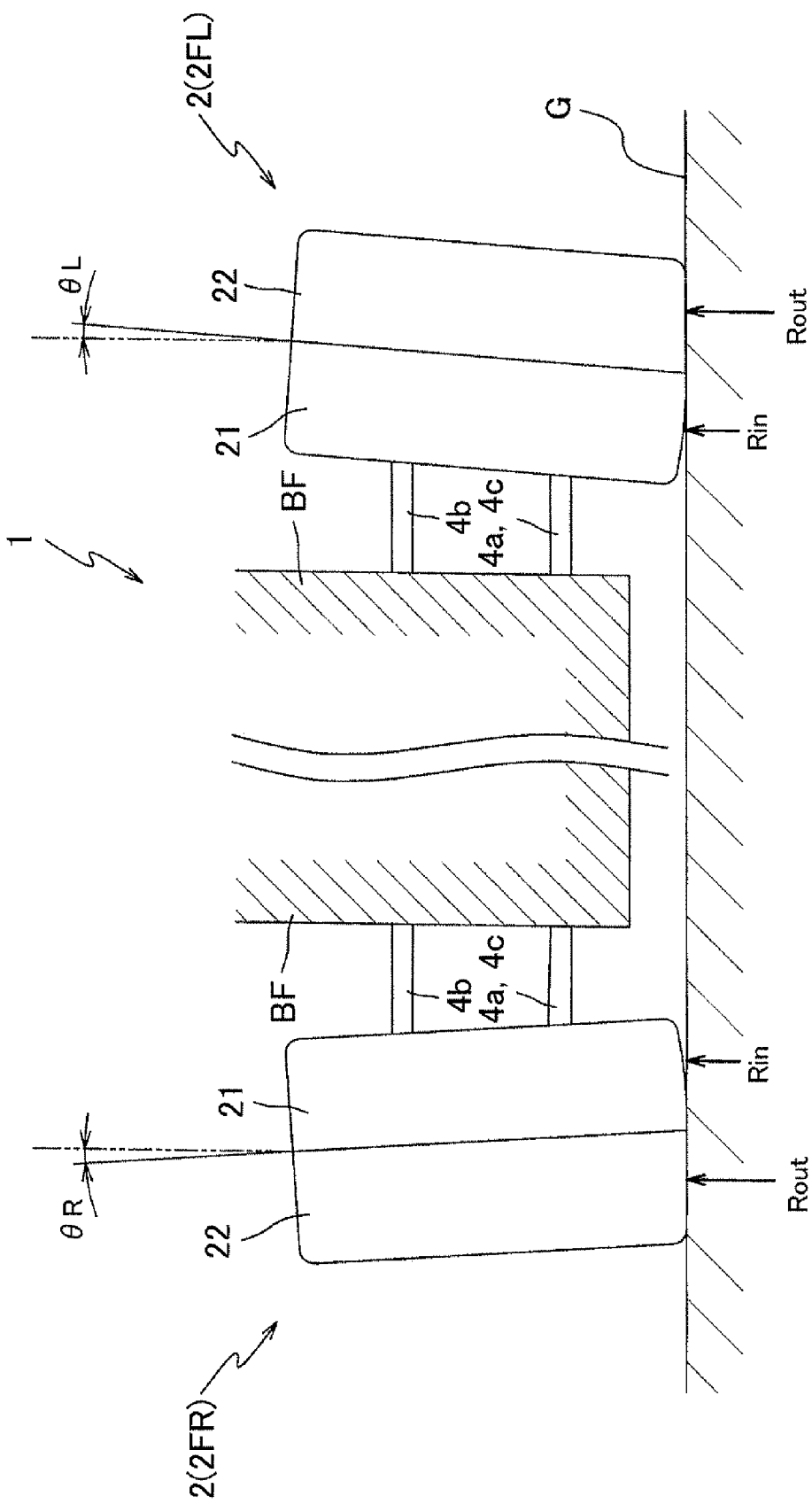
FIG. 6 is a schematic view showing a front view of the vehicle in a state where the wheel is provided with a positive camber.

Next, the detailed configuration of the wheel 2 will be described with reference to FIGS. 4 to 6. FIG. 4 is a schematic view showing the top view of the vehicle 1. FIGS. 5 and 6 are schematic views showing the front views of the vehicle 1. FIG. 5 shows a state where the wheel 2 is provided with a negative camber, and FIG. 6 shows a state where the wheel 2 is provided with a positive camber.

As described above, the wheel 2 includes the two types of treads, the first tread 21 and the second tread 22. As shown in FIG. 4, in each of the wheels 2 (front wheels 2FL and 2FR and rear wheels 2RL and 2RR), the first tread 21 is arranged on the inside of the vehicle 1, and the second tread 22 is arranged on the outside of the vehicle 1.

In this embodiment, the two treads 21 and 22 are configured to have the same width dimensions (dimensions in the right-left direction in FIG. 4). The first tread 21 is configured to have a characteristic of a higher grip force (higher grip performance) compared to the second tread 22. On the other hand, the second tread 22 is configured to have a characteristic of a smaller rolling resistance (lower rolling resistance) compared to the first tread 21.

For example, when the activation control of the camber angle adjustment device 4 is performed and camber angles θL and θR of the wheels 2 are adjusted in the minus direction (as negative cambers) as shown in FIG. 5, a ground contact pressure Rin in the first tread 21 arranged on the inside of the vehicle 1 is increased and a ground contact pressure Rout in the second tread 22 arranged on the outside of the vehicle 1 is decreased. Accordingly, by leveraging the high grip performance of the first tread 21, the driving performance (for example, the turning performance, the acceleration performance, the braking performance, or the vehicle stability in rain) can be improved.

On the other hand, when the activation control of the camber angle adjustment device 4 is performed and the camber angles θL and θR of the wheels 2 are adjusted in the plus direction (positive camber direction) as shown in FIG. 6, the ground contact pressure in the first tread 21 arranged on the inside of the vehicle 1 is decreased and the ground contact pressure in the second tread 22 arranged on the outside of the vehicle 1 is increased. Accordingly, by leveraging the low rolling resistance of the second tread 22, the fuel saving performance can be improved.

Next, a camber control process will be described with reference to FIG. 7. FIG. 7 is a flowchart showing the camber control process. This process is a process executed repeatedly (for example, at intervals of 0.2 ms) by the CPU 71 while the power source of the vehicle control device 100 is on, such that the compatibility between two performances of the driving performance and the fuel saving performance described above is provided by adjusting the camber angle provided to the wheel 2.

The CPU 71 first determines whether the wiper switch 55 is turned on, i.e., whether a wiping operation of a wiper for a windshield is instructed by the driver (S1), regarding the camber control process. In the case where it is determined that the wiper switch 55 is turned on as a result (S1: Yes), it is estimated that there is a possibility of the current weather being rainy and a water film being formed on the road surface A, and therefore the negative camber is provided to the wheel 2 (S6) to terminate the camber control process.

Accordingly, the ground contact pressure Rin in the first tread 21 is increased and the ground contact pressure Rout in the second tread 22 is decreased (see FIG. 5). Thus, the vehicle stability in rain can be improved leveraging the high grip performance of the first tread 21.

In the case where it is determined that the wiper switch 55 is not turned on in the process of S1 (S1: No), it is estimated that it is not rainy and the state of the road surface G is good, and therefore whether the depression amount of the accelerator pedal 52 is greater than or equal to a predetermined value, i.e., whether an acceleration of a predetermined level or greater (sudden acceleration) is instructed by the driver, is determined next (S2).

In the case where it is determined that the depression amount of the accelerator pedal 52 is greater than or equal to the predetermined value as a result (S2: Yes), the sudden acceleration is instructed by the driver and the wheel 2 may slip. Thus, the negative camber is provided to the wheel 2 (S6) to terminate the camber process.

Accordingly, in the same manner as the case described above, the ground contact pressure Rin in the first tread 21 is increased and the ground contact pressure Rout in the second tread 22 is decreased (see FIG. 5). Thus, a slip of the wheel 2 can be prevented and the acceleration performance of the vehicle 1 can be improved by leveraging the high grip performance of the first tread 21.

In the case where it is determined that the depression amount of the accelerator pedal 52 does not reach the predetermined value in the process of S2 (S2: No), the sudden acceleration is not instructed and it is estimated as moderate acceleration or constant-speed driving. Thus, whether the depression amount of the brake pedal 53 is greater than or equal to a predetermined value, i.e., whether a brake of a predetermined level or greater (sudden brake) is instructed by the driver, is determined next (S3).

in the case where it is determined that the depression amount of the brake pedal 53 is greater than or equal to the predetermined value as a result (S3: Yes), the sudden brake is instructed by the driver and the wheel 2 may lock. Thus, the negative camber is provided to the wheel 2 (S6) to terminate the camber process.

Accordingly, in the same manner as the case described above, the ground contact pressure Rin in the first tread 21 is increased and the ground contact pressure Rout in the second tread 22 is decreased (see FIG. 5). Thus, a lock of the wheel 2 can be prevented and the braking performance of the vehicle 1 can be improved by leveraging the high grip performance of the first tread 21.

In the case where it is determined that the depression amount of the brake pedal 53 does not reach the predetermined value in the process of S3 (S3: No), the sudden brake is not instructed and it is estimated as moderate brake or constant-speed driving. Thus, whether the vehicle speed (ground speed) is less than or equal to a predetermined value (for example, 15 km per hour), i.e., whether it is a low-speed driving, is determined next (S17).

In the case where it is determined that the vehicle speed is less than or equal to the predetermined value (that is, in the low-speed driving) as a result (S17: Yes), the vehicle 1 has a higher possibility of then decelerating to stop or accelerating compared to a case where the vehicle speed exceeds the predetermined value. Thus, in such cases, since it is necessary to ensure the grip force or the stopping force of the vehicle 1 (wheel 2) in advance, the negative camber is provided to the wheel 2 (S6) to terminate the camber process.

Accordingly, in the same manner as the case described above, the ground contact pressure Rin in the first tread 21 is increased and the ground contact pressure Rout in the second tread 22 is decreased (see FIG. 5). Thus, a lock or a slip of the wheel 2 can be prevented by increasing the grip force to improve the braking performance and the acceleration performance of the vehicle 1 by leveraging the high grip performance of the first tread 21.

Since the stopping force of the vehicle 1 (wheel 2) can be ensured by leveraging the high grip performance of the first tread 21 after the vehicle 1 is stopped, the vehicle 1 can be stopped in a stable state. Further, in the case of restarting after the stop, the ground contact pressure Rin is increased in advance, so that the wheel 2 can be prevented from slipping. Thus, the restart of the vehicle 1 can be performed smoothly and promptly.

In the case where it is determined that the vehicle speed is higher than the predetermined value in the process of S17 (S17: No), the vehicle speed is not low and it is estimated that the driving force or braking force at the time of acceleration or deceleration has a relatively small value. Thus, whether the turn signal switch 56 is turned on, i.e., whether a command for a right or left turn or a lane change is made by the driver, is determined next (S18).

In the case where it is determined that the turn signal switch 56 is turned on as a result (S18: Yes), there is a high possibility that a turning operation of the vehicle 1 or a deceleration as a preparation therefor is performed along with the right or left turn or the lane change. Thus, the negative camber is provided to the wheel 2 (S6) to terminate the camber process.

Accordingly, in the same manner as the case described above, the ground contact pressure Rin in the first tread 21 is increased and the ground contact pressure Rout in the second tread 22 is decreased (see FIG. 5). Thus, a slip of the wheel 2 can be prevented and the turning performance of the vehicle 1 can be improved by leveraging the high grip performance of the first tread 21.

In the case where it is determined that the turn signal switch 56 is not turned on in the process of S18 (S18: No), it is estimated that the turning operation of the vehicle 1 along with the right or left turn or the lane change is not performed. Thus, whether the high grip switch 57 is turned on, i.e., whether selection of the high grip performance as the characteristic of the wheel 2 is instructed by the driver, is determined next (S19).

In the case where it is determined that the high grip switch 57 is turned on as a result (S19: Yes), the high grip performance is selected as the characteristic of the wheel 2. Thus, the negative camber is provided to the wheel 2 (S6) to terminate the camber process.

Accordingly, in the same manner as the case described above, the ground contact pressure Rin in the first tread 21 is increased and the ground contact pressure Rout in the second tread 22 is decreased (see FIG. 5). Thus, a slip of the wheel 2 can be prevented and the braking performance, the acceleration performance, or the turning performance of the vehicle 1 can be improved by leveraging the high grip performance of the first tread 21.

In the case where it is determined that the high grip switch 57 is not turned on in the process of S19 (S19: No), whether the steering angle of the steering wheel 54 is greater than or equal to a predetermined value, i.e., whether a turn of a predetermined level or greater (tight turn) is instructed by the driver, is determined next (S4).

In the case where it is determined that the steering angle of the steering wheel 54 is greater than or equal to the predetermined value as a result (S4: Yes), the tight turn is instructed by the driver and the wheel 2 may slip to spin the vehicle 1. Thus, the negative camber is provided to the wheel 2 (S6) to terminate the camber process.

Accordingly, in the same manner as the case described above, the ground contact pressure Rin in the first tread 21 is increased and the ground contact pressure Rout in the second tread 22 is decreased (see FIG. 5). Thus, a slip of the wheel 2 (spin of the vehicle 1) can be prevented and the turning performance of the vehicle 1 can be improved by leveraging the high grip performance of the first tread 21.

On the other hand, in the case where it is determined that the steering angle of the steering wheel 54 does not reach the predetermined value in the process of S4 (S4: No), the tight turn is not instructed and it is estimated from the processes of S1 to S3 that it is a moderate turn or a straight-ahead driving, and that the road surface is in a good state and the sudden acceleration or the sudden brake is not instructed (S1: No, S2: No, S3: No).

Thus, in this case (St: No, S2: No, S3: No, S4: No), since it can be determined that it is not necessary to obtain the high grip performance as the performance of the wheel 2 and that it is preferable to obtain the fuel saving performance by the low rolling resistance, the positive camber is provided to the wheel 2 (S5) to terminate the camber process.

Accordingly, the ground contact pressure Rin in the first tread 21 is decreased and the ground contact pressure Rout in the second tread 22 is increased (see FIG. 6). Thus, the rolling efficiency of the wheel 2 can be improved and the fuel saving performance of the vehicle 1 can be improved by leveraging the low rolling resistance of the second tread 21.

In this manner, in this embodiment, the compatibility can be provided between the two performances of the acceleration performance/braking performance and the fuel saving performance which conflict with each other, by adjusting the camber angles θR and θL of the wheel 2 with the camber angle adjustment device 4 to change the ratio of the ground contact pressure Rin in the first tread 21 and the ground contact pressure Rout in the second tread 22.

Figure 8:
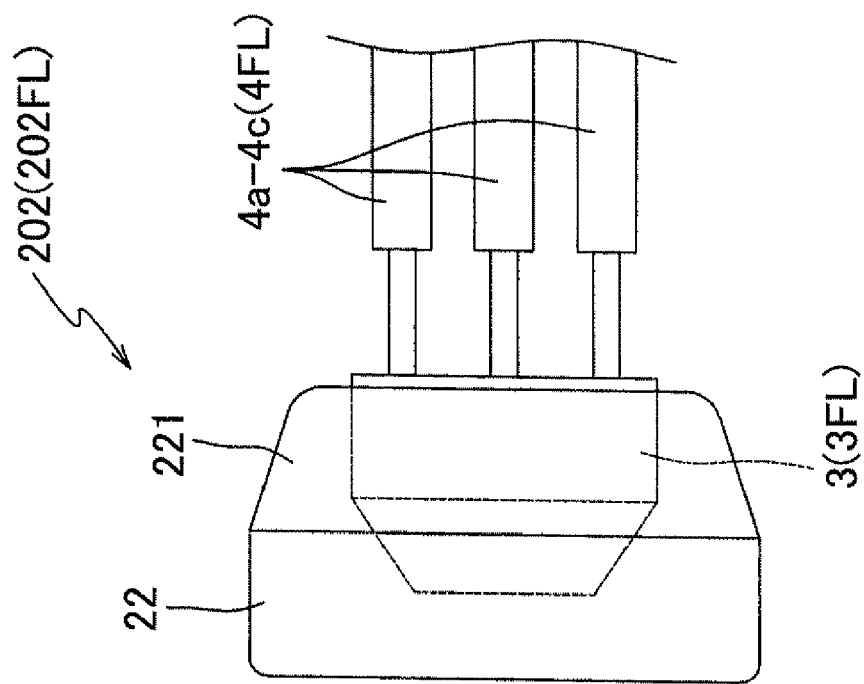
FIG. 8 is a top view of a wheel according to a second embodiment.

Next, a second embodiment will be described with reference to FIGS. 8 to 11. FIG. 8 is a top view of a wheel 202 of the second embodiment, and FIG. 9 is a schematic view showing a top view of a vehicle 201.

Figure 10:
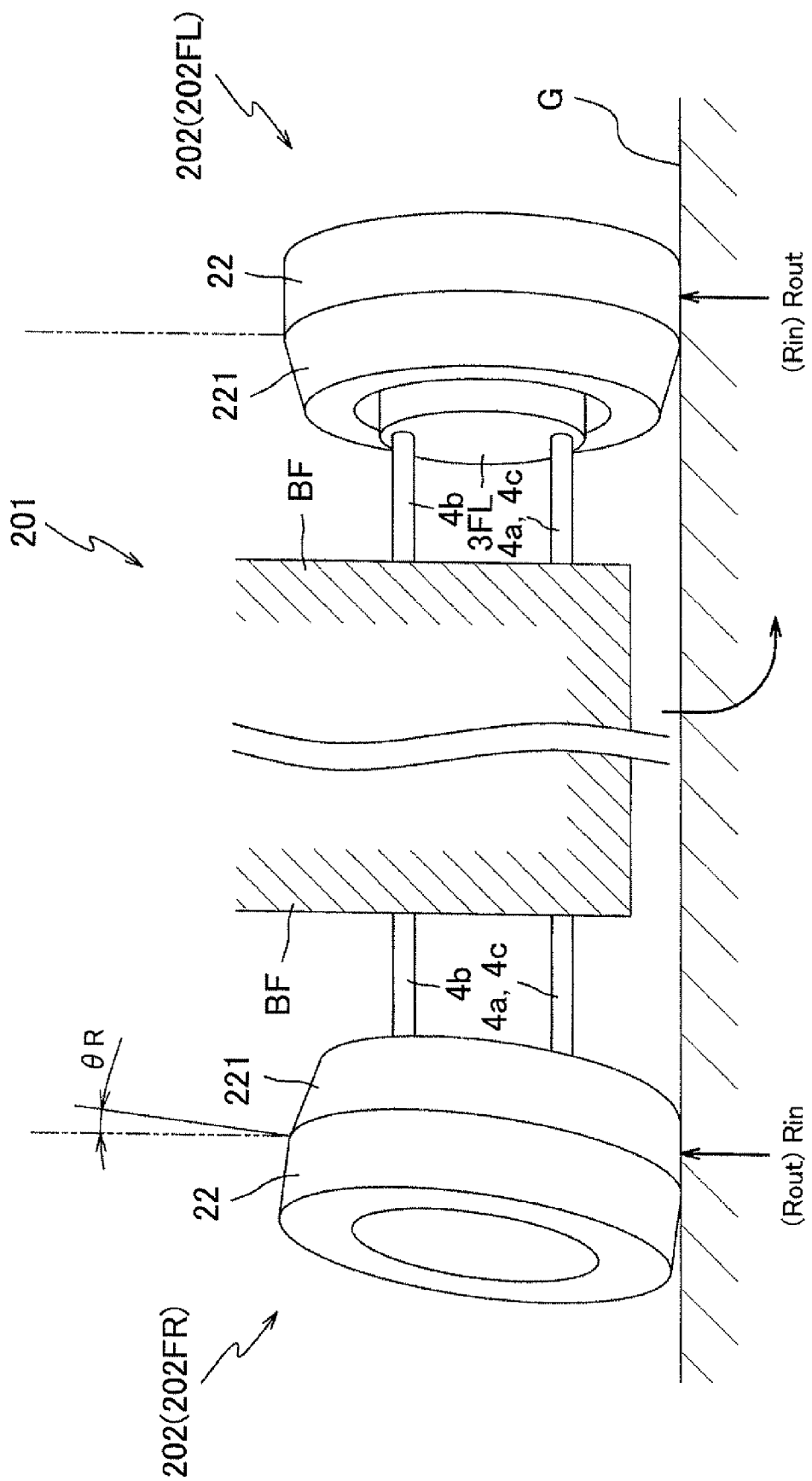
FIG. 10 is a schematic view showing a front view of the vehicle making a left turn in a state where right and left wheels are provided with steering angles for a left turn, a turning outer wheel (right front wheel) is provided with a negative camber, and a turning inner wheel (left wheel) is provided with a constant camber angle.

FIG. 10 is a schematic view showing a front view of the vehicle 201 making a left turn in a state where the right and left wheels 2 are provided with steering angles for a left turn, the turning outer wheel (right front wheel 202FR) is provided with a negative camber, and the turning inner wheel (left wheel 202FL) is provided with a constant camber angle.

In the first embodiment, the case where the outer diameters of the two treads 21 and 22 of the wheel 2 are constant in the width direction has been described, but the wheel 2 of the second embodiment is configured such that the outer diameter of a first tread 221 is gradually decreased. Note that the same portions as those of the first embodiment described above are denoted by the same reference numerals, and descriptions thereof will be omitted.

Figure 9:
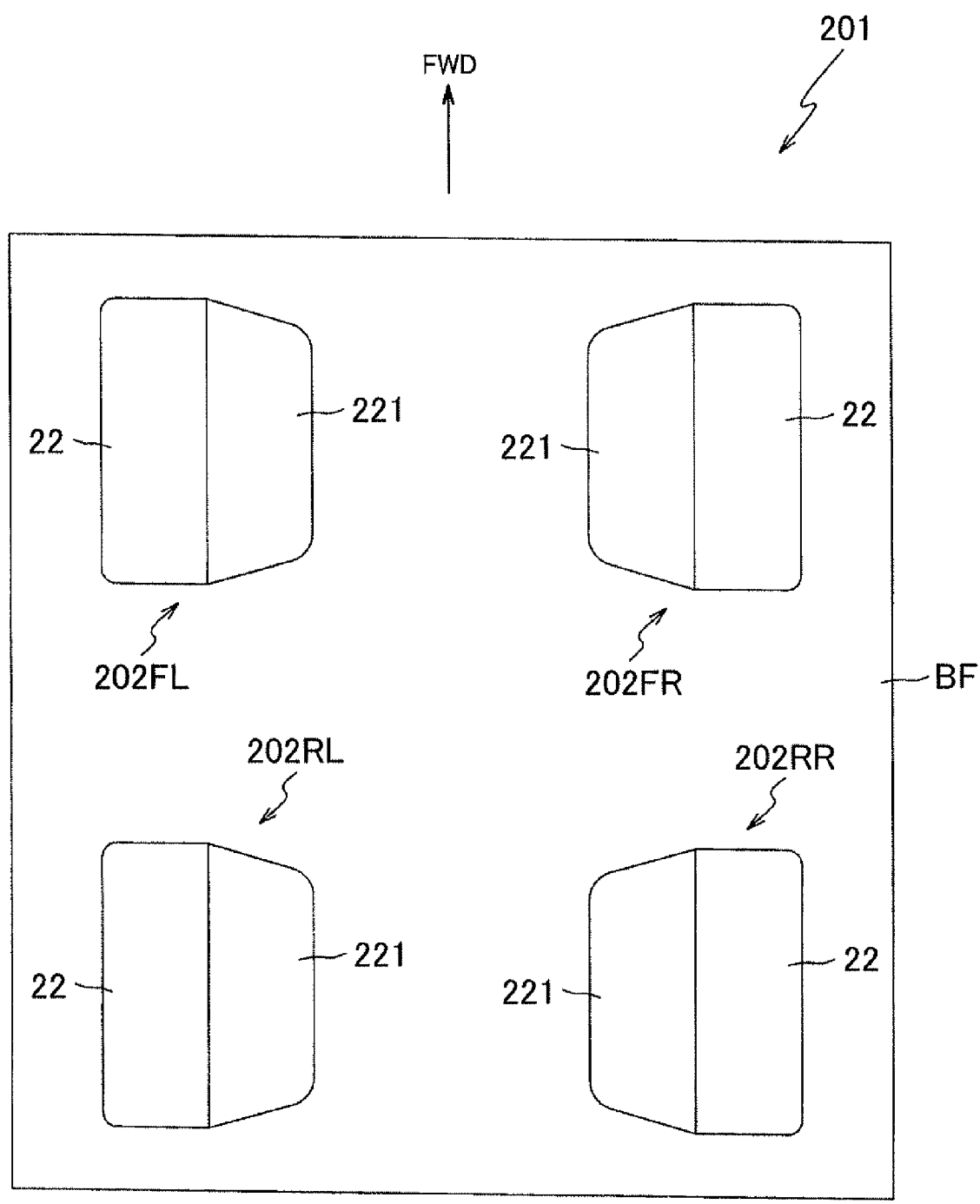
FIG. 9 is a schematic view showing a top view of a vehicle.

As shown in FIGS. 8 and 9, the wheel 202 of the second embodiment includes the first tread 221 arranged on the inside of the vehicle 201 (right side in FIG. 8) and the second tread 22 having a different characteristic from the first tread 221 and arranged on the outside of the vehicle 201 (left side in FIG. 8).

Note that the first tread 221 is configured to have a characteristic of a higher grip force (higher grip performance) compared to the second tread 22, and the second tread 22 is configured to have a characteristic of a smaller rolling resistance (lower rolling resistance) compared to the first tread 22.

As shown in FIGS. 8 and 9, although the wheel 202 is configured such that the width dimensions (dimensions in the right-left direction in FIG. 8) of the two treads 221 and 22 are the same, the second tread 22 is configured to have an outer diameter approximately constant in the width direction (right-left direction in FIG. 8) while the first tread 221 is configured to have an outer diameter which gradually decreases from the second tread 22 side (left side in FIG. 8) toward the inside of the vehicle 201 (right side in FIG. 8).

Accordingly, as shown in FIG. 10, only the second tread 22 can be caused to contact the ground in a state where the first tread 221 is away from the road surface G even if a large camber angle is not provided (i.e., the camber angle is set to 0°) in the wheel 202 (left front wheel 202FL). As a result, the rolling resistance of the entire wheel 2 can be reduced to further improve the fuel saving performance. Simultaneously, by the first tread 221 not contacting the ground and the second tread 22 contacting the ground at a smaller camber angle, the wear of the two treads 221 and 22 can be suppressed to achieve a longer duration of life.

In the case where the camber angle in the minus direction (negative camber) is provided to the wheel 202 (right front wheel 202FR) to cause the first tread 221 to contact the ground as shown in FIG. 10, the ground contact pressure on the first tread 221 can be made uniform in the entire region in the width direction (right-left direction in FIG. 8) since the outer diameter of the first tread 221 is gradually decreased, and a concentration of the ground contact pressure on a tread end portion can be suppressed.

Thus, by using the first tread 221 having the high grip performance efficiently, the driving performance (such as the turning performance, the acceleration performance, the braking performance, and the driving stability in rain) can further be improved, and the uneven wear of the first tread 221 can be suppressed to achieve a longer duration of life.

Figure 11:
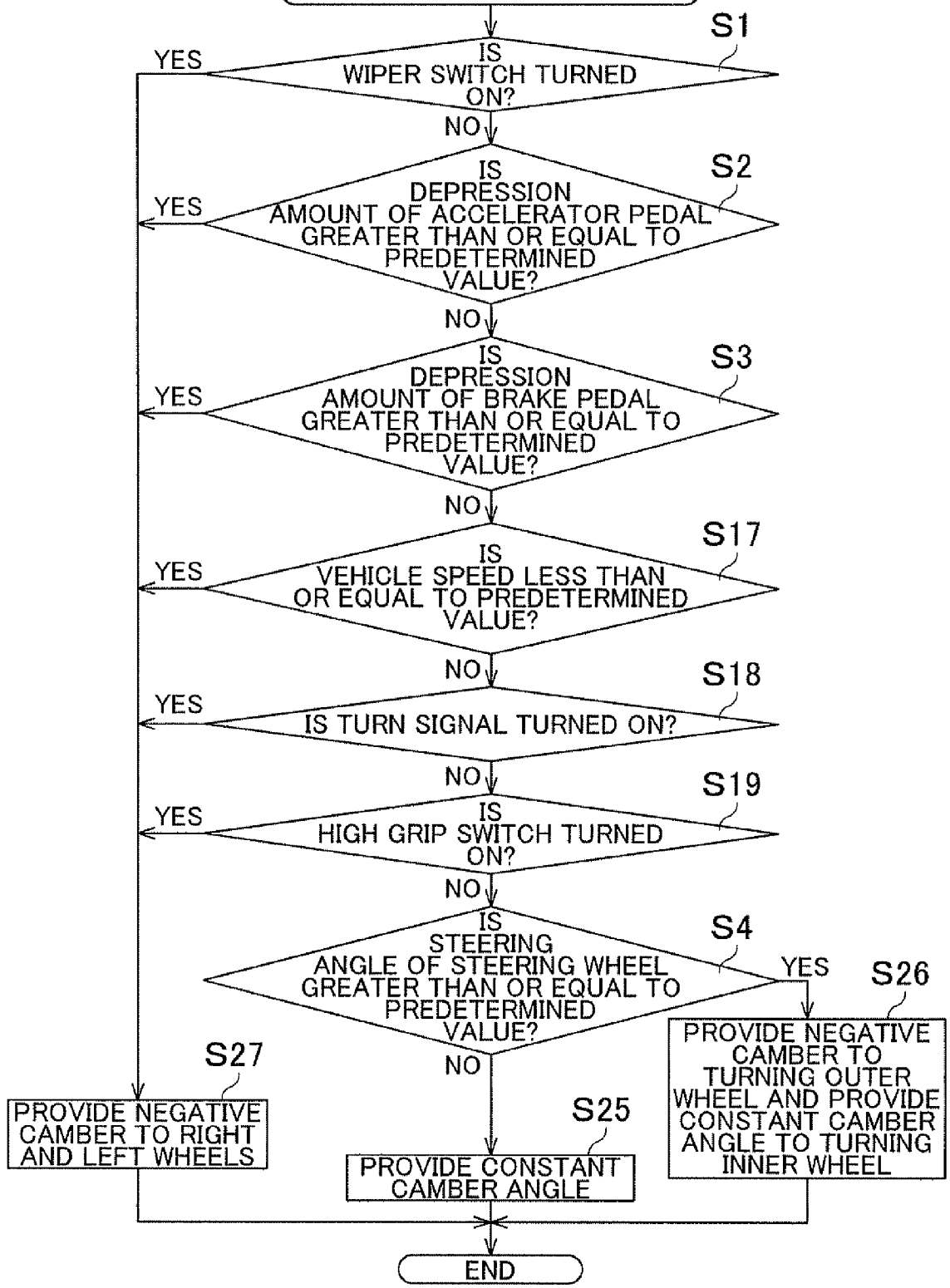
FIG. 11 is a flowchart showing a camber control process.

Next, a camber control process of the second embodiment will be described with reference to FIG. 11. FIG. 11 is a flowchart showing the camber control process. This process is a process executed repeatedly (for example, at intervals of 0.2 ms) by the CPU 71 while the power source of the vehicle control device 100 is on.

In the case where it is determined that the wiper switch 55 is turned on (S1: Yes), in the case where it is determined that the depression amount of the accelerator pedal 52 is greater than or equal to the predetermined value (S1: No, S2: Yes), in the case where it is determined that the depression amount of the brake pedal 53 is greater than or equal to the predetermined value (S1: No, S2: No, S3: Yes), in the case where it is determined that the vehicle speed is less than or equal to the predetermined value (S1: No, S2: No, S3: No, S17: Yes), in the case where it is determined that the turn signal switch 56 is turned on (S1: No, S2: No, S3: No, S17: No, S18: Yes), or in the case where it is determined that the high grip switch 57 is turned on (S1: No, S2: No, S3: No, S17: No, S18: Yes) by the CPU 71 regarding the camber control process, the water film is formed on the road surface Q the sudden acceleration or sudden brake is instructed, a generation of large driving force or stopping the vehicle is expected, the turning operation along with the right or left turn or the lane change is expected, or the selection of the high grip performance is instructed, as described above in the first embodiment, and it is necessary to leverage the high grip performance of the first tread 221.

Thus, in this case, the negative cambers (camber angles by which at least the second tread 22 is made away from the road surface C in this embodiment, see the right front wheel 202FR shown in FIG. 10) are provided to the right and left wheels 2 (S27) to terminate the camber process.

Accordingly, in the same manner as the case of the first embodiment described above, the ground contact pressure Rin in the first tread 221 is increased and the ground contact pressure Rout in the second tread 22 is decreased (the ground contact pressure Rout becomes zero in this embodiment). Thus, a slip or lock of the wheel 2 can be prevented and the driving stability and the acceleration/braking performance of the vehicle 201 can be improved by leveraging the high grip performance of the first tread 221.

Note that the camber angles $\theta R$ and $\theta L$ provided to the right and left wheels 2 are preferably the same angles during the straight-ahead driving. The camber angles $\theta R$ and $\theta L$ are preferably angles greater than those by which the second tread 22 is made away from the road surface G.

In the case where it is determined that the steering angle of the steering wheel 54 does not reach the predetermined value in the process of S4 (S4: No), the tight turn is not instructed, and it is estimated from the processes of S1 to S3 that it is a moderate turn or a straight-ahead driving, and that the road surface is in a good state, the sudden acceleration or the sudden brake is not instructed, the generation of a large driving force or stopping the vehicle is not expected, the turning operation along with the right or left turn or the lane change is not expected, and further, the selection of the high grip performance is not instructed (S1: No, S2: No, S3: No, S17: No, S18: No, S19: No).

Thus, in this case (S1: No, S2: No, S3: No, S17: No, S18: No, S19: No, S4: No), since it can be determined that it is not necessary to obtain the high grip performance as the performance of the wheel 2 and that it is preferable to obtain the fuel saving performance by the low rolling resistance, the constant camber angle is provided to the wheel 2 (S25) to terminate the camber process. Note that, in this embodiment, the constant camber angle is set to 0° (see the left front wheel 202FL shown in FIG. 10).

Accordingly, since only the second tread 22 can be caused to contact the ground in the state where the first tread 221 does not contact the road surface G, the rolling resistance of the entire wheel 202 can be reduced to further improve the fuel saving performance. In this case, by the first tread 221 not contacting the ground and the second tread 22 contacting the ground at the camber angle of 0°, the wear of the two treads 221 and 22 can be suppressed to achieve a longer duration of life.

In the case where it is determined that the steering angle of the steering wheel 54 is greater than or equal to the predetermined value in the process of S4 (S4: Yes), the tight turn is instructed by the driver, and the wheel 2 may slip to spin the vehicle 201. Thus, in this embodiment, the negative camber is provided to the turning outer wheel (right front wheel 202FR in FIG. 10) and the constant camber angle is provided (S26) to the turning inner wheel (left front wheel 202FL in FIG. 10) to terminate the camber process.

Accordingly, the cost of the control drive can be reduced while ensuring the turning performance. That is, by the ground contact pressure Rin in the first tread 221 being increased and the ground contact pressure Rout in the second tread 22 being decreased (becoming zero in this embodiment) in the turning outer wheel (see FIG. 10), a slip of the wheel 202 (spin of the vehicle 201) can be prevented and the turning performance of the vehicle 201 can be improved by leveraging the high grip performance of the first tread 221. On the other hand, by making the change of the camber angle in the turning inner wheel smaller than that of the turning outer wheel (that is, maintaining the camber angle during the straight-ahead driving), the cost of the control by the vehicle control device 100 or the cost of the drive by the camber angle adjustment device 4 can be reduced.

Figure 12:
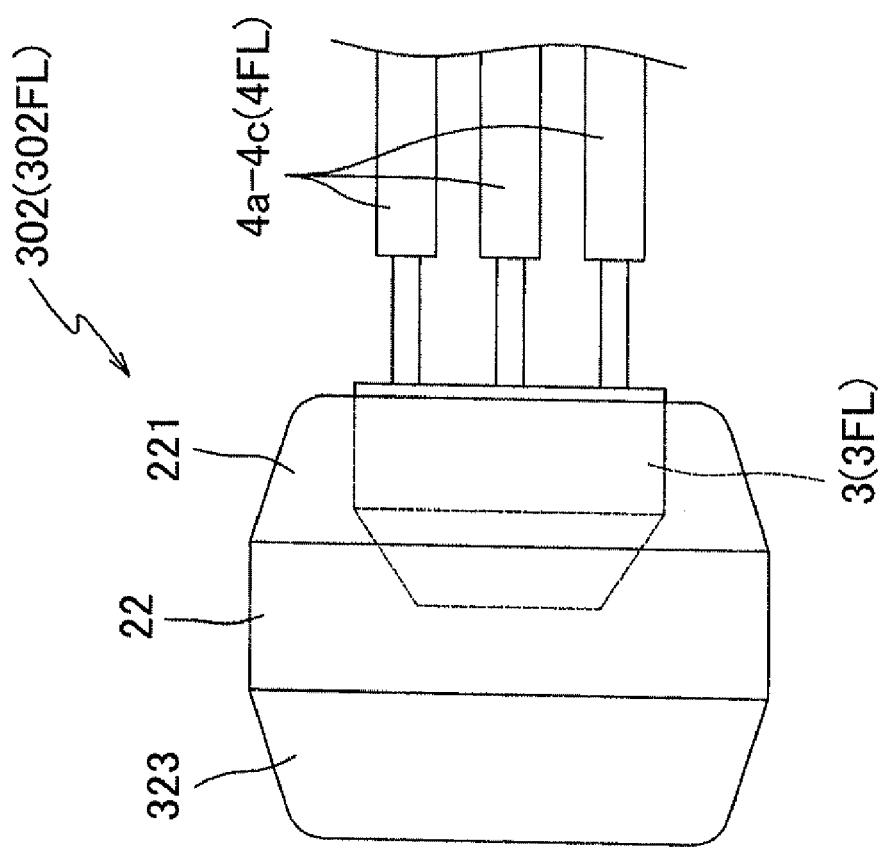
FIG. 12 is a top view of a wheel according to a third embodiment.
Figure 13:
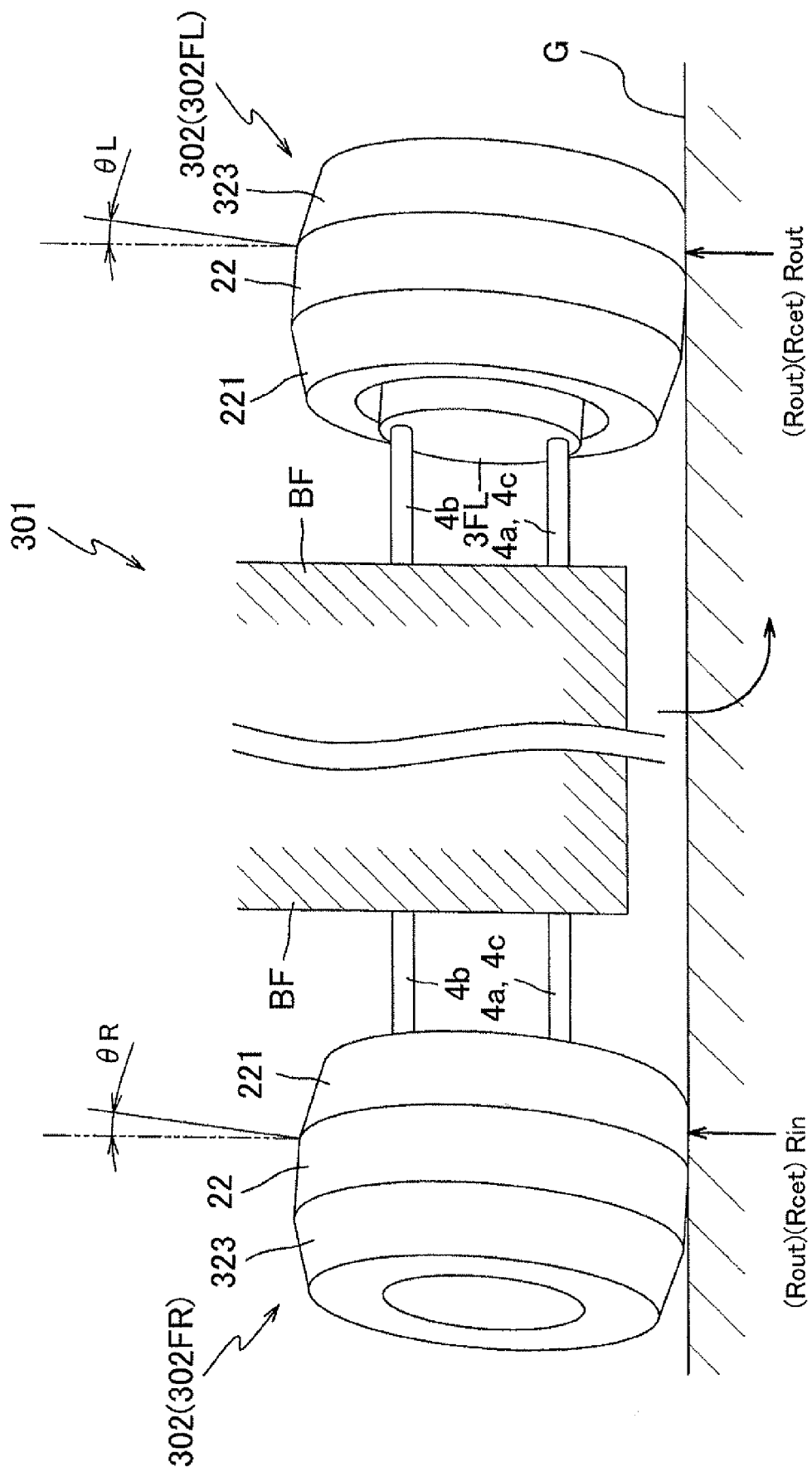
FIG. 13 is a schematic view showing a front view of a vehicle making a left turn in a state where right and left wheels are provided with steering angles for a left turn, a turning outer wheel (right front wheel) is provided with a negative camber, and a turning inner wheel (left wheel) is provided with a positive camber.
Figure 14:
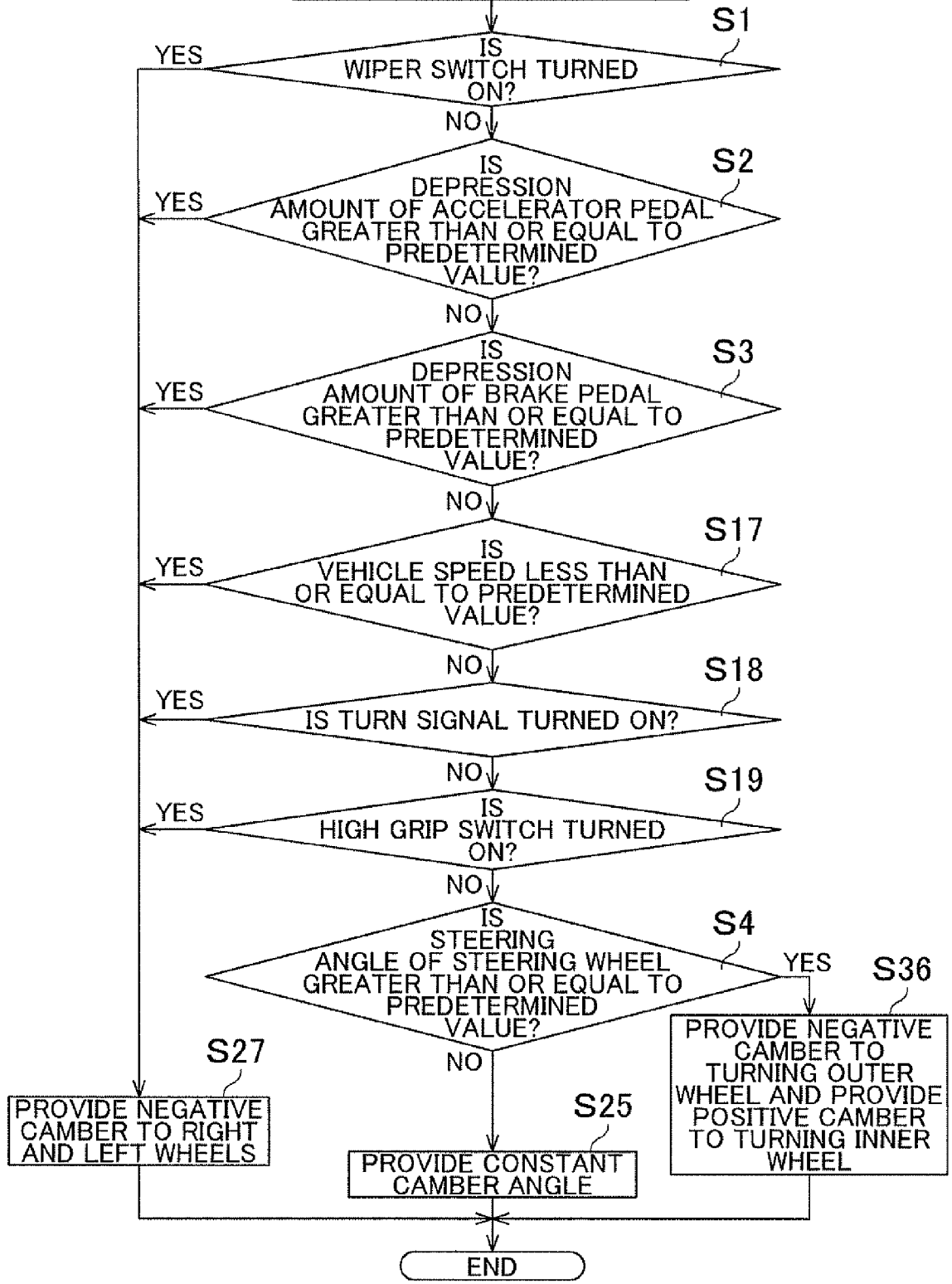
FIG. 14 is a flowchart showing a camber control process.

Next, a third embodiment will be described with reference to FIGS. 12 to 14. FIG. 12 is a top view of a wheel 302 of the third embodiment. FIG. 13 is a schematic view showing a front view of a vehicle 301 making a left turn in a state where the right and left wheels 2 are provided with steering angles for a left turn, a turning outer wheel (right front wheel 202FR) is provided with the negative camber, and a turning inner wheel (left wheel 202FL) is provided with the positive camber.

In the first embodiment, the case where the outer diameters of the two treads 21 and 22 of the wheel 2 are constant in the width direction has been described, but the wheel 2 of the third embodiment is configured such that the outer diameter of a first tread 221 and the outer diameter of a third tread 323 are gradually decreased. Note that the same portions as those of the respective embodiments described above are denoted by the same reference numerals, and descriptions thereof will be omitted.

As shown in FIG. 12, the wheel 302 of the third embodiment includes the third tread 323, and the first tread 221 is arranged on the inside of the vehicle 301 (right side in FIG. 12), the third tread 323 is arranged on the outside of the vehicle 301 (left side in FIG. 12), and the second tread 22 is arranged between the first tread 221 and the third tread 323.

The third tread 323 is configured to have a characteristic of a higher grip force at least compared to the second tread 22, and the third tread 323 is configured such that the diameter gradually decreases from the second tread 22 side (right side in FIG. 12) toward the outside of the vehicle 301 (left side in FIG. 12), as shown in FIG. 12.

Accordingly, only the second tread 22 can be caused to contact the ground in a state where the first tread 221 and the third tread 323 do not contact the road surface G without providing a large camber angle to the wheel 302 (for example, even if the camber angle is set to 0°). Accordingly, the rolling resistance of the entire wheel 302 can be reduced to further improve the fuel saving performance.

Simultaneously, by the first tread 221 and the third tread 323 not contacting the ground and the second tread 22 contacting the ground at a smaller camber angle, the wear of the respective treads 221, 22, and 323 can be suppressed to achieve a longer duration of life.

In the case where the camber angle in the plus direction (positive camber) is provided to the wheel 302 to cause the first tread 323 to contact the ground, the ground contact pressure on the third tread 323 can be made uniform in the entire region in the width direction (right-left direction in FIG. 12) since the outer diameter of the third tread 323 is gradually decreased, and a concentration of the ground contact pressure on a tread end portion can be suppressed.

Thus, by using the third tread 323 having the high grip performance efficiently, the driving performance (such as the turning performance, the acceleration performance, the braking performance, and the driving stability in rain) can further be improved, and the uneven wear can be suppressed to achieve a longer duration of life.

Next, a camber control process of the third embodiment will be described with reference to FIG. 14. FIG. 14 is a flowchart showing the camber control process. This process is a process executed repeatedly (for example, at intervals of 0.2 ms) by the CPU 71 while the power source of the vehicle control device 100 is on.

In the case where the CPU 71 determines that the steering angle of the steering wheel 54 does not reach the predetermined value in the process of S4 (S4: No), the tight turn is not instructed, and it is estimated from the processes of S1 to S3 and S17 to S19 that it is a moderate turn or a straight-ahead driving, and that the road surface is in a good state, the sudden acceleration or the sudden brake is not instructed, the generation of a large driving force or stopping the vehicle is not expected, the turning operation along with the right or left turn or the lane change is not expected, and further, the selection of the high grip performance is not instructed (S1: No, S2: No, S3: No, S17: No, S18: No, S19: No).

Thus, in this case (S1: No, S2: No, S3: No, S17: No, S18: No, S19: No, S4: No), since it can be determined that it is not necessary to obtain the high grip performance as the performance of the wheel 302 and that it is preferable to obtain the fuel saving performance by the low rolling resistance, the constant camber angle is provided to the wheel 2 (S25) to terminate the camber process. Note that, in this embodiment, the constant camber angle is set to 0° (see the left front wheel 202FL shown in FIG. 10).

Accordingly, since only the second tread 22 can be caused to contact the ground in the state where the first tread 221 and the third tread 323 are away from the road surface G, the rolling resistance of the entire wheel 302 can be reduced to further improve the fuel saving performance. In this case, by the first tread 221 and the third tread 323 not contacting the ground and the second tread 22 contacting the ground at the camber angle of 0°, the wear of the respective treads 221, 22, and 323 can be suppressed to achieve a longer duration of life.

In the case where it is determined that the steering angle of the steering wheel 54 is greater than or equal to the predetermined value in the process of S4 (S4: Yes), the tight turn is instructed by the driver, and the wheel 2 may slip to spin the vehicle 301. Thus, in this embodiment, the negative camber is provided to the turning outer wheel (right front wheel 202FR in FIG. 13) and the positive camber is provided (S36) to the turning inner wheel (left front wheel 202FL in FIG. 13) to terminate the camber process.

That is, as shown in FIG. 13, since the camber angles θR and θL are provided such that the right and left wheels 320 are both inclined to the inward side of the turn (right side in FIG. 13) in the process of S36, lateral forces can be applied to the respective right and left wheels 302 to use the lateral forces of the two wheels 302 as the turning force. Therefore, the turning performance can further be improved.

Figure 15:
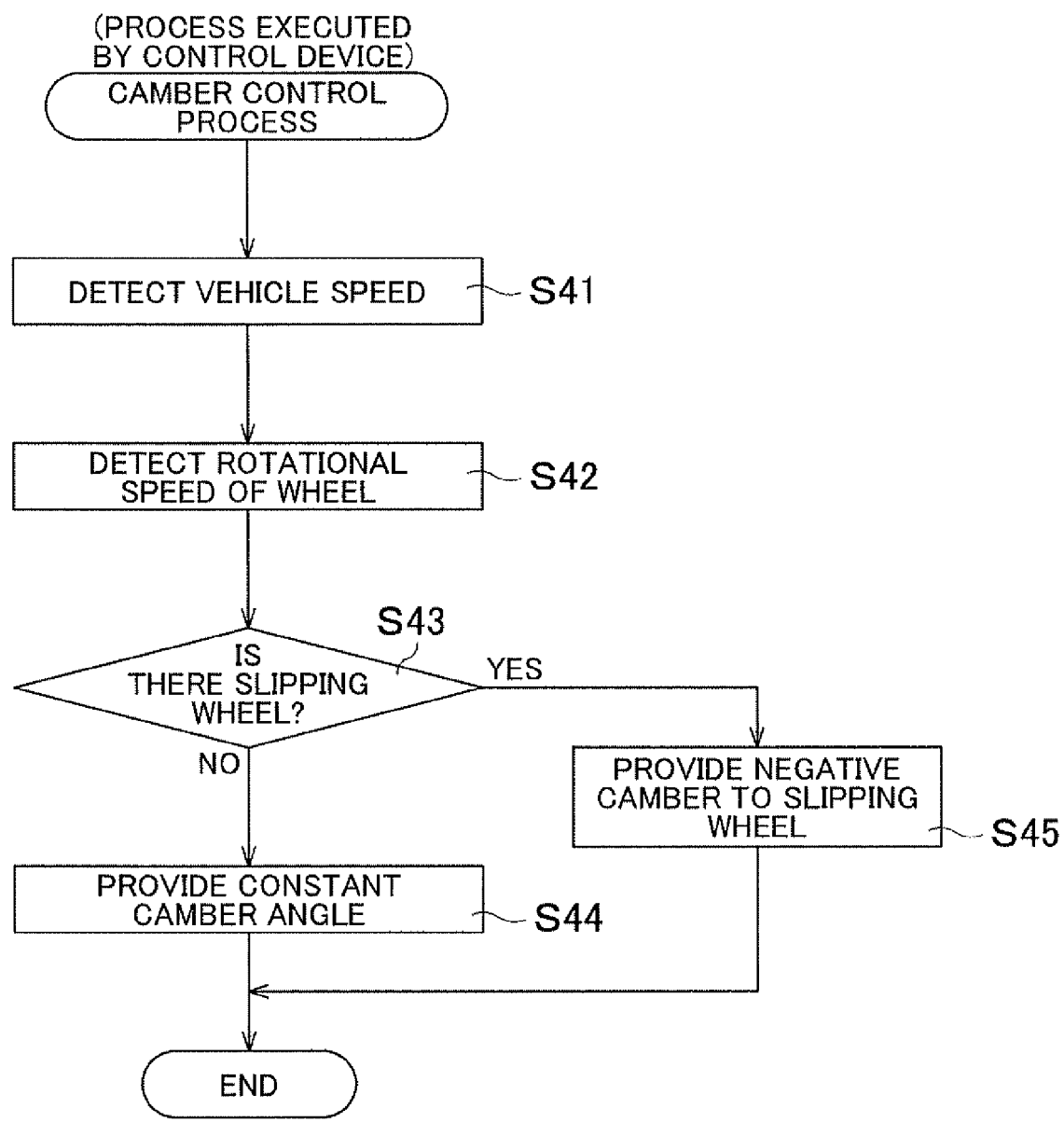
FIG. 15 is a flowchart showing a camber control process according to a fourth embodiment.

Next, a fourth embodiment will be described with reference to FIG. 15. FIG. 15 is a flowchart showing a camber control process of the fourth embodiment. This process is a process executed repeatedly (for example, at intervals of 0.2 ms) by the CPU 71 while the power source of the vehicle control device 100 is on.

In the first embodiment, the case where the camber angle of the wheel 2 is adjusted when, for example, the sudden acceleration or the tight turn is instructed by the driver has been described, but the fourth embodiment is configured such that the camber angle of the wheel 202 is adjusted in the case where any of the wheels 202 are slipping.

Note that the same portions as those of the respective embodiments described above are denoted by the same reference numerals, and the descriptions thereof will be omitted. In the fourth embodiment, a case where the vehicle 201 (wheel 202) of the second embodiment is controlled by the vehicle control device 100 will be described as an example.

In the process of S4 for the camber angle, the CPU 71 first detects the vehicle speed (S41), detects the rotational speed (circumferential speed) of each wheel 202 (S42), and determines whether any of the wheels 202 is slipping (S43) based on the vehicle speed and the circumferential speed of each wheel 202. Note that the vehicle speed and the circumferential speed of the wheel 202 are calculated by the vehicle speed sensor device 32 and the wheel rotation speed sensor device 35 as described above.

In the case where it is determined that there is no wheel 202 slipping, i.e., all of the wheels 202 are gripped to the road surface G to be driven, in the process of S43 as a result (S43: No), it can be determined that it is not necessary to obtain the high grip performance as the performance of the wheel 202 and that it is preferable to obtain the fuel saving performance by the low rolling resistance. Thus, the constant camber angle (0° in the same manner as in the case of the second embodiment) is provided to the wheel 202 (S44) to terminate the camber process.

Accordingly, since only the second tread 22 can be caused to contact the ground in the state where the first tread 221 is away from the road surface G, the rolling resistance of the entire wheel 202 can be reduced to further improve the fuel saving performance. In this case, by the first tread 221 not contacting the ground and the second tread 22 contacting the ground at the camber angle of 0°, the wear of the two treads 221 and 22 can be suppressed to achieve a longer duration of life.

On the other hand, in the case where it is determined that there is a wheel 202 slipping in the process of the S43 (S43: Yes), the acceleration performance or the driving stability of the vehicle 201 may be affected. Thus, the negative camber is provided to the slipping wheel 202 (S45) to terminate the camber process.

Accordingly, in the same manner as the case of the first embodiment described above, the ground contact pressure Rin in the first tread 221 is increased and the ground contact pressure Rout in the second tread 22 is decreased (the ground contact pressure Rout becomes zero in this embodiment). Thus, a slip of the wheel 202 can be prevented and the acceleration performance and the driving stability of the vehicle 201 can be improved by leveraging the high grip performance of the first tread 221.

Next, a fifth embodiment will be described with reference to FIGS. 16 to 19. In the first embodiment, the case where the negative camber or the positive camber is provided to the wheel 2 and the camber angle has a constant value regardless of the driving state of the vehicle 1 has been described. However, the fifth embodiment is configured such that the size of the camber angle provided to the wheel 2 increases or decreases according to the driving state of the vehicle 1.

Note that the same portions as those of the respective embodiments described above are denoted by the same reference numerals, and descriptions thereof will be omitted. In the fifth embodiment, a case where the vehicle 1 (wheel 2) of the first embodiment is controlled by a vehicle control device 500 will be described as an example.

Figure 16:
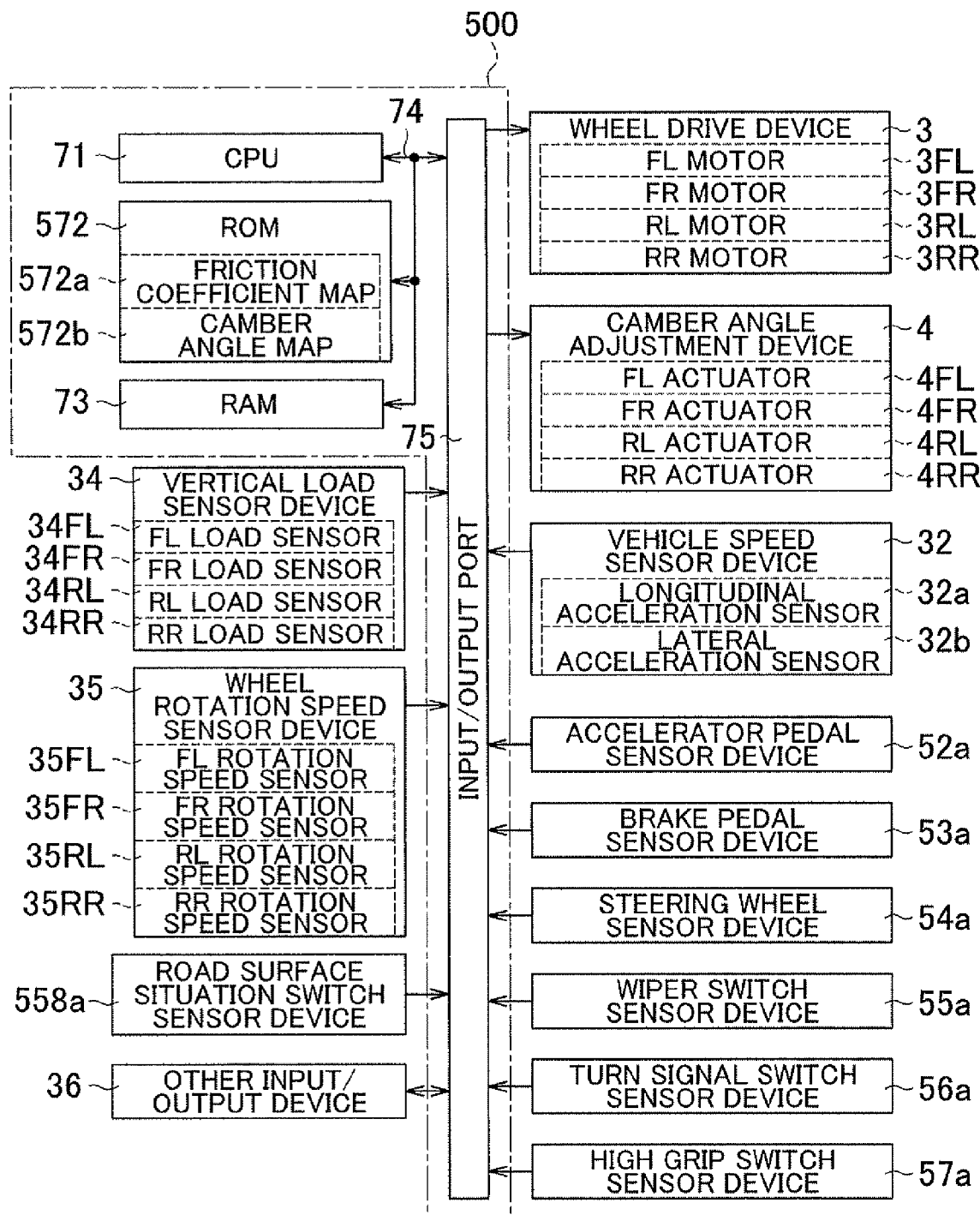
FIG. 16 is a block diagram showing the electrical configuration of a vehicle control device according to a fifth embodiment.

FIG. 16 is a block diagram showing the electrical configuration of the vehicle control device 500 according to the fifth embodiment. As shown in FIG. 16, the vehicle control device 500 includes the CPU 71, a ROM 572, and the RAM 73, which are connected to the input/output port 75 via the bus line 74. In the ROM 572 of the fifth embodiment, a friction coefficient map 572a and a camber angle map 572b are provided. Note that the details of the two maps 572a and 572b will be described later with reference to FIGS. 17 and 18.

A road surface situation switch sensor device 55a is a device for detecting the operation state of a road surface situation switch (not shown) and outputting the detection result thereof to the CPU 71, and mainly includes a positioning sensor (not shown) which detects the operation state (operation position) of the road surface situation switch and a control circuit (not shown) which processes the detection result of the positioning sensor to be output to the CPU 71.

Note that the road surface situation switch is an operation member operated by the driver, and the activation control of the camber angle adjustment device 4 is performed by the CPU 71 according to the operation state (operation position) thereof when the road surface situation switch is switched by the driver according to the situation of the road surface to run on. Specifically, the road surface situation switch is configured as a three-step (three-position) locker switch, in which a first position corresponds to a state where the road surface to run on is a dry paved road, a second position corresponds to a state where the road surface to run on is an unpaved road, and a third position corresponds to a state where the road surface to run on is a paved road in rain.

Figure 17:
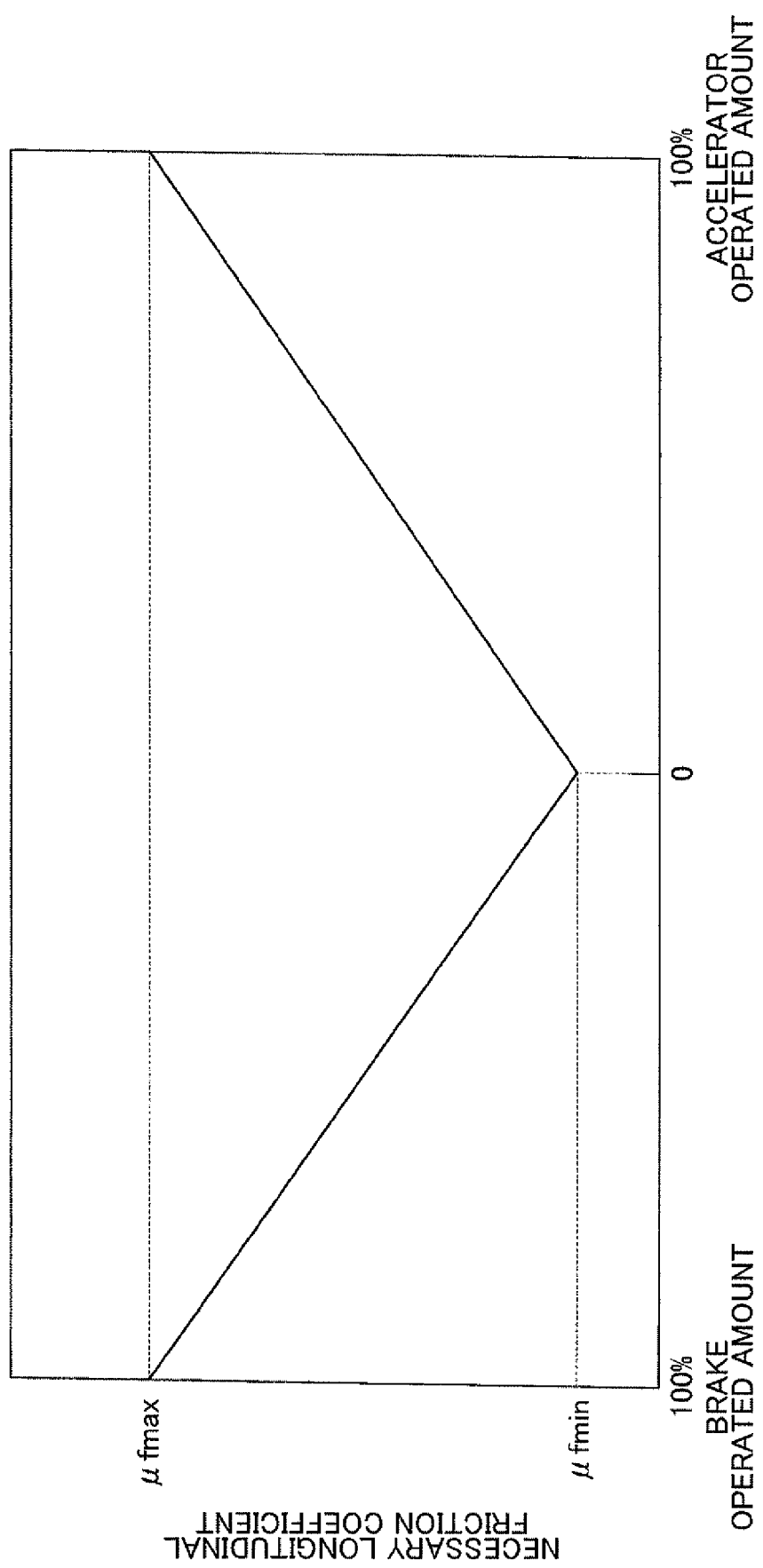
FIG. 17 is a schematic view showing the content of a friction coefficient map.

FIG. 17 is a schematic view showing the content of the friction coefficient map 572a. The friction coefficient map 572a is a map storing the relation of the depression amounts (operation amounts) of the accelerator pedal 52a and the brake pedal 53 and a necessary longitudinal friction coefficient.

The CPU 71 calculates the friction coefficient to be exhibited by the wheel 2 (that is, the friction coefficient necessary for preventing a slip or a lock of the wheel 2) in the current driving state of the vehicle 1 based on the content of the friction coefficient map 572a. Note that the necessary longitudinal friction coefficient represented by the ordinate is a friction coefficient in the front-back direction of the vehicle (up-down direction in FIG. 1) necessary for preventing a slip or a lock of the wheel 2.

According to the friction coefficient map 572a, as shown in FIG. 17, the necessary longitudinal friction coefficient is set as a minimum value μfmin in a state where the accelerator pedal 52 and the brake pedal 53 are not operated (depression amounts of an accelerator and brake equal zero), the necessary longitudinal friction coefficient changes linearly in proportion to the operation amount (depression amount) of the accelerator pedal 52 or the brake pedal 53, and the necessary longitudinal friction coefficient is set as a maximum value μfmax in a state where the operation amount of the accelerator pedal 52 or the brake pedal 53 is maximum (accelerator operation amount is 100%).

Figure 18:
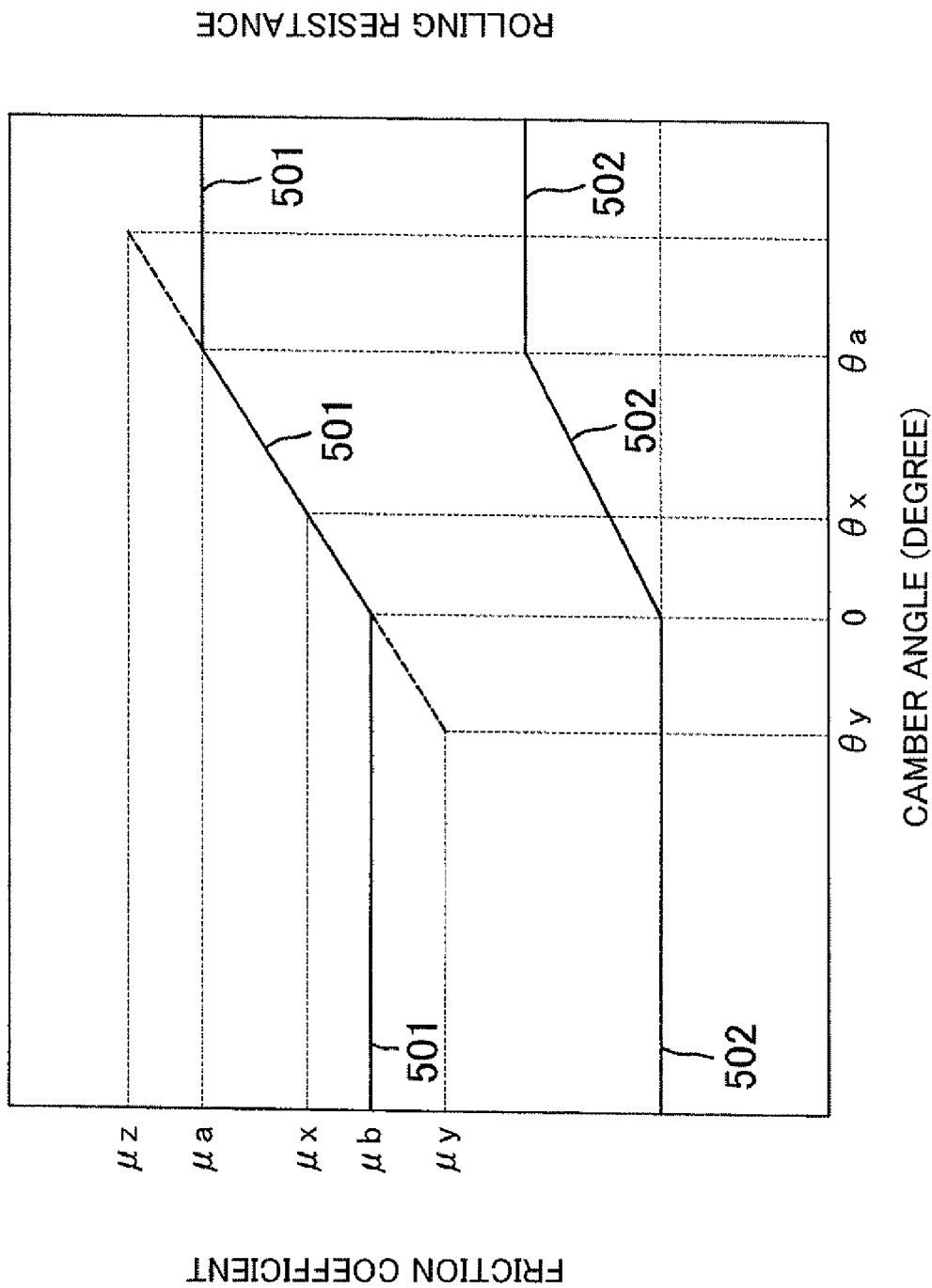
FIG. 18 is a schematic view showing the content of a camber angle map.

FIG. 18 is a schematic view showing the content of the camber angle map 572b. The camber angle map 572b is a map storing the relation of the friction coefficient as well as the rolling resistance with the camber angle of the wheel 2, and stores values measured in a preliminary test using the wheel 2.

The CPU 71 calculates the camber angle to be provided to the wheel 2 based on the content of the camber angle map 572b.

Note that, in FIG. 18, a solid line 501 corresponds to the friction coefficient, and a solid line 502 corresponds to the rolling resistance. Regarding the camber angle represented by the abscissa, the right side in FIG. 18 (θa side with respect to a 0-degree angle) corresponds to the negative camber (that is, the side on which the ground contact pressure in the first tread 21 with the high grip characteristic increases, see FIG. 5), and the left side in FIG. 18 (θb side with respect to the 0-degree angle) corresponds to the positive camber (that is, the side on which the ground contact pressure in the second tread 22 with the low rolling resistance increases, see FIG. 6).

The camber angle map 572b stores three types of maps corresponding to three types of the operation states of the road surface situation switch described above. In FIG. 18, only one type of the map (dry paved road map) is shown as a representative example and the other two types are omitted for simplification and an easier understanding of the drawing.

That is, the camber angle map 572b stores three types of maps of the dry paved road map, an unpaved road map, and a paved-road-in-rain map. The CPU 71 detects the operation state of the road surface situation switch, reads the dry paved road map in the case where the dry paved road is instructed, the unpaved road map in the case where the unpaved road is instructed, or the paved-road-in-rain map in the case where the paved road in rain is instructed, and performs the activation control of the camber angle adjustment device 4 based on the content thereof.

According to the camber angle map 572b, as shown in FIG. 18, when there is a change from a state where the camber angle is 0 degrees (that is, a state where the first tread 21 and the second tread 22 contact the ground equally) toward the negative camber side (θa side), the friction coefficient (and the rolling resistance) is set to gradually increase as the ground contact pressure in the first tread 21 with the high grip characteristic gradually increases (the ground contact pressure in the second tread 22 with the low rolling resistance gradually decreases) along with the change.

When the camber angle reaches the θa (hereinafter referred to as "second camber angle θa"), the friction coefficient reaches a maximum value μa by the second tread 22 departing from the road surface to run on to cause a state where only the first tread 21 contacts the road surface to run on.

Note that, even if the camber angle changes from the second camber angle θa toward the negative camber side, the friction coefficient barely changes and the friction coefficient is maintained at the maximum value μa since the second tread 22 is already away from the road surface to run on. The rolling resistance changes in the same manner to become a maximum value at the second camber angle θa and to be maintained at approximately a constant value thereafter.

On the other hand, as shown in FIG. 18, in the area on the positive camber side (θb side) of 0 degrees, even when there is a change from a state where the camber angle is 0 degrees (that is, the state where the first tread 21 and the second tread 22 contact the ground equally) toward the negative camber side, the friction coefficient hardly changes and is maintained at a minimum value μb.

In other words, even when the camber angle changes from the state where the first tread 21 and the second tread 22 contact the ground equally toward the negative camber side, and along with the change, the ground contact pressure in the second tread 22 with the low rolling resistance gradually increases (the ground contact pressure in the first tread 21 with the high grip characteristic gradually decreases), the friction coefficient is maintained at the minimum value μb. This phenomenon is assumably because the ground contact pressure of the second tread prevents the ground contact pressure of the first tread 21 from contributing to the high grip characteristic, since the second tread with the low rolling resistance generally has higher hardness than the first tread 21 with the high grip characteristic.

The unpaved road map and the paved-road-in-rain map omitted in FIG. 8 have characteristics obtained by a parallel shift of the solid lines in the dry paved road map in a direction of reducing the friction coefficient. That is, the camber angle at which the friction coefficient becomes a minimum value is 0 degrees and the camber angle at which the friction coefficient becomes a maximum value is the second camber angle θa in both maps.

Figure 19:
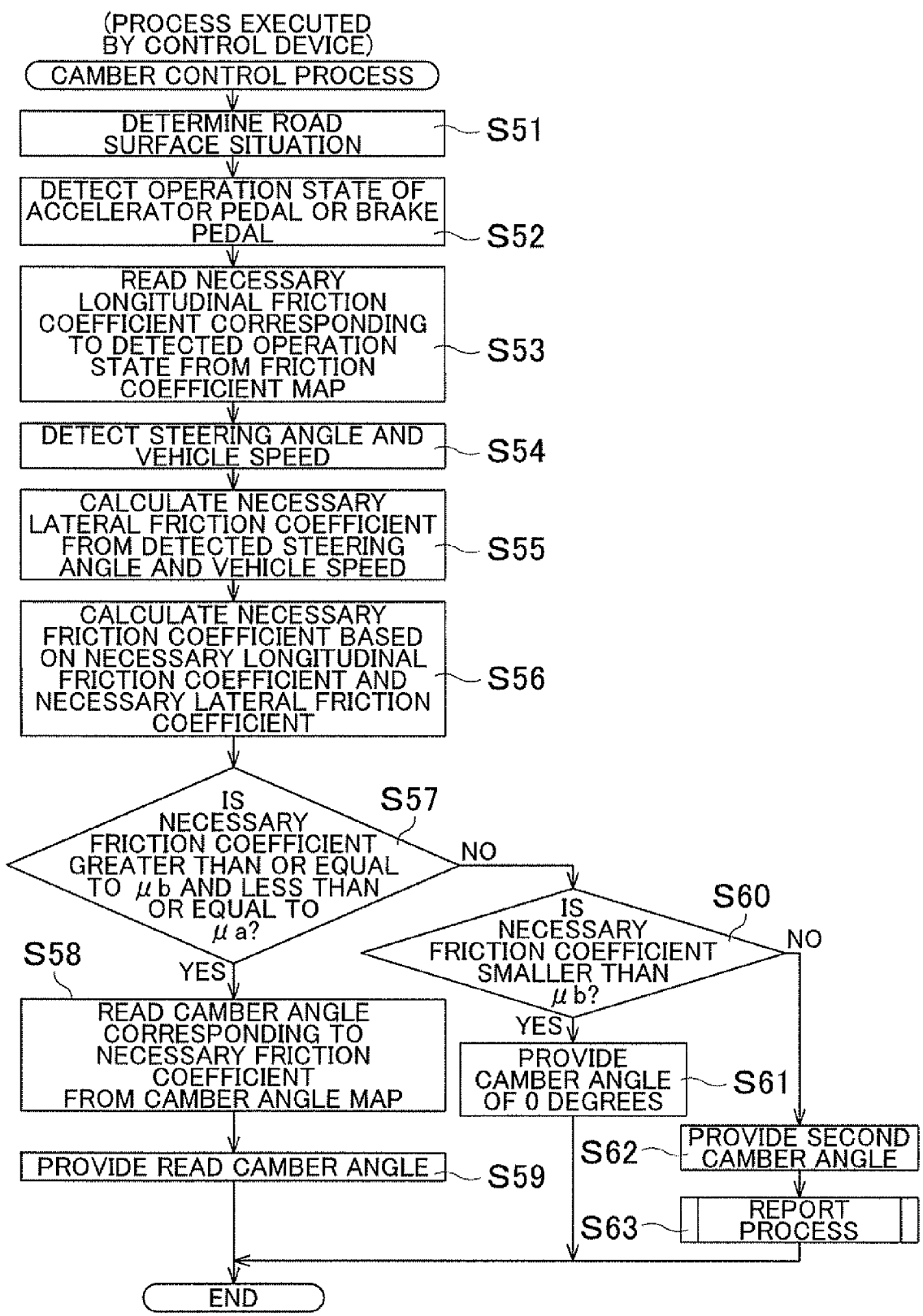
FIG. 19 is a flowchart showing a camber control process.

Next, referring to FIG. 19, a camber control process of the fifth embodiment will be described. FIG. 19 is a flowchart showing the camber control process. This process is a process executed repeatedly (for example, at intervals of 0.2 ms) by the CPU 71 while the power source of the vehicle control device 500 is on.

Regarding the camber control process, the CPU 71 first determines the road surface situation (S51). This process is performed by checking the detection result of the road surface situation switch sensor device 558a (see FIG. 16), and acquiring the operation state of the road surface situation switch caused by the driver. That is, as described above, the CPU 71 determines the road surface situation as the dry paved road in the case where the operation position of the road surface situation switch is confirmed to be in the first position, determines it as the unpaved road when in the second position, and determines it as the paved road in rain when in the third position.

Next, in the process of S52, the operation states of the accelerator pedal 52 and the brake pedal 53 are detected (S52), and the necessary longitudinal friction coefficient corresponding to the detected operation states is read from the friction coefficient map 572a (see FIG. 17) (S53). Accordingly, the friction coefficient in the front-back direction of the vehicle (up-down direction in FIG. 1) necessary for preventing a slip or a lock of the wheel 2 can be obtained.

Next, in the process of S54, the steering angle of the wheel 2 and the ground speed (vehicle speed) of the vehicle 1 are detected (S54), and the necessary lateral friction coefficient is calculated from the detected steering angle and vehicle speed (S55). Note that, as described above, the CPU 71 detects the steering angle of the wheel 2 and the ground speed of the vehicle 1 based on the detection results of the steering wheel sensor device 54a and the vehicle speed sensor device 32.

The necessary lateral friction coefficient is a friction coefficient in the right-left direction of the vehicle (right-left direction in FIG. 1) necessary for preventing a slip of the wheel 2 in the vehicle 1 during a turn, and is calculated as follows.

That is, the relation among a steering angle σ of the wheel 2, an Ackerman turning radius R0, and a wheelbase I of the vehicle 1 can be represented as $\tan \sigma = I/R0$. This relational expression can be approximated as $\sigma = I/R0$ in the case where the steering angle σ is a minute angle. By modifying this to represent the Ackerman turning radius R0, $R0 = I/\sigma$ can be obtained.

The relation between an actual turning radius R of the vehicle 1 and a ground speed (vehicle speed) v of the vehicle 1 is represented as $R/R0 = 1 + K \cdot v^2$ from the steering characteristic of the vehicle 1 using a stability factor K measured for the vehicle 1. By modifying this to represent the actual turning radius R and substituting the obtained Ackerman turning radius R0, $R = I(1 + K \cdot v^2)/\sigma$ can be obtained.

A centrifugal force F applied to the vehicle 1 during the turn is represented as $F = m \cdot v^2/R$, where m is the weight of the vehicle 1. By substituting the obtained actual turning radius R, $F = m \cdot v^2 \cdot \sigma/(I(1 + K \cdot v^2))$ can be obtained. Since a value greater than the centrifugal force F suffices as the friction force for avoiding a slip of the wheel 2 in the lateral direction (right-left direction of the vehicle 1), a necessary lateral friction coefficient μw can be represented as $\mu w = F/m = v^2 \cdot \sigma/(I(1 + K \cdot v^2))$ by dividing the centrifugal force F by the weight m.

After the necessary longitudinal friction coefficient and the necessary lateral friction coefficient have been obtained in the processes of S53 and S55, the necessary friction coefficient is calculated based on the necessary longitudinal friction coefficient and the necessary lateral friction coefficient (that is, as a resultant force of vectors in the front-back direction and the right-left direction of the vehicle 1) (S56), and the process proceeds to S57.

In the process of S57, the necessary friction coefficient calculated in the process of S56 and the maximum value μa and the minimum value μb of the friction coefficient which can be exhibited by the wheel 2 are compared to determine whether the necessary friction coefficient is greater than or equal to the minimum value μb and less than or equal to the maximum value μa (S57).

Note that the maximum value μa and the minimum value μb of the friction coefficient which can be exhibited by the wheel 2 are read from the camber angle map 572b (see FIG. 18), as described above. In this case, the CPU 71 selects the map according to the road surface situation determined in the process of S51 from the three types of the maps, and reads the maximum value μa and the minimum value μb based on the content of the selected map.

In the case where it is determined that the necessary friction coefficient is greater than or equal to the minimum value μb and less than or equal to the maximum value μa as a result of the determination in S57 (S57: Yes), the camber angle corresponding to the necessary friction coefficient (that is, at which the friction coefficient becomes equivalent to the necessary friction coefficient) is read from the camber angle map 572b (S58) and the read camber angle is provided to the wheel 2 (S59) to terminate the camber control process.

Specifically, in this case, the necessary friction coefficient calculated in the process of S56 is μx and the relation satisfies μb≧μx≧μa (S57: Yes), for example. Thus, the camber angle corresponding to the necessary friction coefficient μx is read as θx from the camber angle map 572b shown in FIG. 18 (S58), and the read camber angle θx is provided to the wheel 2 (S59).

Accordingly, since the friction coefficient can be controlled such that the change of the friction coefficient exhibited by the wheel 2 becomes minimum, the rolling resistance can be suppressed to a smaller value to achieve further fuel saving while ensuring the acceleration/braking performance or the turning performance as necessary.

On the other hand, in the case where it is determined that the necessary friction coefficient is not greater than or equal to the minimum value μb and less than or equal to the maximum value μa in the process of S57 (S57: No), whether the necessary friction coefficient is smaller than the minimum value μb is determined next (S60). In the case where it is determined that the necessary friction coefficient is smaller than the minimum value μb as a result (S60: Yes), the first camber angle of 0° is provided to the wheel 2 (S61) to terminate the camber control process.

Specifically, when a necessary friction coefficient μy calculated in the process of S56 is smaller than the minimum value μb (μy<μb) (S60: Yes), instead of reading the camber angle corresponding to the necessary friction coefficient μy as, for example, θy from the camber angle map 572b shown in FIG. 18, the camber angle to be provided to the wheel 2 is determined to be 0° and is provided to the wheel 2 (S61).

In this manner, according to the camber angle map 572b (see FIG. 18) in the fifth embodiment, since the friction coefficient on the positive camber side of 0 degrees is maintained at the minimum value μb, when the necessary friction coefficient μy calculated in the process of S56 is less than the minimum value μb of the friction coefficient which can be exhibited by the wheel 2, it is determined that a further reduction in the rolling resistance (achievement in fuel saving driving) cannot be expected even if a camber angle of a greater absolute value on the positive camber side of 0 degrees is provided to the wheel 2. Accordingly, a camber angle of 0 degrees is provided to the wheel 2.

Accordingly, the camber angle to be provided to the wheel 2 is not largely greater on the positive camber side relative to 0 degrees, assignment of an unnecessarily large camber angle can be avoided to achieve good running stability of the vehicle 1.

In addition, in this embodiment, arrangements are made to allow the smallest friction coefficient (specifically, the smallest rolling resistance) to be exhibited by setting 0 degrees for the camber angle of the wheel 2. This eliminates the need for setting the camber angle of the wheel 2 on the positive camber side relative to 0 degrees. As a result, control operations to be executed for providing the wheel 2 with the camber angle may be omitted on the positive camber side, focusing the control only on the negative camber side, so that the control operations can be simplified.

Note also that, as described above, the vehicle 1 that does not require that the camber angle of the wheel 2 be set on the positive camber side needs only a mechanism for providing the camber angle on the negative camber side (negative direction). Such a vehicle can eliminate the need for having a mechanism for providing the camber angle on the positive camber side (positive direction), so that mechanisms can also be simplified.

On the other hand, in the case where it is not determined that the necessary friction coefficient is smaller than the minimum value μb in the process of S60 (S60: No), the necessary friction coefficient is greater than maximum value μa. Thus, in this case (S60: No), the second camber angle is provided to the wheel 2 (S62) and a report process (S63) is executed to terminate the camber control process.

Specifically, when a necessary friction coefficient μz calculated in the process of S56 is greater than the maximum value μa (μb<μz) (S60: No), instead of reading the camber angle corresponding to the necessary friction coefficient μz as, for example, θz from the camber angle map 572b shown in FIG. 18, the second camber angle θa is determined as the camber angle to be provided to the wheel 2 and is provided to the wheel 2 in this case (S62).

In this manner, in this embodiment, it is determined that a further increase in the friction coefficient (improvement in the grip performance) cannot be expected even if a camber angle of a greater absolute value than the second camber angle θa is provided to the wheel 2 in the case where the necessary friction coefficient μz calculated in the process of S56 exceeds the maximum value μa of the friction coefficient which can be exhibited by the wheel 2, and a smallest angle (angle closest to 0 degrees) within a range where the maximum value pa can be exhibited, i.e., the second camber angle θa, is provided to the wheel 2, as shown in FIG. 18. Accordingly, an unnecessary increase of the camber angle can be avoided to ensure the driving stability of the vehicle 1.

In the report process (S63), the driver is informed of a slip or a lock of the wheel 2 (or a possibility thereof) due to a sudden acceleration or a sudden brake by an output from a speaker and a display of a monitor device. Note that, in the case where the vehicle 1 is in an acceleration state, means to reduce the speed of the vehicle 1 (for example, applying a brake to the vehicle 1 by activating a brake device or reducing the output of an engine or the like) may be taken in the process of S63. Accordingly, the speed of the vehicle 1 can be reduced mechanically without depending on the operation of the driver, thus contributing to an improvement in security.

Next, referring to FIG. 20, a sixth embodiment will be described. In the fifth embodiment, the case where the first tread 21 and the second tread 22 are provided to the wheel 2 has been described. In the sixth embodiment, the first tread 221, the second tread 22, and the third tread 323 are provided on the wheel 302 in the same manner as the case of the third embodiment described above.

Note that the same portions as those of the respective embodiments described above are denoted by the same reference numerals, and descriptions thereof will be omitted. In the sixth embodiment, a case where the vehicle 301 (wheel 302, see FIG. 12 or 13) of the third embodiment is controlled by the vehicle control device 500 of the fifth embodiment will be described as an example. Note that, in the sixth embodiment, the configuration of the camber angle map differs from that of the fifth embodiment as described later.

Figure 20:
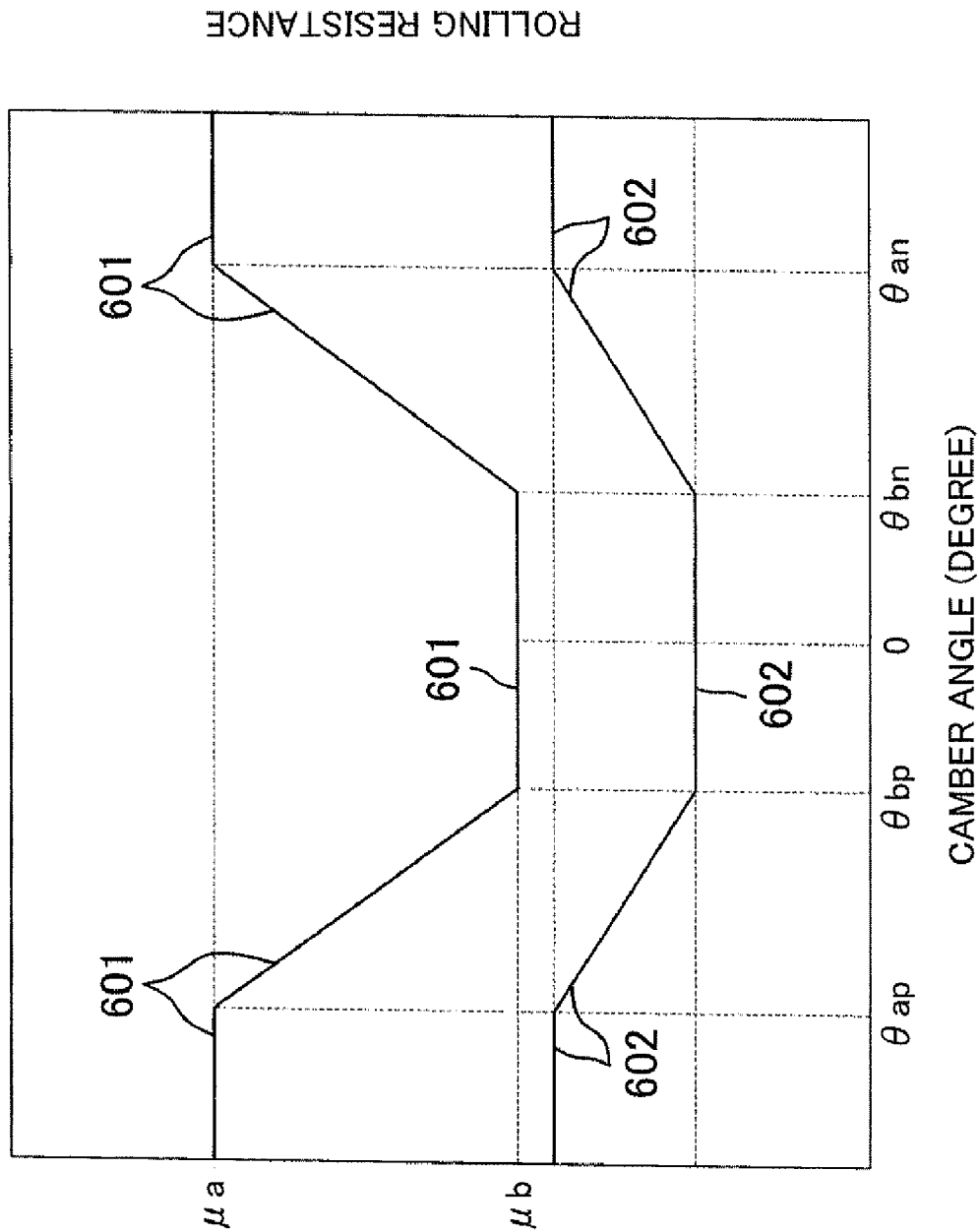
FIG. 20 is a schematic view showing the content of a camber angle map according to a sixth embodiment.

FIG. 20 is a schematic view showing the content of the camber angle map according to the sixth embodiment. The camber angle map is a map storing the relation of the friction coefficient as well as the rolling resistance with the camber angle of the wheel 302, and stores values measured in a preliminary test using the wheel 302. In the same manner as the fifth embodiment described above, the CPU 71 calculates the camber angle to be provided to the wheel 302 based on the content of the camber angle map.

Note that, in FIG. 20, a solid line 601 corresponds to the friction coefficient, and a solid line 602 corresponds to the rolling resistance. The camber angle map according to the sixth embodiment stores the three types of maps corresponding to the three types of operation states of the road surface situation switch, in the same manner as the case of the fifth embodiment. In FIG. 20, only one type of the map (dry paved road map) is shown as a representative example and the other two types are omitted for simplification and an easier understanding of the drawing.

According to the camber angle map of the sixth embodiment, in the case where there is a change from a state where the camber angle is 0 degrees (that is, a state where only the second tread 22 contacts the ground and the first tread 221 and the third tread 323 are away from the road surface to run on) toward the negative camber side (θbn side), the friction coefficient is maintained at the minimum value μb until the camber angle becomes θbn since only the second tread 22 contacts the ground and the first tread 221 (and the third tread 323) is away from the ground, as shown in FIG. 20. Note that the same applies to the rolling resistance, and the minimum value is maintained within this zone.

When the camber angle changes from θbn toward the negative camber side (θan side), the friction coefficient (and the rolling resistance) gradually increases as the ground contact pressure in the first tread 221 with the high grip characteristic gradually increases (the ground contact pressure in the second tread 22 with the low rolling resistance gradually decreases) along with the change.

Then, when the camber angle reaches θan (hereinafter referred to as "third camber angle θan"), the friction coefficient reaches the maximum value pa by the second tread 22 departing from the road surface to run on to cause a state where only the first tread 221 contacts the road surface to run on.

In this case, even if the camber angle further changes from the third camber angle θan toward the negative camber side (right side in FIG. 20), the friction coefficient barely changes and the friction coefficient is maintained at the maximum value μa since the second tread 22 is already away from the road surface to run on and only the first tread 221 contacts the road surface to run on. The rolling resistance changes in the same manner to become a maximum value at the point when the camber angle reaches the third camber angle θan and to be maintained at approximately a constant value thereafter.

In the same manner, in the case where there is a change from the state where the camber angle is 0 degrees (that is, the state where only the second tread 22 contacts the ground and the first tread 221 and the third tread 323 are away from the road surface to run on) toward the positive camber side (θbp side), the friction coefficient is maintained at the minimum value μb until the camber angle becomes θbp since only the second tread 22 contacts the ground and the third tread 323 (and the first tread 221) is away from the ground, as shown in FIG. 20. Note that the same applies to the rolling resistance, and the minimum value is maintained within this zone.

When the camber angle changes from θbp toward the positive camber side (θap side), the friction coefficient (and the rolling resistance) gradually increases as the ground contact pressure in the third tread 323 with the high grip characteristic gradually increases (the ground contact pressure in the second tread 22 with the low rolling resistance gradually decreases) along with the change.

Then, when the camber angle reaches θap (hereinafter referred to as "fourth camber angle θap"), the friction coefficient reaches the maximum value pa by the second tread 22 departing from the road surface to run on to cause a state where only the third tread 323 contacts the road surface to run on.

In this case, even if the camber angle further changes from the fourth camber angle θap toward the positive camber side (left side in FIG. 20), the friction coefficient barely changes and the friction coefficient is maintained at the maximum value pa since the second tread 22 is already away from the road surface to run on and only the third tread 323 contacts the road surface to run on. The rolling resistance changes in the same manner to become the maximum value at the point when the camber angle reaches the fourth camber angle θap and to be maintained at approximately the constant value thereafter.

Figure 21:
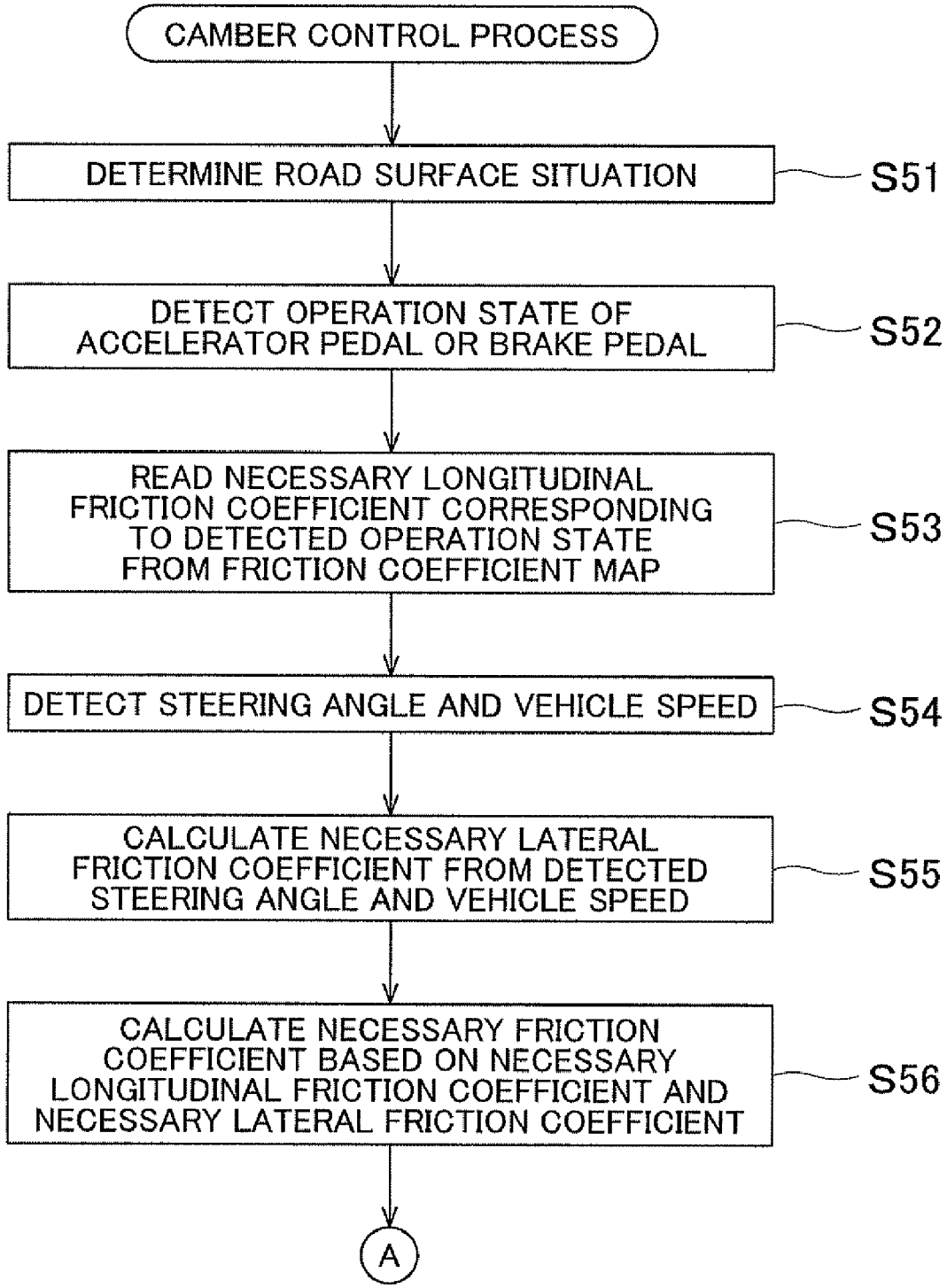
FIG. 21 is a flowchart showing a camber control process.

Next, referring to FIG. 21, a camber control process of the sixth embodiment will be described. FIG. 21 is a flowchart showing the camber control process. This process is a process executed repeatedly (for example, at intervals of 0.2 ms) by the CPU 71 while the power source of the vehicle control device 500 is on.

In the sixth embodiment, regarding the camber control process, the CPU 71 determines the road surface situation (S51), then detects the operation states of the accelerator pedal 52 and the brake pedal 53 (S52), and reads the necessary longitudinal friction coefficient corresponding to the detected operation states from the friction coefficient map 572a (see FIG. 17) (S53), in the same manner as the case of the fifth embodiment.

After the process of S53 has been executed, the steering angle of the wheel 302 and the ground speed (vehicle speed) of the vehicle 1 are detected (S54), the necessary lateral friction coefficient is calculated from the detected steering angle and vehicle speed (S55), the necessary friction coefficient is then calculated based on the necessary longitudinal friction coefficient and the necessary lateral friction coefficient (S56), and whether the calculated necessary friction coefficient is greater than or equal to the minimum value μb and less than or equal to the maximum value μa is determined (S57).

In the case where it is determined that the necessary friction coefficient is greater than or equal to the minimum value μb and less than or equal to the maximum value μa as a result (S57:Yes), whether the steering angle of the steering wheel 54 is greater than or equal to a predetermined value, i.e., whether a turn of a predetermined level or greater (tight turn) is instructed by the driver, is determined next (S601).

In the case where it is determined that the steering angle of the steering wheel 54 is greater than or equal to the predetermined value as a result (S601: Yes), it is determined that the tight turn is instructed by the driver and that there is a possibility of a slip. Thus, in this embodiment, a camber angle which corresponds to the necessary friction coefficient (that is, at which the friction coefficient becomes equivalent to the necessary friction coefficient) and which provides a negative camber to the turning outer wheel and provides a positive camber to the turning inner wheel is read from the camber angle map shown in FIG. 20 (S658), and the read camber angle is provided to the wheel 302 (S59) to terminate the camber control process.

Accordingly, in the same manner as the case of the third embodiment, the camber angle can be provided such that the right and left wheels 320 are both inclined to the inward side of the turn (see FIG. 13). As a result, lateral forces can be applied to the respective right and left wheels 302 to use the lateral forces of the two wheels 302 as the turning force and further improve the turning performance.

On the other hand, in the case where it is determined that the steering angle of the steering wheel 54 does not reach the predetermined value in the process of S601 (S601: No), it is determined that the tight turn is not instructed and that it is a moderate turn or a straight-ahead driving. Thus, in this embodiment, a camber angle which corresponds to the necessary friction coefficient (that is, at which the friction coefficient becomes equivalent to the necessary friction coefficient) and which provides a negative camber to both the right and left wheels is read from the camber angle map shown in FIG. 20 (S602), and the read camber angle is provided to the wheel 302 (S59) to terminate the camber control process. Accordingly, a stable attitude of the vehicle 301 can be maintained.

On the other hand, in the case where it is determined that the necessary friction coefficient is not greater than or equal to the minimum value μb and less than or equal to the maximum value μa in the process of S57 (S57: No), whether the necessary friction coefficient is smaller than the minimum value μb is determined next (S60). In the case where it is determined that the necessary friction coefficient is smaller than the minimum value μb (S60: Yes), a constant camber angle is provided to the wheel 302 (S661) to terminate the camber control process.

Note that, in this embodiment, the constant camber angle is set to 0 degrees. Accordingly, since only the second tread 22 can be caused to contact the ground in a state where the first tread 221 and the third tread 323 are away from the road surface to run on, the rolling resistance of the entire wheel 302 can be reduced to further improve the fuel saving performance. In this case, by the first tread 221 and the third tread 323 not contacting the ground and the second tread 22 contacting the ground at the camber angle of 0°, the wear of the respective treads 221, 22, and 323 can be suppressed to achieve a longer duration of life. Further, an unnecessary increase of the camber angle can be avoided to ensure the driving stability of the vehicle 1.

On the other hand, in the case where it is not determined that the necessary friction coefficient is smaller than the minimum value μb, i.e., the necessary friction coefficient is greater than the maximum value μa in the process of S60 (S60: No), whether the steering angle of the steering wheel 54 is greater than or equal to a predetermined value, i.e., whether a turn of a predetermined level or greater (tight turn) is instructed by the driver, is determined next (S603).

In the case where it is determined that the steering angle of the steering wheel 54 is greater than or equal to the predetermined value as a result (S604: Yes), it is determined that the tight turn is instructed by the driver and that there is a possibility of a slip. Thus, in this embodiment, the third camber angle described above is provided to the turning outer wheel and the fourth camber angle described above is provided to the turning inner wheel (S605).

Accordingly, the camber angle can be provided such that the negative camber is provided to the turning outer wheel, the positive camber is provided to the turning inner wheel, and the right and left wheels 320 are both inclined to the inward side of the turn in the same manner as the case of the third embodiment (see FIG. 13). As a result, lateral forces can be applied to the respective right and left wheels 302 to use the lateral forces of the two wheels 302 as the turning force and further improve the turning performance.

On the other hand, in the case where it is determined that the steering angle of the steering wheel 54 does not reach the predetermined value in the process of S603 (S603: No), it is determined that the tight turn is not instructed and that it is a moderate turn or a straight-ahead driving. Thus, in this embodiment, the third camber angle is provided to both the right and left wheels (S604). Accordingly, the negative camber can be provided to both the right and left wheels to maintain the stable attitude of the vehicle 301.

In this embodiment, in the same manner as the case of the fifth embodiment described above, it is determined that a further increase in the friction coefficient (improvement in the grip performance) cannot be expected even if a camber angle of a greater absolute value than the third or fourth camber angle is provided to the wheel 302 in the case where the necessary friction coefficient calculated in the process of S56 exceeds the maximum value μa of the friction coefficient which can be exhibited by the wheel 2, and a smallest angle (angle closest to 0 degrees) within a range where the maximum value μa can be exhibited, i.e., the third or fourth camber angle, is provided to the wheel 302. Accordingly, an unnecessary increase of the camber angle can be avoided to ensure the driving stability of the vehicle 301.

After the process of S604 or S605 has been executed, the report process (S63) is executed to terminate the camber control process.

Next, referring to FIGS. 22 and 23, a seventh embodiment will be described. Note that the same portions as those of the respective embodiments described above are denoted by the same reference numerals, and descriptions thereof will be omitted. In the seventh embodiment, a case where the vehicle 1 (wheel 2) of the first embodiment is controlled by the vehicle control device 500 of the fifth embodiment will be described as an example. Note that the seventh embodiment employs a camber angle map with a different configuration from one employed in the fifth embodiment as described below.

Figure 22:
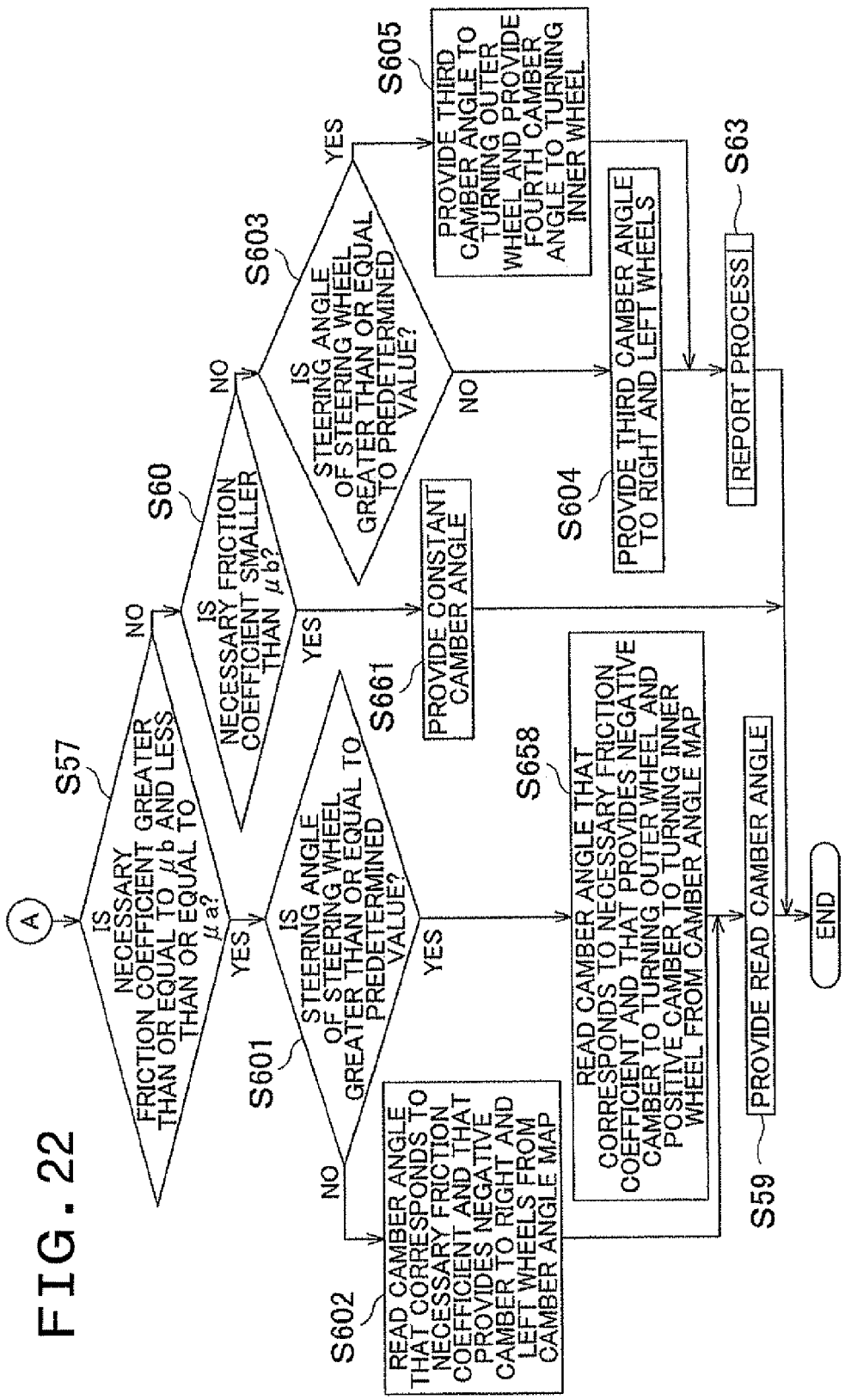
FIG. 22 is a schematic view showing the content of a camber angle map according to a seventh embodiment.

FIG. 22 is a schematic diagram schematically showing the content of the camber angle map according to the seventh embodiment. The camber angle map stores a relationship among the friction coefficient, the rolling resistance, and the camber angle of the wheel 2, taking into account various conditions of the wheel 2 including part-to-part variations in manufacturing of the wheel 2 resulting in different widths of the first tread 21 and the second tread 22 and collapse of the wheel 2 due to load. Based on the content of this camber angle map, the CPU 71 calculates the camber angle to be provided to the wheel 2, as in the above-described fifth embodiment.

Note that, in FIG. 22, a solid line 701 corresponds to the friction coefficient and a solid line 702 corresponds to the rolling resistance. Note also that the camber angle map in the seventh embodiment includes three different types of map stored therein, each corresponding to a specific one of the three operation states of the road surface situation switch in the same manner as in the fifth embodiment. For easier understanding of the drawing, FIG. 22 shows only one type of map (a dry paved road map) as a representative example, omitting the other two types.

Unlike the camber angle map 572b in the fifth embodiment described above, the camber angle map in the seventh embodiment has a range, in which the friction coefficient (and the rolling resistance) gradually decreases, on the positive camber side relative to 0 degrees.

Specifically, referring to FIG. 22, according to the camber angle map in the seventh embodiment, when the camber angle changes from the condition of 0 degrees (specifically, the condition in which the first tread 21 and the second tread 22 evenly contact the ground) toward the positive camber side (θb side), the ground contact pressure in the second tread 22 offering low rolling resistance gradually increases (the ground contact pressure in the first tread 21 offering high grip performance gradually decreases) with the change, so that the friction coefficient (and the rolling resistance) gradually decreases. When the camber angle then reaches θb (hereinafter referred to as the "first camber angle θb"), the friction coefficient reaches the minimum value μb. The friction coefficient remains substantially constant thereafter.

When the camber angle changes from the condition of 0 degrees (specifically, the condition in which the first tread 21 and the second tread 22 evenly contact the ground) toward the negative camber side (θa side), on the other hand, the ground contact pressure in the first tread 21 offering high grip performance gradually increases (the ground contact pressure in the second tread 22 offering low rolling resistance gradually decreases) with the change toward the negative camber side in the same manner as the camber angle map 572b in the above-described fifth embodiment, so that the friction coefficient (and the rolling resistance) gradually increases. When the camber angle then reaches the second camber angle θa, the friction coefficient reaches the maximum value μa for the reason stated above.

Note that the unpaved road map and the paved-road-in-rain map omitted in FIG. 22 have characteristics obtained by a parallel shift of the solid lines in the dry paved road map in a direction of reducing the friction coefficient. That is, the camber angle at which the friction coefficient becomes a minimum value is the first camber angle θb and the camber angle at which the friction coefficient becomes a maximum value is the second camber angle θa in both maps.

Next, referring to FIG. 23, a camber control process of the seventh embodiment will be described. FIG. 23 is a flowchart showing the camber control process. This process is a process executed repeatedly (for example, at intervals of 0.2 ms) by the CPU 71 while the power source of the vehicle control device 500 is on.

Regarding the camber control process, in the same manner as in the fifth embodiment, the CPU 71 first determines the road surface situation (S51), detects the operation states of the accelerator pedal 52 and the brake pedal 53 (S52), and reads the necessary longitudinal friction coefficient corresponding to the detected operation states from the friction coefficient map 572a (see FIG. 17) (S53).

After the process of S53, the steering angle of the wheel 2 and the ground speed (vehicle speed) of the vehicle 1 are detected (S54), the necessary lateral friction coefficient is calculated from the detected steering angle and vehicle speed (S55), and thereafter the necessary friction coefficient is calculated based on the necessary longitudinal friction coefficient and the necessary lateral friction coefficient (S56). Subsequently, whether the necessary friction coefficient is greater than or equal to the minimum value μb and less than or equal to the maximum value μa is determined (S57).

In the case where it is determined that the necessary friction coefficient is greater than or equal to the minimum value μb and less than or equal to the maximum value μa as a result of the determination in S57 (S57: Yes), the camber angle corresponding to the necessary friction coefficient (that is, at which the friction coefficient becomes equivalent to the necessary friction coefficient) is read from the camber angle map (see FIG. 22) in this embodiment (S58) and the read camber angle is provided to the wheel 2 (S59) to terminate the camber control process.

Specifically, in the process of S59, the camber angle corresponding to the necessary friction coefficient μx (μb≦μx≦μa) is read as θx from the camber angle map (see FIG. 22) in this embodiment, and the read camber angle θx is provided to the wheel 2.

On the other hand, in the case where it is determined that the necessary friction coefficient is not greater than or equal to the minimum value μb and less than or equal to the maximum value μa in the process of S57 (S57: No), whether the necessary friction coefficient is smaller than the minimum value μb is determined next (S60).

In the case where it is not determined that the necessary friction coefficient is smaller than the minimum value μb, in other words, the necessary friction coefficient is greater than the maximum value pa in the process of S60 (S60: No), the second camber angle is provided to the wheel 2 as in the fifth embodiment (S62) and a report process in the same manner as in the fifth process (S63) is executed to terminate the camber control process.

On the other hand, in the case where it is determined that the necessary friction coefficient is smaller than the minimum value μb (S60: Yes), the first camber angle is provided to the wheel 2 (S161) to terminate the camber control process.

Specifically, when a necessary friction coefficient μy calculated in the process of S56 is smaller than the minimum value μb (μy<μb) (S60: Yes), instead of reading the camber angle corresponding to the necessary friction coefficient μy as, for example, θy from the camber angle map shown in FIG. 22, the camber angle to be provided to the wheel 2 is determined to be the first camber angle θb and is provided to the wheel 2 (S161).

As such, according to the camber angle map in the seventh embodiment, the friction coefficient on the positive camber side relative to the first camber angle θb is maintained at the minimum value μb. Given the necessary friction coefficient μy calculated in the process of S56 smaller than the minimum value μb of the friction coefficient to be exhibited by the wheel 2, therefore, even if a camber angle of a larger absolute value than the first camber angle θb is provided to the wheel 2, it is determined that no further reduction in the rolling resistance (achievement of running with even lower fuel consumption) can be expected. As a result, the smallest camber angle in a range in which the minimum value μb can be exhibited (an angle close to 0 degrees), specifically, the first camber angle θb, is provided as the camber angle to be provided to the wheel 2.

Accordingly, in accordance with the seventh embodiment, assignment of an unnecessarily large camber angle to be provided to the wheel 2 can be avoided, though simplified control as in the above-described fifth embodiment cannot be expected in the point that the camber angle changes both toward the negative camber side and the positive camber side. The seventh embodiment is therefore as effective as the fifth embodiment in the point that good running stability of the vehicle 1 can be achieved.

Figure 24:
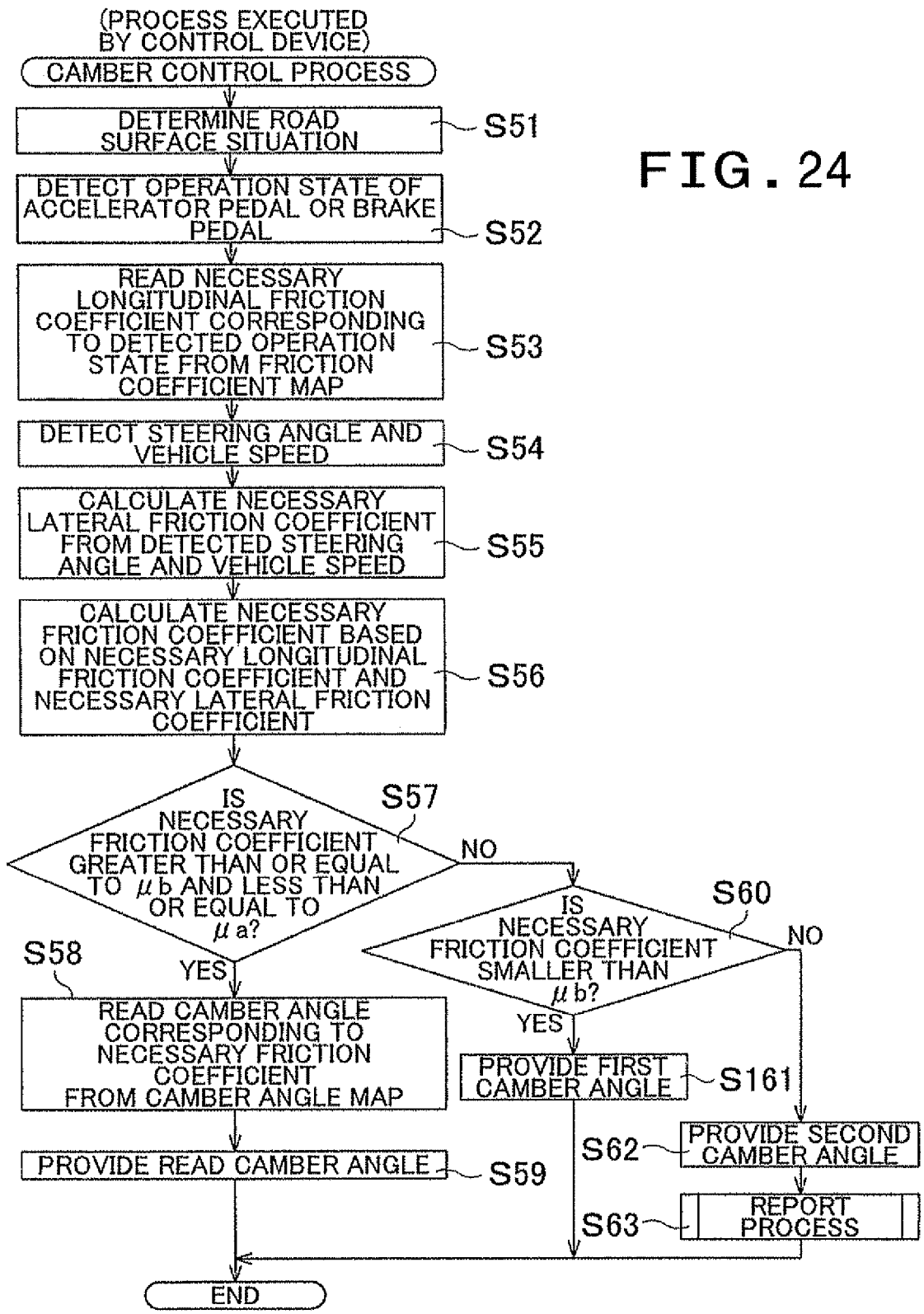
FIG. 24 is a block diagram showing the electrical configuration of a vehicle control device according to an eighth embodiment.
Figure 25:
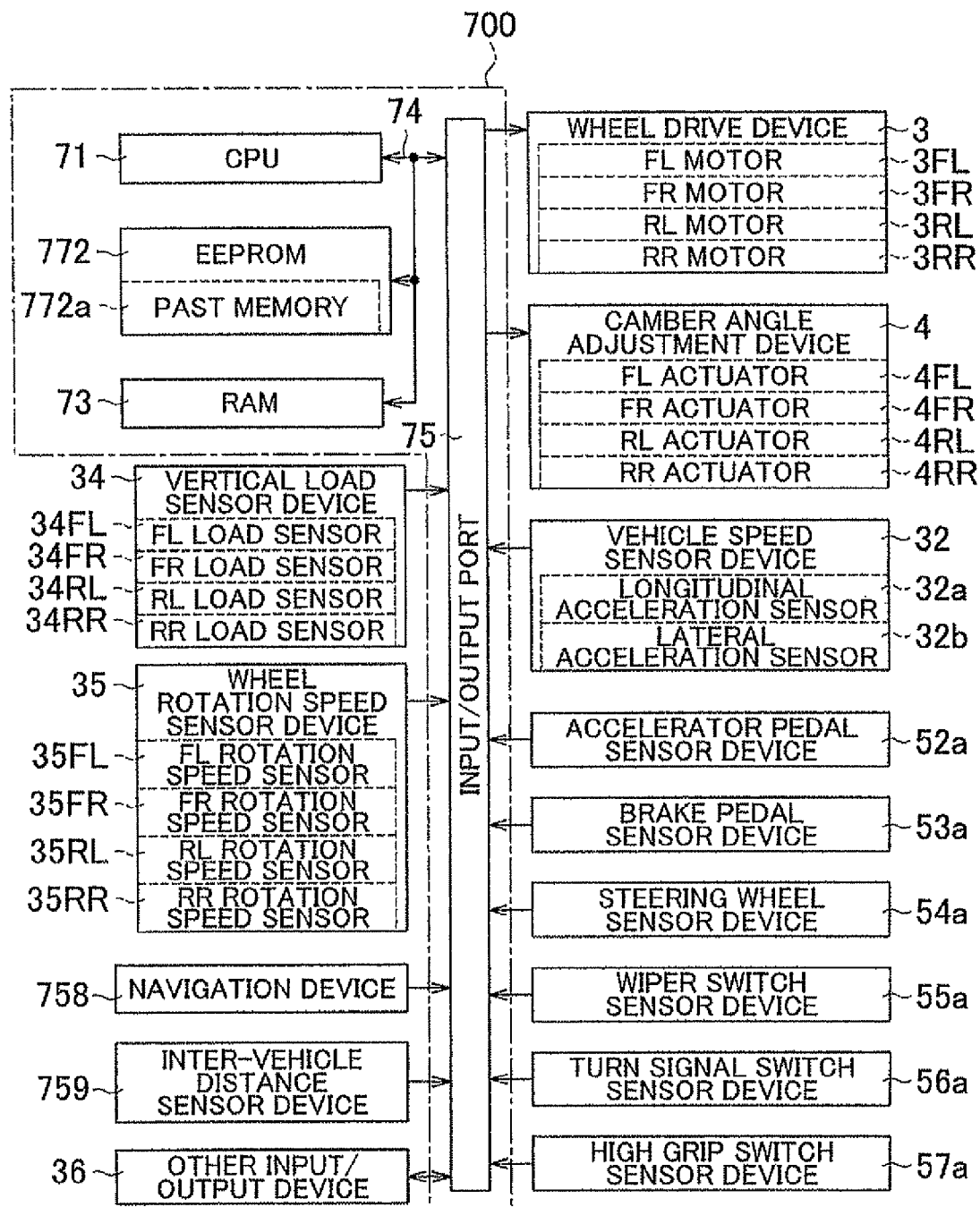
FIG. 25 is a flowchart showing a camber control process.
Figure 26:
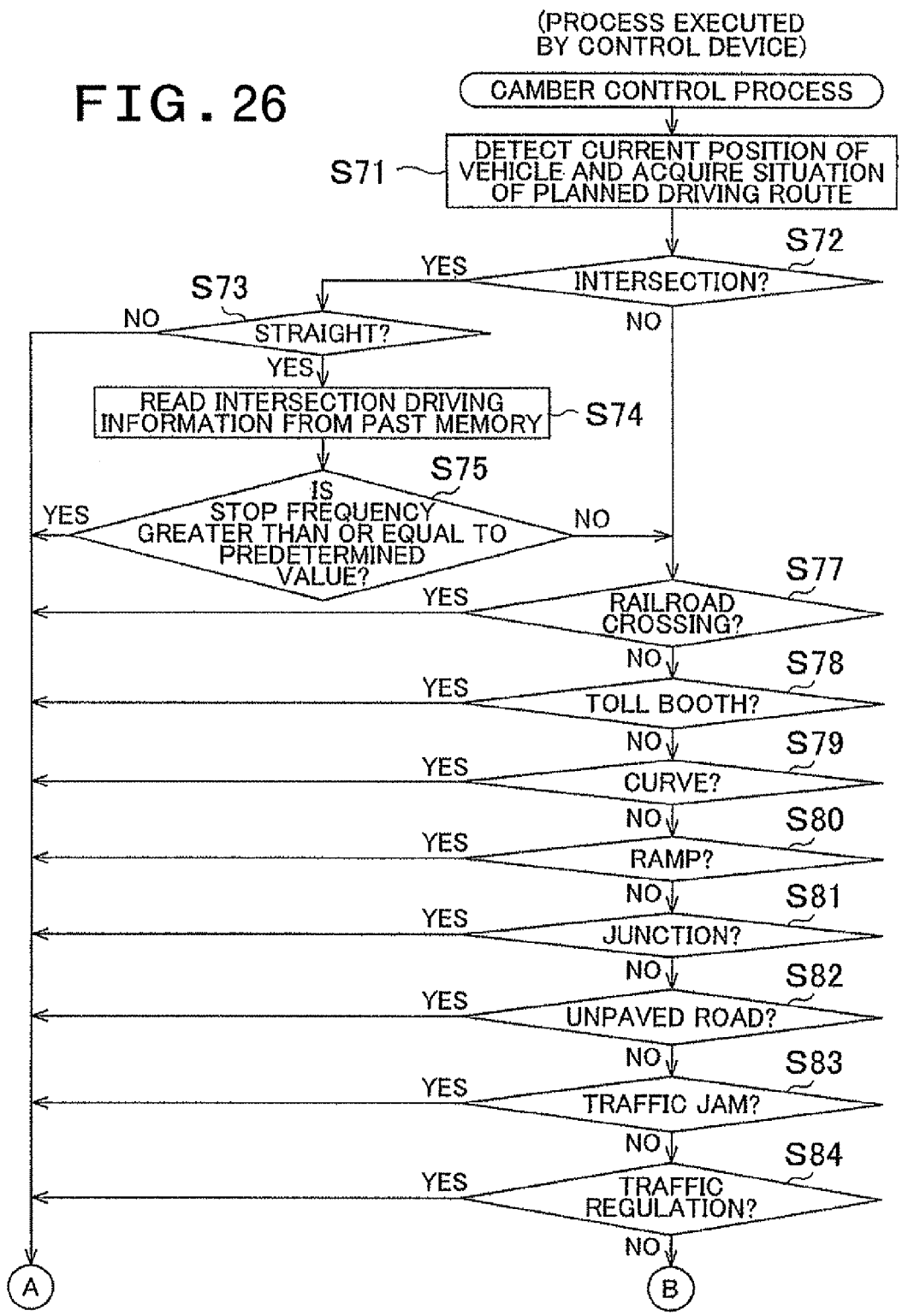
Figure 27:
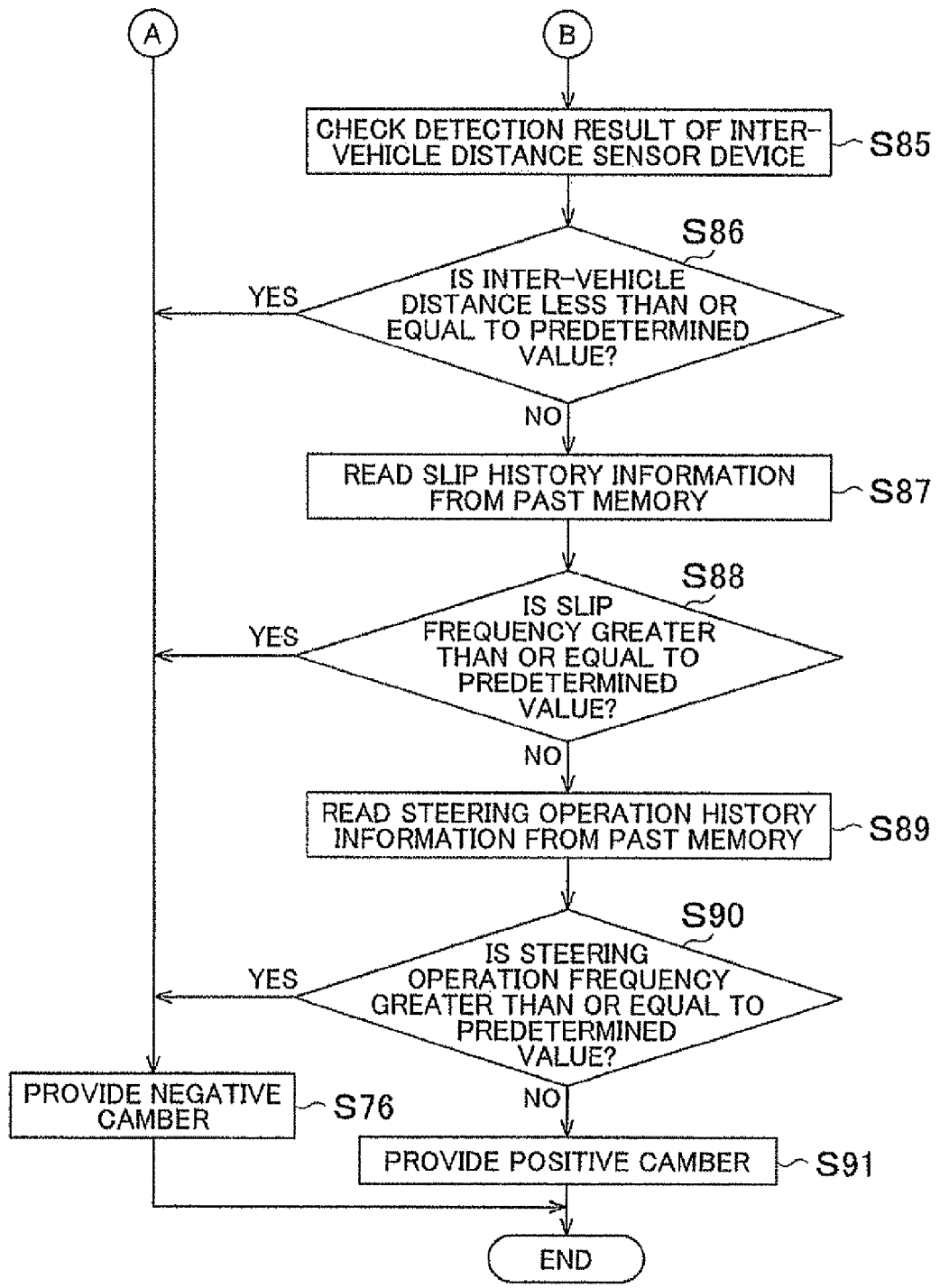

Next, referring to FIGS. 24 and 25, an eighth embodiment mill be described. Note that the same portions as those of the respective embodiments described above are denoted by the same reference numerals, and the descriptions thereof will be omitted. In the eighth embodiment, a case where the vehicle 1 (wheel 2) of the first embodiment is controlled by a vehicle control device 700 will be described as an example.

In this embodiment, the positive camber is normally provided to the wheel 2 such that the second tread 22 with the low rolling resistance is used, while the negative camber is provided such that the first tread 21 with the high grip characteristic is used in the case where a predetermined condition is satisfied. Accordingly, the compatibility can be provided between the fuel saving driving and the improvement of the acceleration/braking performance and the turning performance.

FIG. 24 is a block diagram showing the electrical configuration of the vehicle control device 700 according to the eighth embodiment. As shown in FIG. 24, the vehicle control device 700 includes the CPU 71, an EEPROM 772, and the RAM 73, and they are connected to the input/output port 75 via the bus line 74.

The EEPROM 772 is a nonvolatile memory for storing a control program executed by the CPU 71, fixed value data, or the like to be rewritable, and is configured to be capable of holding data also after the power source is turned off. The EEPROM 772 is provided with a past memory 772a.

The past memory 772a is a memory which stores slip history information and steering operation information in association with position information. The CPU 71 determines whether the current position of the vehicle 1 is a place where a slip frequency or a steering operation frequency is high based on the content of the past memory 772a as described later (see S87 to S90 of FIG. 25).

Note that, while the power source of the vehicle control device 700 is turned on, the CPU 71 regularly detects the slip state of the wheel 2 or the steering operation state of the vehicle 1 at predetermined intervals, and writes the detection result in the past memory 772a in a state associated with the position information to sequentially update (accumulate) the content of the slip history information and the steering operation information as needed.

A navigation device 758 is a device which can display the current position of the vehicle 1, route guidance to a destination, or the like, and mainly includes a GPS receiver (not shown) which receives the position information (for example, latitude information and longitude information) from a GPS satellite, a traffic information receiver (not shown) which receives traffic information such as traffic jam information from an information center such as the VICS center, a database in which the traffic jam information is accumulated, or the like, a man-machine interface device (an operation switch, an LCD device, and a speaker device), a DVD device which reads information from a DVD storing various information such as map data, and a gyroscope which detects the rotational angular speed of the vehicle 1.

The CPU 71 can obtain the current position of the vehicle 1 based on the position information and the rotational angular speed input from the navigation device 758 and the moving speed (ground speed) input from vehicle speed sensor device 32, and can acquire the situation of a route that the vehicle 1 is to follow (for example, whether there is an intersection, a railroad crossing, a toll booth, or the like is at a predetermined distance ahead) based on the map data input from the DVD device.

An inter-vehicle distance sensor device 759 is a device which measures the distance to an object and the speed to output the results thereof to the CPU 71, and includes a transmission portion which transmits millimeter waves (electromagnetic waves of approximately 30 GHz to 300 GHz), a reception portion which receives the electromagnetic wave reflected from the object, and a measurement portion which measures a frequency difference from an original signal based on the electromagnetic wave received by the reception portion (all not shown).

The CPU 71 can acquire the distance to the object and the speed (relative speed with respect to the object) based on the frequency difference measured by the measurement portion. Note that this embodiment is provided with one millimeter wave radar 759 in the front of the vehicle 1, and is configured to measure a relative positional relation (for example, inter-vehicle distance or relative speed) with another vehicle being driven (or stopped) in front of the vehicle 1.

Next, referring to FIG. 25, a camber control process of the eighth embodiment will be described. FIG. 25 is a flowchart showing the camber control process. This process is a process executed repeatedly (for example, at intervals of 0.2 ms) by the CPU 71 while the power source of the vehicle control device 700 is on.

Regarding the camber control process, the CPU 71 first detects the current position of the vehicle 1, and acquires the situation of the route to follow (S71). Note that the current position and the situation of the route to follow are acquired by using the navigation device 758 as described above. The situation of the route to follow is a situation on the route that the vehicle 1 is to follow guided by the navigation device 758, and corresponds to a situation at a predetermined distance ahead in the proceeding direction (50 m ahead in this embodiment) with respect to the current position of the vehicle 1.

After the situation of the route to follow has been acquired in the process of S71, whether the acquired situation of the route to follow is an intersection is determined next (S72). In the case where it is determined as an intersection as a result (S72: Yes), whether the situation of the route to follow is straight, i.e., whether the route to follow guided by the navigation device 758 proceeds straight at the intersection, is determined next (S73).

In the case where it is determined as not straight as a result (S73: No), the route to follow guided by the navigation device 758 turns right or turns left at the intersection, and it is estimated that the deceleration (brake) operation and the turning operation is performed for the vehicle 1 to turn right or turn left at the intersection. Thus, the negative camber is provided to the wheel 2 (S76) to terminate the camber control process.

Accordingly, the ground contact pressure Rin in the first tread 21 is increased and the ground contact pressure Rout in the second tread 22 is decreased (see FIG. 5). Thus, the braking performance and the turning performance of the vehicle 1 can be improved by leveraging the high grip performance of the first tread 21.

On the other hand, in the case where it is determined as straight in the process of S73 (S73: Yes), the route to follow guided by the navigation device 758 passes through the intersection. In this case, (S73: Yes), intersection driving information is read from the past memory 772a (S74), and whether a stopping frequency at the intersection to be passed through is greater than or equal to a predetermined value is determined (S75).

In the case where it is determined that the stopping frequency at the intersection to be passed through is greater than or equal to the predetermined value as a result (S75: Yes), the frequency of stopping (for example, stopping due to a traffic light or stopping to check the right and left although there is no traffic light) at the intersection is high, and it is estimated that the possibility of the vehicle 1 performing the deceleration (brake) operation at the intersection is high. Thus, the negative camber is provided to the wheel 2 (S76) to terminate the camber control process.

Accordingly, the ground contact pressure Rin in the first tread 21 is increased and the ground contact pressure Rout in the second tread 22 is decreased (see FIG. 5). Thus, the braking performance of the vehicle 1 can be improved by leveraging the high grip performance of the first tread 21.

On the other hand, in the case where it is determined that the stopping frequency at the intersection to be passed through is less than the predetermined value in the process of S75 (S75: No), the frequency of stopping (for example, stopping due to a traffic light, or stopping to check the right and left although there is no traffic light) at the intersection is low, and it is estimated that the vehicle 1 passes through the intersection at the same speed. Thus, the process proceeds to S77, and whether the situation of the route to follow is a railroad crossing is determined next (S77).

In the case where it is determined that the situation of the route to follow is not an intersection in the process of S72 (S72: No), it is estimated that an operation for a right or left turn, a temporary stop, or the like at the intersection described above is unnecessary. Thus, the process proceeds to S77, and whether the situation of the route to follow is a railroad crossing is determined next (S77).

In the case where it is determined as a railroad crossing as a result (S77: Yes), it is estimated that the vehicle 1 performs the deceleration (brake) operation for a temporary stop at the railroad crossing. Thus, the negative camber is provided to the wheel 2 (S76) to terminate the camber control process.

Accordingly, the ground contact pressure Rin in the first tread 21 is increased and the ground contact pressure Rout in the second tread 22 is decreased (see FIG. 5). Thus, the braking performance of the vehicle 1 can be improved by leveraging the high grip performance of the first tread 21.

On the other hand, in the case where it is not determined as a railroad crossing in the process of S77 (S77: No), it is estimated that the temporary stop at the railroad crossing is not necessary. Thus, whether the situation of the route to follow is a toll booth is determined next (S78).

In the case where it is determined as a toll booth as a result (S78: Yes), it is estimated that the vehicle 1 performs the deceleration (brake) operation for a temporary stop (or a decelerated driving in an ETC lane) at the toll booth. Thus, the negative camber is provided to the wheel 2 (S76) to terminate the camber control process.

Accordingly, the ground contact pressure Rin in the first tread 21 is increased and the ground contact pressure Rout in the second tread 22 is decreased (see FIG. 5). Thus, the braking performance of the vehicle 1 can be improved by leveraging the high grip performance of the first tread 21.

On the other hand, in the case where it is not determined as a toll booth in the process of S78 (S78: No), it is estimated that a temporary stop or a deceleration at a toll booth is not necessary. Thus, whether the situation of the route to follow is a curve is determined next (S79).

In the case where it is determined as a curve as a result (S79: Yes), it is estimated that the vehicle 1 performs the deceleration (brake) operation in entering the curve and it is estimated that preventing a slip of the wheel 2 when passing through the curve is necessary. Thus, the negative camber is provided to the wheel 2 (S76) to terminate the camber control process.

Accordingly, the ground contact pressure Rin in the first tread 21 is increased and the ground contact pressure Rout in the second tread 22 is decreased (see FIG. 5). Thus, the braking performance and the turning performance of the vehicle 1 can be improved by leveraging the high grip performance of the first tread 21.

On the other hand, in the case where it is not determined as a curve in the process of S79 (S79: No), it is estimated that a preparation such as the deceleration for the curve is not necessary. Thus, whether the situation of the route to follow is a ramp is determined next (S80).

In the case where it is determined as a ramp (for example, an uphill or a downhill) as a result (S80: Yes), it is estimated that, for example, the deceleration (brake) operation is performed when the vehicle 1 enters the downhill and it is estimated that preventing a slip of the wheel 2 when climbing the uphill or a lock of the wheel 2 at the time of braking on the downhill is necessary. Thus, the negative camber is provided to the wheel 2 (S76) to terminate the camber control process.

Accordingly, the ground contact pressure Rin in the first tread 21 is increased and the ground contact pressure Rout in the second tread 22 is decreased (see FIG. 5). Thus, the acceleration/braking performance and the turning performance of the vehicle 1 can be improved by leveraging the high grip performance of the first tread 21.

On the other hand, in the case where it is not determined as a ramp in the process of S80 (S80: No), it is estimated that a preparation such as the deceleration for the ramp is not necessary. Thus, whether the situation of the route to follow is a junction is determined next (S81).

In the case where it is determined as a junction as a result (S81: Yes), it is estimated that the vehicle 1 performs the acceleration operation/deceleration (braking) operation or the turning operation at the junction. Thus, the negative camber is provided to the wheel 2 (S76) to terminate the camber control process.

Accordingly, the ground contact pressure Rin in the first tread 21 is increased and the ground contact pressure Rout in the second tread 22 is decreased (see FIG. 5). Thus, the acceleration/braking performance and the turning performance of the vehicle 1 can be improved by leveraging the high grip performance of the first tread 21.

On the other hand, in the case where it is not determined as a junction in the process of S81 (S81: No), it is estimated that a preparation such as the acceleration for a junction is not necessary. Thus, whether the situation of the route to follow is an unpaved road is determined next (S82).

In the case where it is determined as an unpaved road as a result (S82: Yes), it is estimated that the friction coefficient of the road surface is low and the vehicle 1 (wheel 2) may slip. Thus, the negative camber is provided to the wheel 2 (S76) to terminate the camber control process.

Accordingly, the ground contact pressure Rin in the first tread 21 is increased and the ground contact pressure Rout in the second tread 22 is decreased (see FIG. 5). Thus, the acceleration/braking performance and the turning performance of the vehicle 1 can be improved by leveraging the high grip performance of the first tread 21.

In the case where it is not determined as an unpaved road in the process of S82 (S82: No), it is estimated that the state of the road surface to run on is good and the possibility of a slip is low. Thus, whether the situation of the route to follow is a traffic jam is determined next (S83).

Note that whether the situation of the route to follow is a traffic jam is determined by using the traffic information receiver included in the navigation device 758 and based on the traffic jam information received by the traffic information receiver from the VICS center, as described above.

In the case where it is determined as a traffic jam as a result (S83: Yes), it is estimated that there is a possibility of a vehicle in front being driven at low speed due to the traffic jam and the vehicle 1 performing a sudden brake operation in order to avoid a crash with the vehicle in front and that the possibility of the vehicle 1 accelerating thereafter is high during the low-speed driving in the traffic jam, for example. Thus, the negative camber is provided to the wheel 2 (S76) to terminate the camber control process.

Accordingly, the ground contact pressure Rin in the first tread 21 is increased and the ground contact pressure Rout in the second tread 22 is decreased (see FIG. 5). Thus, the acceleration performance and the braking performance of the vehicle 1 can be improved by leveraging the high grip performance of the first tread 21.

On the other hand, in the case where it is not determined as a traffic jam in the process of S83 (S83: No), it is estimated that a preparation such as a deceleration for a traffic jam is not necessary. Thus, whether the situation of the route to follow is a traffic regulation is determined next (S84).

Note that whether the situation of the route to follow is a traffic regulation is determined by using the traffic information receiver included in the navigation device 758 and based on the traffic information received by the traffic information receiver from the VICS center, as described above.

In the case where it is determined as a traffic regulation as a result (S84: Yes), it is estimated that there is a possibility of a vehicle in front being driven at low speed due to the traffic regulation and the vehicle 1 performing a sudden brake operation in order to avoid a crash with the vehicle in front, and that the possibility of the vehicle 1 accelerating thereafter is high during the low-speed driving due to the traffic regulation, and it is estimated that there is a possibility of a slip in the case of a rain/snow information zone, for example. Thus, the negative camber is provided to the wheel 2 (S76) to terminate the camber control process.

Accordingly, the ground contact pressure Rin in the first tread 21 is increased and the ground contact pressure Rout in the second tread 22 is decreased (see FIG. 5). Thus, the acceleration performance and the braking performance of the vehicle 1 can be improved by leveraging the high grip performance of the first tread 21.

On the other hand, in the case where it is not determined as a traffic regulation in the process of S84 (S84: No), it is estimated that a preparation such as a deceleration for a traffic regulation is not necessary. Thus, the detection result of the inter-vehicle distance sensor device 759 is checked (S85) and whether the inter-vehicle distance with the vehicle in front is less than or equal to a predetermined value is determined (S86) next.

In the case where it is determined that the inter-vehicle distance with the vehicle in front is less than or equal to the predetermined value as a result (S86: Yes), it is estimated that the inter-vehicle distance with the vehicle in front is insufficient and there is a possibility of the vehicle 1 performing a sudden brake operation in order to avoid a crash with the vehicle in front when the vehicle in front decelerates. Thus, the negative camber is provided to the wheel 2 (S76) to terminate the camber control process.

Accordingly, the ground contact pressure Rin in the first tread 21 is increased and the ground contact pressure Rout in the second tread 22 is decreased (see FIG. 5). Thus, the braking performance of the vehicle 1 can be improved by leveraging the high grip performance of the first tread 21.

On the other hand, in the case where it is determined that the inter-vehicle distance exceeds the predetermined value in the process of S86 (S86: No), it is estimated that the inter-vehicle distance with the vehicle in front is sufficiently ensured and a preparation for a deceleration or the like is not necessary. Thus, the slip history information is read from the past memory 772*a* (S87) and whether the slip frequency in the route to follow is greater than or equal to the predetermined value is determined (S88) next.

In the case where it is determined that the slip frequency in the route to follow is greater than or equal to the predetermined value as a result (S88: Yes), it is estimated that the frequency of a slip in the route to follow is high (for example, a case where sand, oil, or the like is on the road surface due to an influence of a neighborhood environment or the like, although map information of the navigation device 758 indicates a paved road) and the possibility of the vehicle 1 (wheel 2) slipping is high. Thus, the negative camber is provided to the wheel 2 (S76) to terminate the camber control process.

Accordingly, the ground contact pressure Rin in the first tread 21 is increased and the ground contact pressure Rout in the second tread 22 is decreased (see FIG. 5). Thus, the acceleration/braking performance and the turning performance of the vehicle 1 can be improved by leveraging the high grip performance of the first tread 21.

On the other hand, in the case where it is determined that the slip frequency in the route to follow is lower than the predetermined value in the process of S88 (S88: No), it is estimated that the frequency of a slip in the route to follow is low and the possibility of the vehicle 1 (wheel 2) slipping is low. Thus, steering history information is read from the past memory 772*a* (S89) and whether the steering frequency in the route to follow is greater than or equal to a predetermined value is determined (S90) next.

In the case where it is determined that the steering frequency in the route to follow is greater than or equal to the predetermined value as a result (S90: Yes), it is estimated that the frequency of the steering operation in the route to follow is high (for example, an obstacle (for example, a sinkhole on the road surface to run on) exists on the route to follow and the route to follow requires a steering operation in order to avoid the obstacle) and the possibility of the vehicle 1 (wheel 2) slipping is high. Thus, the negative camber is provided to the wheel 2 (S76) to terminate the camber control process.

Accordingly, the ground contact pressure Rin in the first tread 21 is increased and the ground contact pressure Rout in the second tread 22 is decreased (see FIG. 5). Thus, the acceleration/braking performance and the turning performance of the vehicle 1 can be improved by leveraging the high grip performance of the first tread 21.

On the other hand, in the case where it is determined that the steering frequency in the route to follow is lower than the predetermined value in the process of S90 (S90: No), it is estimated that the frequency of the steering operation in the route to follow is low and the possibility of the vehicle 1 (wheel 2) slipping is low. Thus, the positive camber is provided to the wheel 2 (S91) to terminate the camber control process.

Accordingly, the ground contact pressure Rin in the first tread 21 is decreased and the ground contact pressure Rout in the second tread 22 is increased (see FIG. 6). Thus, the rolling efficiency of the wheel 2 can be improved and the fuel saving performance of the vehicle 1 can be improved by leveraging the low rolling resistance of the second tread 21.

In this manner, according to this embodiment, the compatibility can be provided between the two performances of the acceleration performance/braking performance and the fuel saving performance which conflict with each other, by adjusting the camber angle of the wheel 2 with the camber angle adjustment device 4 to change the ratio of the ground contact pressure Rin in the first tread 21 and the ground contact pressure Rout in the second tread 22.

In the flowchart (camber control process) shown in FIG. 19, the processes of S59, S61, and S62 correspond to the activation control means, the process of S56 corresponds to the necessary friction coefficient calculation means, the processes of S57, S58, and S60 correspond to the camber angle calculation means, and the processes of S59, S61, and S62 correspond to the camber angle change means described in claim 1. The process of S52 corresponds to the acceleration detection means and the process of S52 corresponds to the braking detection means described in claim 3.

In the flowchart (camber control process) shown in FIG. 21, the processes of S59, S604, S605, and S661 correspond to the activation control means, the process of S56 corresponds to the necessary friction coefficient calculation means, the processes of S57, S601 to S603, and S658 correspond to the camber angle calculation means, and the processes of S59, S604, S605, and S661 correspond to the camber angle change means described in claim 1. The process of S52 corresponds to the acceleration detection means and the process of S52 corresponds to the braking detection means described in claim 3.

Figure 23:
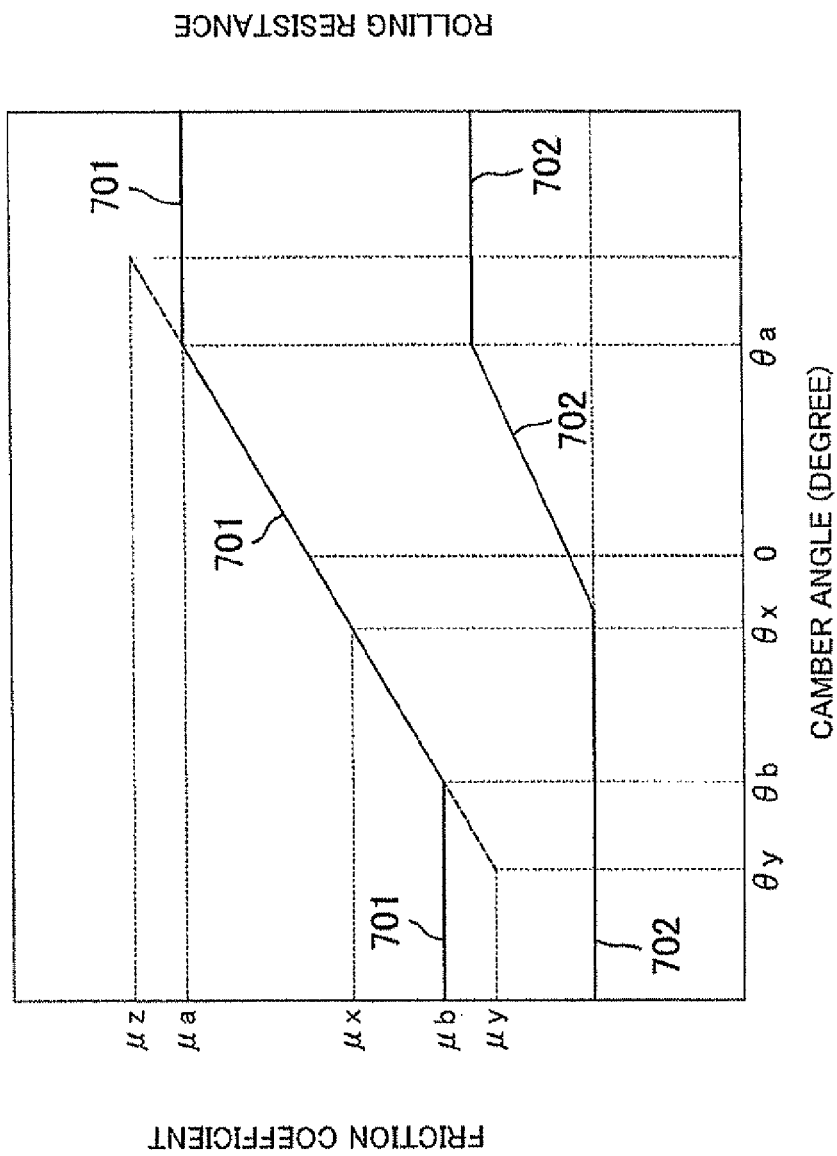
FIG. 23 is a flowchart showing a camber control process.

In the flowchart (camber control process) shown in FIG. 23, the processes of S59, S161, and S62 correspond to the activation control means, the process of S56 corresponds to the necessary friction coefficient calculation means, the processes of S57, S58, and S60 correspond to the camber angle calculation means, and the processes of S59, S161, and S62 correspond to the camber angle change means described in claim 1. The process of S52 corresponds to the acceleration detection means and the process of S52 corresponds to the braking detection means described in claim 3.

The present invention has been described above based on the embodiments. However, the present invention is not in any way limited to the embodiments described above, and it can easily be speculated that various modifications and variations are possible without departing from the gist of the present invention.

For example, values given in the embodiments described above are examples, and other values may obviously be employed. Also, a configuration is obviously possible in which a part or all of the configuration of the respective embodiments described above is combined with a part or all of the configuration of another embodiment.

In the first to third embodiments described above, the case where the negative camber is provided to the wheel 2 when the operation amount (depression amount) of the accelerator pedal 52 or the brake pedal 53 by the driver is greater than or equal to the predetermined value has been described (see S2, S3, and S6 of FIG. 7). However, it is not necessarily limited thereto, and it may obviously be configured such that the camber angle of the wheel 2 is determined based on other state quantities.

In the same manner, in the fifth to seventh embodiments, the case where a parameter (abscissa) of the friction coefficient map 572a is configured by the operation amount (depression amount) of the accelerator pedal 52 or the brake pedal 53 has been described. However, it is not necessarily limited thereto, and the parameter may obviously be configured by other state quantities.

An example of the other state quantities is the operation speed of the accelerator pedal 52 and the brake pedal 53. For example, even if the depression amount of the accelerator pedal 52 or the brake pedal 53 is the same, it may be configured such that the negative camber (positive camber) is provided in the case where the operation speed thereof is faster (slower) than a reference value.

Another example of the other state quantities is a gear shift operation of a transmission. For example, it may be configured such that, in the case where a gear shift operation (shift down operation) of increasing the deceleration of the transmission is performed, it is determined that a relatively large acceleration/deceleration is caused by the gear shift operation to provide the negative camber to the wheel 2. Accordingly, a slip or a lock of the wheel 2 can be suppressed to improve the acceleration performance and the braking performance of the vehicle 1.

In the first to third embodiments described above, the case where the negative camber is provided to the wheel 2 when the steering angle of the steering wheel 54 operated by the driver is greater than or equal to the predetermined value has been described (see S4 and S6 of FIG. 7). However, it is not necessarily limited thereto, and it may obviously be configured such that the camber angle of the wheel 2 is determined based on other state quantities.

An example of the other state quantities is the operation speed of the steering wheel 54. For example, even if the steering angle of the steering wheel 54 is the same, it may be configured such that the negative camber (positive camber) is provided in the case where the operation speed thereof is faster (slower) than a reference value.

In the first to third embodiments described above, the process of making a determination based on the operation state of each of the pedals 52 and 53 has been described as an example of acceleration/deceleration state determination means described in claim 3. However, it is not necessarily limited thereto, and it is obviously possible to make the determination based on the actual acceleration/deceleration detected by the vehicle speed sensor device 32 (the longitudinal acceleration sensor 32a and the lateral acceleration sensor 32b), for example. That is, it may be configured such that the negative camber is provided to the wheel 2 in the case where the acceleration/deceleration of the vehicle is greater than or equal to a predetermined value, and the positive camber is provided in the case where the predetermined value is not reached. In this case, it may be determined based on the acceleration/deceleration in two directions of the front-back direction of the vehicle and the right-left direction of the vehicle, or it may be determined based on the acceleration/deceleration in only one of the two directions.

In the first to third embodiments described above, the process of making a determination based on the operation state of the wiper switch 55 has been described as an example of road surface determination means. However, it is not limited thereto, and it may be configured such that the negative camber is provided to the wheel 2 in the case where the amount of precipitation is detected by the rainfall sensor and a detected value thereof is greater than or equal to a predetermined value, for example. Alternatively, it may be configured such that the state of the road surface is detected by a non-contact optical sensor or the like, and the negative camber or the positive camber is provided to the wheel based on the detection result (such as state of water film on the road surface, snow accumulation state of the road surface, frozen state of the road surface, or pavement state) thereof.

In the first to third embodiments described above, the order of determination on whether to provide the negative camber is in the order of the state of the wiper switch 55, the state of the accelerator pedal 52, the state of the brake pedal 53, the state of the vehicle speed, the state of the turn signal switch 56, the state of the high grip switch 57, and the state of the steering wheel 54 (see S1 to S4). However, the order is not limited thereto, and it may obviously be shuffled to obtain another order. Also, a part of the determination steps may obviously be omitted.

In the respective embodiments described above, the case where the camber angles θR and θL provided to the right and left wheels 2 are the same angles (θR=θL) has been described. However, it is not necessarily limited thereto, and camber angles θR and θL differing from each other (θR<θL or θL<θR) may obviously be provided to the right and left wheels 2.

In the first to third embodiments described above, the case where the first tread 21 or 221 is arranged on the inside of the vehicle and the second tread 22 is arranged on the outside of the vehicle has been described. However, the positional relation is not limited thereto, and may obviously be changed appropriately for each wheel 2.

For example, the arrangement may be such that the first tread 21 or 221 is on the outside of the vehicle and the second tread 22 is on the inside of the vehicle, and the arrangement may be such that the first tread 21 or 221 is on the outside of the vehicle in the front wheel and the second tread 22 is on the inside of the vehicle in the rear wheel. Alternatively, the positional relation may differ for each wheel 2.

In the second to fourth embodiments described above, the case where the constant camber angle is 0° has been described. However, it is not necessarily limited thereto, and the constant camber angle may obviously be set to the positive camber or the negative camber.

In the respective embodiments described above, the case where the wheel has two types of treads and the case where the wheel has three types of treads have been described, but these wheels may obviously be combined. For example, the wheel 2 or 202 having two types of treads may be used for the front wheel and the wheel 303 having three types of treads may be used for the rear wheel, or vice versa.

In the respective embodiments described above, the case where the first tread 21 or 221 or the third tread 323 has the characteristic of a higher grip performance compared to the second tread 22 and the second tread 22 has the characteristic of a lower rolling resistance compared to the first tread 21 or 221 or the third tread 323 has been described. However, the respective treads 21, 221, 22, and 323 may obviously be configured to have other characteristics. For example, two types of tread patterns (grooves) may be provided such that one tread has a characteristic of a high drainage performance and the other tread has a characteristic of small node noise.

In the fourth embodiment described above, the case where the camber angle of the wheel 2 is controlled according to whether the wheel 2 is slipping has been described (see S43 to S45 of FIG. 15). However, it is not necessarily limited thereto, and the camber angle of the wheel 2 may obviously be controlled based on other states.

An example of the other states is the friction coefficient μ of the road surface on which the wheel 2 is to run. Note that the friction coefficient μ can be estimated by the vertical load sensor device 34 as described above. Alternatively, the camber angle of the wheel 2 may be controlled based on whether the wheel 2 is locked (the negative camber is provided when locked).

In the fifth to seventh embodiments described above, the case where the friction coefficient map 572a is configured such that the change in the necessary longitudinal friction coefficient with respect to the accelerator operation amount and the change in the necessary longitudinal friction coefficient with respect to the brake operation amount are the same changes has been described (see FIG. 17). However, the configuration is one example, and other configurations are also obviously possible.

For example, the maximum value of the necessary longitudinal friction coefficient when the accelerator operation amount is 100% and the maximum value of the necessary longitudinal friction coefficient when the brake operation amount is 100% may be different values. Also, although the case where the necessary longitudinal friction coefficient changes linearly with respect to the change in the accelerator operation amount or the like has been described, the change may obviously be a curve.

In the fifth to seventh embodiments described above, the case where the vehicle control device 500 includes only one friction coefficient map 572a has been described. However, it is not necessarily limited thereto, and a plurality of friction coefficient maps may obviously be provided.

For example, it may be configured such that a plurality of friction coefficient maps (for example, three types of the dry paved road map, the unpaved road map, and the paved-road-in-rain map corresponding to the operation range of the road surface situation switch) configured respectively of different contents corresponding to the road surface situations are prepared, and the necessary longitudinal friction coefficient is read from the map corresponding to the operation state of the road surface situation switch in the process of S53 (FIGS. 19, 21, and 23).

Similarly, the fifth to seventh embodiments have been configured so that one camber angle map is used for one road surface situation (for example, the dry paved road). A configuration can nonetheless be made so that a plurality of camber angle maps is used depending on the condition of the wheel 2 for a single road surface situation. For example, the camber angle map 572b (see FIG. 18) of the fifth embodiment and the camber angle map (see FIG. 22) of the seventh embodiment may be stored as the camber angle map for the dry paved road and either one is selected for use according to the condition of the wheel 2.

Further, in the camber angle map (see FIG. 22) of the seventh embodiment, the friction coefficient reaches the minimum value μb at the first camber angle θb and remains substantially constant at camber angles on the positive camber side of the first camber angle θh. The first camber angle θb may herein be set as a camber angle, at which the first tread 21 is spaced apart from the road surface to run on and only the second tread 22 is grounded on the road surface to run on.

In the eighth embodiment, the configuration has been described in which the negative camber is not provided when the route to follow is an intersection and when the vehicle proceeds straight at the intersection and the stopping frequency is less than the predetermined value (see S72 to S75 of FIG. 25). However, it is not necessarily limited thereto, and, for example, when the route to follow is the intersection (S72: Yes), it may be configured such that the negative camber is provided to the wheel 2 (S76) always (that is, without executing the processes of S73 to S75) as a preparation for a stop at the intersection.

In the eighth embodiment, the case where the situation of the route that the vehicle 1 is to follow is determined based on the route that the vehicle 1 is to follow guided by the navigation device 758 has been described. However, it is not necessarily limited thereto, and it may obviously be configured such that the situation of the route that the vehicle 1 is to follow is determined based on other information.

That is, the determination may be made based on the situation near the current position of the vehicle 1 (for example, a situation within a predetermined radius (for example, 50 m) from the vehicle 1, a situation at a predetermined distance (for example, 50 m) ahead in the route that the vehicle 1 is to follow, a situation at a predetermined distance (for example, 50 m) behind in the route that the vehicle 1 is to follow, or a combination of the respective situations) regardless of the presence or absence of the guidance by the navigation device 758.

In the respective embodiments described above, the two performances of the driving performance (acceleration force, braking force, and turning force) obtained by the high grip performance and the fuel saving performance obtained by the low rolling performance (low rolling resistance) have been described as examples of the two performances obtained by the characteristics of the first tread 21 or 221 and the second tread 22. However, it is not necessarily limited thereto, and the respective treads 21, 221, and 22 may obviously be configured to provide other two performances.

Examples of the two performances include: drainage performance obtained by a groove pattern suitable for removal of a water film formed on the road surface and low-noise performance obtained by a groove pattern suitable for reducing a pattern noise; grip performance on an unpaved road obtained by a block pattern which bites into the road surface of the unpaved road and grip performance on a dry paved road obtained by a tread that has no groove and ensures a ground contact area; and performance of exhibiting driving force or braking force on a snow road or icy road and performance of exhibiting driving force or braking force on a paved road surface at normal temperature.

The invention claimed is:

1. A vehicle control device which activates a camber angle adjustment device which adjusts a camber angle of a wheel to control the camber angle of the wheel for a vehicle including the wheel and the camber angle adjustment device, comprising:
    activation control means for controlling an activation state of the camber angle adjustment device, wherein:
    the wheel has a tire which includes a first tread and a second tread aligned in a width direction of the wheel with respect to the first tread and arranged on an inside or an outside of the vehicle,
    the first tread and the second tread are configured to have characteristics different from each other such that the first tread is configured to have a characteristic of a higher grip force compared to the second tread and the second tread is configured to have a characteristic of a smaller rolling resistance compared to the first tread, and
    the activation control means includes:
        necessary friction coefficient calculation means for calculating a friction coefficient necessary for preventing slip from occurring between the wheel and a road surface to run on based on a running condition of the vehicle;
        camber angle calculation means for calculating the camber angle of the wheel based on the friction coefficient calculated by the necessary friction coefficient calculation means; and
        camber angle change means for changing a ratio of a ground contact pressure in the first tread of the wheel and a ground contact pressure in the second tread of the wheel by adjusting the camber angle of the wheel based on the camber angle calculated by the camber angle calculation means.

2. The vehicle control device according to claim 1, wherein:
    the camber angle calculation means calculates a camber angle that allows the wheel to exhibit a friction coefficient equivalent to the friction coefficient calculated by the necessary friction coefficient calculation means and that allows a rolling resistance of the wheel to be smaller, when at least the friction coefficient calculated by the necessary friction coefficient calculation means falls within a range of friction coefficients to be exhibited by the wheel.

3. The vehicle control device according to claim 2, further comprising:
    acceleration detection means for detecting an operation state of an acceleration operation member operated by a driver for accelerating the vehicle; and
    braking detection means for detecting an operation state of a braking operation member operated by the driver for braking the vehicle, and characterized in that
    the necessary friction coefficient calculation means calculates the friction coefficient based on the operation states of the acceleration operation member and the braking operation member detected by the acceleration detection means and the braking detection means, respectively.

4. The vehicle control device according to claim 2, further comprising:
    turning condition calculation means for calculating a turning condition of the vehicle using a ground speed of the vehicle and a steering angle of the wheel, and characterized in that
    the necessary friction coefficient calculation means calculates the friction coefficient based on the turning condition of the vehicle calculated by the turning condition calculation means.

5. The vehicle control device according to claim 3, further comprising:
    turning condition calculation means for calculating a turning condition of the vehicle using a ground speed of the vehicle and a steering angle of the wheel, characterized in that
    the necessary friction coefficient calculation means calculates the friction coefficient based on the turning condition of the vehicle calculated by the turning condition calculation means.

6. The vehicle control device according to claim 1, further comprising:
    acceleration detection means for detecting an operation state of an acceleration operation member operated by a driver for accelerating the vehicle; and
    braking detection means for detecting an operation state of a braking operation member operated by the driver for braking the vehicle, and characterized in that
    the necessary friction coefficient calculation means calculates the friction coefficient based on the operation states of the acceleration operation member and the braking operation member detected by the acceleration detection means and the braking detection means, respectively.

7. The vehicle control device according to claim 6, further comprising:
    turning condition calculation means for calculating a turning condition of the vehicle using a ground speed of the vehicle and a steering angle of the wheel, characterized in that
    the necessary friction coefficient calculation means calculates the friction coefficient based on the turning condition of the vehicle calculated by the turning condition calculation means.

8. The vehicle control device according to claim 1, further comprising:
turning condition calculation means for calculating a turning condition of the vehicle using a ground speed of the vehicle and a steering angle of the wheel, and characterized in that
the necessary friction coefficient calculation means calculates the friction coefficient based on the turning condition of the vehicle calculated by the turning condition calculation means.

* * * * *